(12) United States Patent
Tashiro et al.

(10) Patent No.: US 8,713,293 B2
(45) Date of Patent: Apr. 29, 2014

(54) PROCESSOR MICRO-ARCHITECTURE FOR COMPUTE, SAVE OR RESTORE MULTIPLE REGISTERS, DEVICES, SYSTEMS, METHODS AND PROCESSES OF MANUFACTURE

(75) Inventors: Kenichi Tashiro, Tsukuba (JP); Hiroyuki Mizuno, Kashiwa (JP); Yuji Umemoto, Tsuchiura (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/247,101

(22) Filed: Sep. 28, 2011

(65) Prior Publication Data
US 2012/0023313 A1 Jan. 26, 2012

Related U.S. Application Data

(62) Division of application No. 12/125,431, filed on May 22, 2008, now Pat. No. 8,055,886.

(60) Provisional application No. 60/949,426, filed on Jul. 12, 2007.

(51) Int. Cl.
*G06F 7/38* (2006.01)
*G06F 9/00* (2006.01)
*G06F 9/44* (2006.01)

(52) U.S. Cl.
USPC ............................................. 712/241; 712/233

(58) Field of Classification Search
None
See application file for complete search history.

(56) References Cited

U.S. PATENT DOCUMENTS

| 4,713,749 | A * | 12/1987 | Magar et al. | 712/241 |
|---|---|---|---|---|
| 5,854,930 | A * | 12/1998 | McLain et al. | 717/139 |
| 6,990,570 | B2 * | 1/2006 | Masse et al. | 712/241 |
| 2002/0151314 | A1 * | 10/2002 | Nohara | 455/456 |
| 2004/0012596 | A1 * | 1/2004 | Allen et al. | 345/501 |
| 2005/0289208 | A1 * | 12/2005 | Harrison et al. | 708/502 |

OTHER PUBLICATIONS

Kip R Irvine; "Assembly Language for Intel-Based Computers"; Fifth Edition; Jun. 2006; pp. 27, 87-88, 105-107.*

* cited by examiner

*Primary Examiner* — Andrew Caldwell
*Assistant Examiner* — William B Partridge
(74) *Attorney, Agent, or Firm* — Wade J. Brady, III; Frederick J. Telecky, Jr.

(57) ABSTRACT

An electronic circuit (4000) includes a bias value generator circuit (3900) operable to supply a varying bias value in a programmable range, and an instruction circuit (3625, 4010) responsive to a first instruction to program the range of said bias value generator circuit (3900) and further responsive to a second instruction having an operand to repeatedly issue said second instruction with said operand varied in an operand value range determined as a function of the varying bias value.

15 Claims, 20 Drawing Sheets

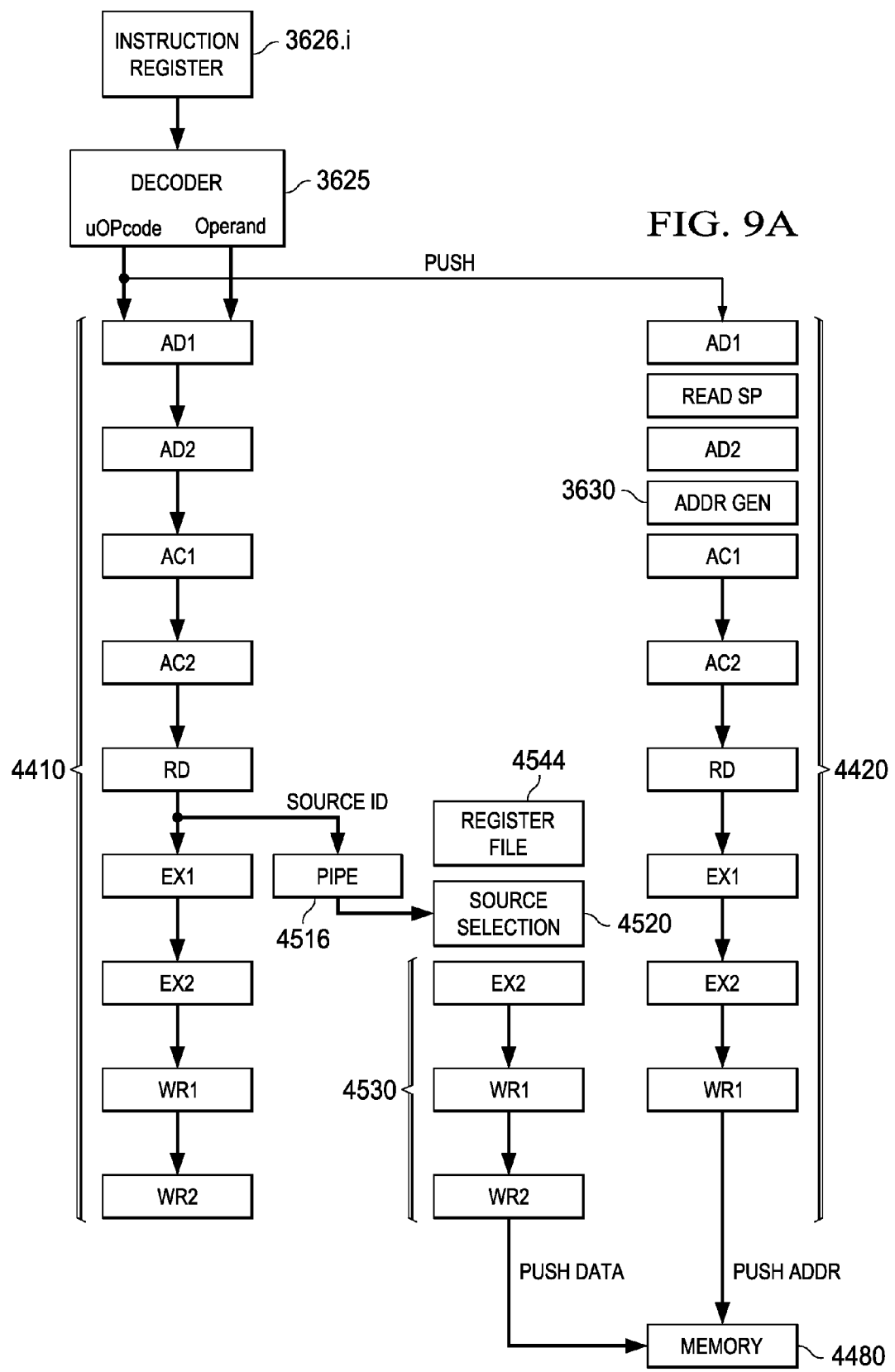

US 8,713,293 B2

PROCESSOR MICRO-ARCHITECTURE FOR COMPUTE, SAVE OR RESTORE MULTIPLE REGISTERS, DEVICES, SYSTEMS, METHODS AND PROCESSES OF MANUFACTURE

CROSS-REFERENCE TO RELATED APPLICATIONS

This application is a divisional of and claims the benefit of U.S. patent application Ser. No. 12/125,431 filed May 22, 2008, which claims the benefit of provisional U.S. Patent Application No. 60/949,426, filed Jul. 12, 2007, titled "Processor Micro-Architecture for Compute, Save or Restore Multiple Registers, Devices, Systems, Methods and Processes of Manufacture." Priority under 35 U.S.C. 119(e)(1).

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

This invention is in the field of electronic computing hardware and software and communications, and is more specifically directed to improved circuits, devices, and systems for power management and information and communication processing, and processes of operating and making them. Without limitation, the background is further described in connection with communications processing.

Wireline and wireless communications, of many types, have gained increasing popularity in recent years. The personal computer with a wireline modem such as DSL (digital subscriber line) modem or cable modem communicates with other computers over networks. The mobile wireless (or cellular) telephone has become ubiquitous around the world. Mobile telephony has recently begun to communicate video and digital data, and voice over packet (VoP or VoIP), in addition to cellular voice. Wireless modems for communicating computer data over a wide area network are also available.

Mobile video on cellular telephones and other mobile platforms is increasing in popularity. It is desirable that many streams of information such as video, voice and data should be flexibly handled by such mobile devices and platforms under power management.

Wireless data communications in wireless mesh networks, such as those operating according to the IEEE 802.16 standard or "WIMAX" are increasing over a widening installed base of installations. The wireless mesh networks offer wideband multi-media transmission and reception that also appear to call for substantial computing power and hardware. Numerous other wireless technologies exist and are emerging about which various burdens and demands for power management exist and will arise.

Security techniques are used to improve the security of retail and other business commercial transactions in electronic commerce and to improve the security of communications wherever personal and/or commercial privacy is desirable. Security is important in both wireline and wireless communications and apparently imposes still further demands for computing power and hardware and compatible power management.

Processors of various types, including DSP (digital signal processing) chips, RISC (reduced instruction set computing), information storage memories and/or other integrated circuit blocks and devices are important to these systems and applications. Containing or reducing energy dissipation and the cost of manufacture and providing a variety of circuit and system products with performance features for different market segments are important goals in DSPs, integrated circuits generally and system-on-a-chip (SOC) design.

Further advantageous solutions and alternative solutions would, accordingly, be desirable in the art.

SUMMARY OF THE INVENTION

Generally and in one form of the invention, an electronic circuit includes a bias value generator circuit operable to supply a varying bias value in a programmable range, and an instruction circuit responsive to a first instruction to program the range of the bias value generator circuit and further responsive to a second instruction having an operand to repeatedly issue the second instruction with the operand varied in an operand value range determined as a function of the varying bias value.

Generally and in another form of the invention, a processor for electronic computing includes an instruction register, an instruction decoder having a decoded instruction output with an instruction operand output, the instruction decoder operable to successively decode a repeat instruction and a repeated instruction having an operand, a pipeline having pipestages including a particular pipestage coupled to the decoded instruction output, and a repeating instruction circuit coupled between the instruction decoder and the particular pipestage, the repeating instruction circuit responsive to the repeat instruction to program an operand value range and also responsive to the repeated instruction and its operand to vary the value of the operand over the operand value range and deliver the varying value of the operand to the particular pipestage.

Generally and in a further form of the invention, an electronic circuit includes an instruction circuit operable to provide a push instruction having an immediate constant, a count register operable to hold a changing count, a destination stack, and push instruction execution circuitry operable to dynamically push data to the destination stack in response to the immediate constant from the instruction circuit biased with the changing count from the count register.

Generally and in a process form of the invention, a process of operating an electronic circuit, includes supplying a varying counter value in a programmable range, and responding to a first instruction to program the range and responding to a second instruction having an associated operand to repeatedly vary the operand in an operand value range determined as a function of the counter value varying in the programmable range.

Generally and in another process form of the invention, a process of operating a processor having a pipeline for electronic computing, includes successively delivering a repeat instruction and a repeating instruction having an operand, responding to the repeat instruction to program an operand value range, and responding to the repeated instruction and its operand to repeatedly vary the value of the operand in the operand value range and to deliver the repeatedly varied value of the operand to the pipeline.

Generally and in yet another form of the invention, an electronic circuit includes a memory, a set of longer width and shorter width storage elements, an instruction operand value generating circuit operable to generate a succession of values in an operand value range, an address pipeline coupled to the instruction operand value generating circuit and operable to use the succession of values to access a succession of memory locations in the memory, and selection circuitry also coupled to the instruction operand value generating circuit and operable to concurrently use the same succession of values to access the set of longer width and shorter width storage elements and thereby effectuate transfers of information between the set and the memory.

Generally and in an additional form of the invention, a processing system includes a printed circuit board, a volatile memory, a processor on the printed circuit board for electronic computing coupled to the volatile memory and the processor including a pipeline and a set of longer width and shorter width storage elements, a nonvolatile memory elsewhere on the printed circuit board and coupled to the processor, for holding representations of instructions for the instruction register to save and restore the set of longer width and shorter width storage elements to the volatile memory, the instructions including a repeat instruction as well as a repeated instruction having an operand, the processor further including an instruction operand value generating circuit operable to generate values varying in an operand value range and biasedly related to the operand of the repeated instruction represented in the nonvolatile memory, and selection circuitry in the pipeline coupled to the instruction operand value generating circuit and operable to use the values to access the set of longer width and shorter width storage elements, and thereby facilitate transfers of information between the set and the volatile memory.

Generally and in yet another form of the invention, an electronic debugging circuit includes a bias value generator circuit operable to supply a varying bias value in a programmable range and having a counter register, a pipeline register, an instruction circuit responsive to a first instruction to program the range of the bias value generator circuit and further responsive to a second instruction having an operand to repeatedly issue the second instruction to the pipeline register with the operand varied in an operand value range determined as a function of the varying bias value, and a scan controller having at least one scan path linking the counter register and the pipeline register to the scan controller.

Generally and in another further process form of the invention, a process of manufacturing includes fabricating structures on an integrated circuit wafer defining both a bias value generator circuit having a programmable range and an instruction circuit coupled to the bias value generator circuit, and electrically testing the structures to verify that the instruction circuit is responsive to a first instruction to program the range of the bias value generator circuit and that the bias value generator circuit supplies a varying bias value in the programmed range and that the instruction circuit is further responsive to a second instruction having an operand to repeatedly issue the second instruction with the operand varied in an operand value range determined as a function of the varying bias value.

These and other circuit, device, system, apparatus, process, and other forms of the invention are disclosed and claimed.

BRIEF DESCRIPTION OF THE DRAWINGS

FIG. 8A is a partially block, partially schematic diagram of an inventive circuit for inventive repeat multiple push pop instructions.

FIG. 9A is a block diagram of an inventive pipeline circuit for an inventive repeat multiple push instruction.

FIG. 9B is a block diagram of an inventive pipeline circuit for an inventive repeat multiple pop instruction.

Corresponding numerals in different figures indicate corresponding parts except where the context indicates otherwise. Some otherwise-identical designations may inadvertently have different characters or portions upper case or lower case in different parts of the description and drawings, and such otherwise-identical designations indicate the corresponding parts except where the context indicates otherwise.

DETAILED DESCRIPTION OF EMBODIMENTS

Figure 1:
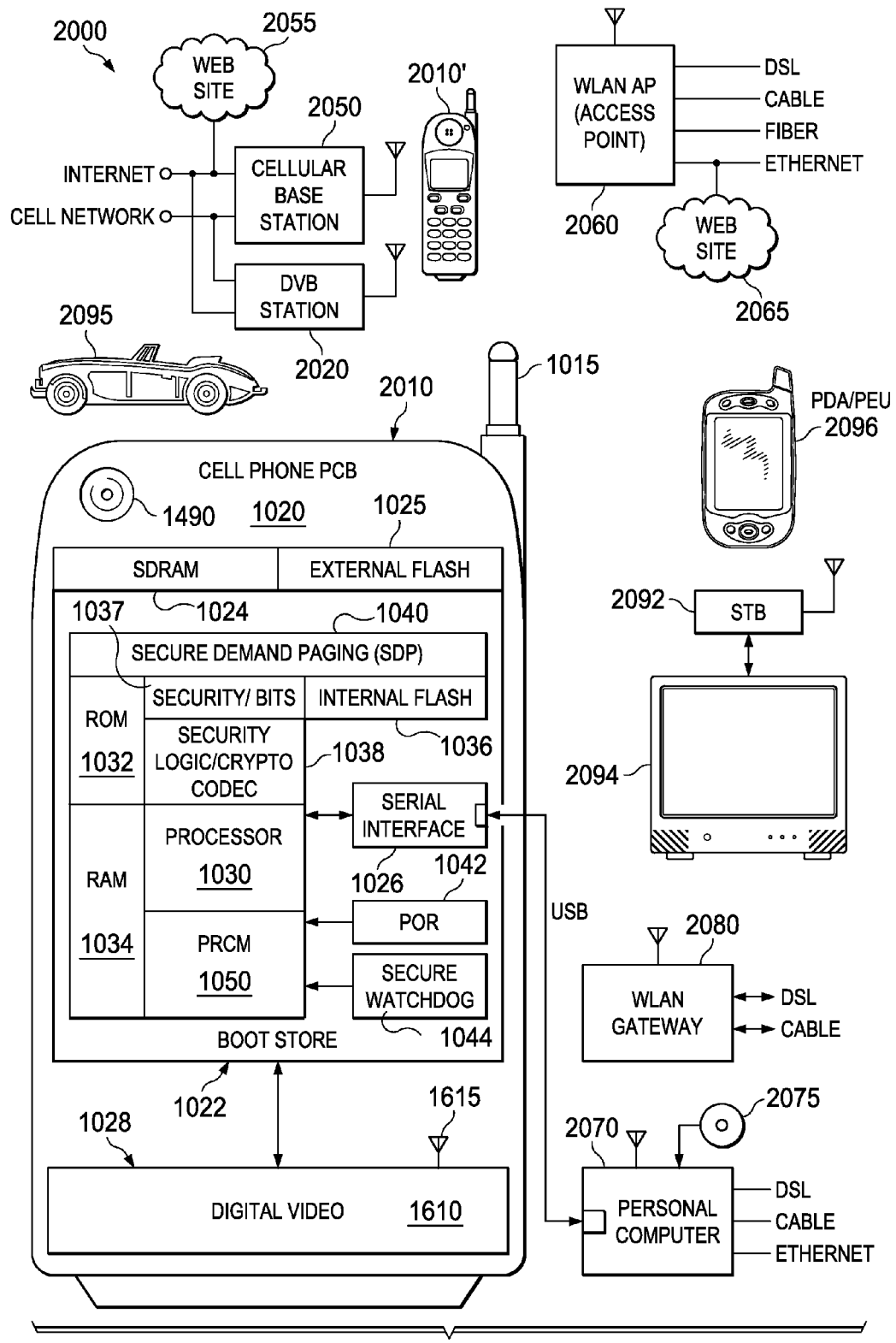
FIG. 1 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing improved according to the invention.

In FIG. 1, an improved communications system 2000 has system blocks as described next and improved with any one, some or all of the circuits and subsystems shown in FIGS. 1-10. Any or all of the system blocks, such as cellular mobile telephone and data handsets 2010 and 2010', a cellular (telephony and data) base station 2050, a WLAN AP (wireless local area network access point, IEEE 802.11 or otherwise) 2060, a Voice over WLAN gateway 2080 with user voice over packet telephone 2085 (not shown), and a voice enabled personal computer (PC) 2070 with another user voice over packet telephone (not shown), communicate with each other in communications system 2000. Each of the system blocks 2010, 2010', 2050, 2060, 2070, 2080 is are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 2050 two-way communicates with the handsets 2010, 2010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box 2092, television 2094 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type.

For example, handset 2010 is improved for selectively determinable functionality, performance, security and economy when manufactured. Handset 2010 is interoperable and able to communicate with all other similarly improved and unimproved system blocks of communications system 2000. Camera 1490 provides video pickup for cell phone 1020 to send over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a video storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 1070 and magnetic and/or optical media 2075 when the user desires and for reception of software intercommunication and updating of information between the personal computer 2070 (or other originating sources external to the handset 2010) and the handset 2010. Such intercommunication and updating also occur via a processor in the cell phone 2010 itself such as for cellular modem, WLAN, BLUETOOTH from a website 2055 or 2065, or other circuitry 1028 for wireless or wireline modem processor, digital television and physical layer (PHY).

In FIG. 1, processor integrated circuit 1022 includes at least one processor (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 1010.

The words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash 1024 are also suitably used to supplement ROM 1032 for boot storage purposes.

Figure 2:
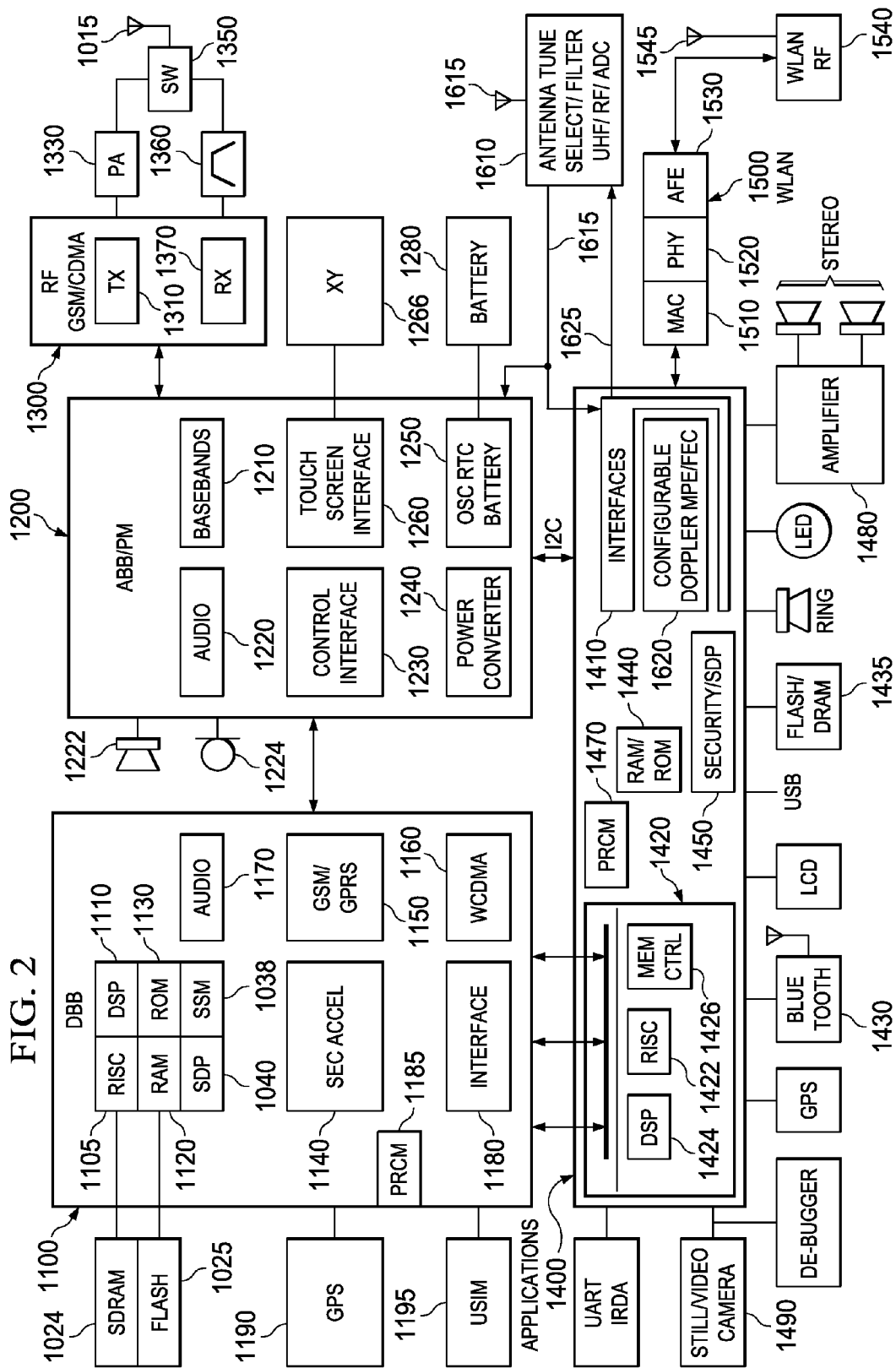
FIG. 2 is a block diagram of inventive integrated circuit chips for use in the blocks of the communications system of FIG. 1, including an inventive partitioning of circuit blocks of a cellular telephone handset.

FIG. 2 illustrates inventive integrated circuit chips including chips 1100, 1200, 1300, 1400, 1500, 1600 for use in the blocks of the communications system 2000 of FIG. 1. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages.

In FIG. 2, an integrated circuit 1100 includes a digital baseband (DBB) block 1110 that has a RISC processor 1105 (such as MIPS core(s), ARM core(s), or other suitable processor) and a digital signal processor 1110 such as from the TMS320C55x™ DSP generation from TEXAS INSTRUMENTS Incorporated or other digital signal processor (or DSP core) 1110, communications software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1110 for providing sequences of software instructions and data thereto. A security logic circuit 1038 of FIGS. 1-3 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Blocks for uplink and downlink processes of WCDMA are provided.

Audio/voice block 1170 supports audio and voice functions and interfacing. Speech/voice codec(s) are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. A power resets and control module 1185 provides power management circuitry for chip 1100. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 2 for the respective GSM and CDMA paths. The integrated circuit 1200 is also interfaced to an I2C port of applications processor chip 1400 of FIG. 2. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS® core(s), ARM® core(s), or other suitable processor), a digital signal processor (DSP) 1424 such as from the TMS320C55x™ DSP generation and/or the TMS320C6x™ DSP generation from TEXAS INSTRUMENTS Incorporated or other digital signal processor(s), and a shared memory controller MEM CTRL 1426 with DMA (direct memory access), and a 2D (two-dimensional display) graphic accelerator. Speech/voice codec functionality is suitably processed in chip 1400, in chip 1100, or both chips 1400 and 1100.

The RISC processor 1420 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 in security logic 1038 of FIG. 1 includes an SSM analogous to SSM 1038, and includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Security logic 1038 of FIG. 1 and FIG. 2 (1038, 1450) includes hardware-based protection circuitry, also called security monitoring logic or a secure state machine SSM. Security logic 1038 (1450) is coupled to and monitors busses and other parts of the chip for security violations and protects and isolates the protected areas. Security logic 1038 (1450) makes secure ROM space inaccessible, makes secure RAM and register space inaccessible and establishes any other appropriate protections to additionally foster security. In one embodiment such a software jump from Flash memory 1025 (1435) to secure ROM, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations would include attempted access to secure register or RAM space.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers.

External audio content and touch screen (in/out) and LCD (liquid crystal display), organic semiconductor display, and DLP™ digital light processor display from TEXAS INSTRUMENTS Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 2095 of FIG. 1 is provided on one or more windows of the vehicle and wirelessly or wireline-coupled to the video feed.

Interface 1410 additionally has an on-chip USB OTG interface that couples to off-chip Host and Client devices. These USB communications are suitably directed outside handset 1010 such as to PC 1070 (personal computer) and/or from PC 1070 to update the handset 1010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifer and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2.

Still other additional wireless interfaces such as for wideband wireless such as IEEE 802.16 WiMAX mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax.

In FIG. 2, a further digital video integrated circuit 1610 is coupled with a television antenna 1615 (and/or coupling circuitry to share antenna 1015 and/or 1545) to provide television antenna tuning, antenna selection, filtering, RF input stage for recovering video/audio/controls from television transmitter (e.g., DVB station 2020 of FIG. 1). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block 1620 coupled to interface 1410 and having a configurable adjustable shared-memory telecommunications signal processing chain such as Doppler/MPE-FEC. See incorporated patent application, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block 1620.

TABLE 1 provides a list of some of the abbreviations used in this document.

TABLE 1

GLOSSARY OF SELECTED ABBREVIATIONS

| | |
|---|---|
| PF1/PF2 | Prefetch stages |
| PD1/PD2 | Predecode stages |
| DEC | Decode stage |
| AD1/AD2 | Address stages |
| AC1/AC2 | Access stages |
| ACx | Accumulator x |
| RD | Read stage |
| EX1/EX2 | Execute stages |
| WR1/2/3 | Write stages |
| AU | Address Unit for data address generation having multi-bit ALU operation |
| DAG | Data Address Generator in AU. |
| DAGX/Y/Z/S | Data Address Generators for memory operand 1, 2 and Coeff; for Stack. |
| DU | Data Unit, main ALU, MAC, others. |
| HAIF | Hardware Accelerator Interface in DU to which coprocessors are connected. |
| CF | Control Flow submodule for instruction fetch & dispatch in CPU |
| CF/PC | Sub-sub component PC in CF |
| IBQ | Instruction Buffer Queue FIFO between program bus & instruction register I.R. |

TABLE 1-continued

GLOSSARY OF SELECTED ABBREVIATIONS

| | |
|---|---|
| INTF | Memory Interface buffering unit between two blocks, CPU and memory subsystem, can operate asynchronously so one block can have an extra clock cycle while the other block concurrently runs without an extra clock cycle. |
| RPTC | (single) Repeat Counter. |
| DPC | Decode Program Counter. A PC holds address for the instruction at Decode stage. |
| PDPC | Predecode Program Counter in PreDecode stage. The MPU manages this, and value is simply passed to DPC when the pointing instruction is dispatched to I.R. |
| RETA | Return Address register holds the most recent return context; one-stage hardware-implemented top-of-stack. The old value in RETA is shifted out (pushed out) to memory stack when a new context is produced (@ CALL/INTR); when RETA is drained (@ RET/ RET_INT) it is refilled back from memory stack. |
| CPL | "Compiler" mode bit qualifies the way of data address computation; in this mode, the offset data addressing uses SP (stack pointer) as base address, which fits to execute compiled high-level language program like C. |
| DAx | Data Address Registers group. a group of registers, some set of instruction takes as its operand. |
| DBGM | Debug Mode bit tells mode to hardware emulation logic. |
| INTR | Interrupt in general or interrupt instruction. |
| IVPD | Interrupt Vector table Pointer for DSP interrupts merges into one pointer two types of interrupts: DSP interrupts and host interrupts. |
| IIR | Interrupt ID Register automatically stores identification number of the interrupt taken. |
| X | Prefix signifying Extended. |
| ACK | Acknowledge |
| CLK | Clock |
| DMA | Direct Memory Access |
| DSP | Digital Signal Processor |
| D2D | Device to Device |
| GFX | Graphics Engine |
| GPMC | General Purpose Memory Controller |
| INTC | Interrupt Controller |
| IVA | Imaging, Video and Audio processor |
| | L1$, L2$ Level 1, Level 2 Cache |
| MEM | Memory |
| MPU | Microprocessor Unit |
| OCP | Open Core Protocol bus protocol |
| POR | Power On Reset |
| PRCM | Power Reset and Clock Manager |
| REQ | Request |
| RISC | Reduced Instruction Set Computer |
| SDRAM | Synchronous Dynamic Random Access Memory |
| SDRC | SDRAM Refresh Controller |
| SGX | Graphics engine |
| SMS | SDRAM Memory Scheduler |
| SRAM | Static Random Access Memory |
| SSM | Secure State Machine |
| UART | Universal Asynchronous Receiver Transmitter (2-way serial interface) |
| WDT | Watchdog Timer |
| WKUP | Wakeup |
| Smem | Single data memory access |
| Lmem | Long data memory access |

TABLE 2

EXTENDED GLOSSARY FOR REGISTERS

| | |
|---|---|
| CSR | Computed Single Repeat Register. A register used to initialize RPTC (@ repeat(CSR) instruction. Another embodiment of repeat instruction uses repeat(#k)(immediate constant). |
| BRAF | Block Repeat Active Flag |
| BRCi | Block Repeat Counter i |
| BRSi | BRCi Save Register |

TABLE 2-continued

EXTENDED GLOSSARY FOR REGISTERS

| | |
|---|---|
| BSA | Circular Buffer Start Address register.<br>A circular (ring) buffer is established or declared by setting size & start register; BSA is the latter.<br>Used to set up a digital filter, for example. |
| IFR | Interrupt Flags Register for vectored interrupts; when particular flag is set active, the CPU core identifies an interrupt event. |
| IER | Interrupt Enable Register is bitwise enable for each interrupt (each IFR). |
| RSA | Block Repeat Start Address (register) holds the start instruction address of a loop structure. |
| REA | Block Repeat End Address (register) |
| ACx | Accumulators AC0~AC15 |
| ARx | Auxiliary Registers AR0~AR15 |
| PC | Program Counter register |
| SP | Data Stack Pointer |
| XSP | Extended Data Stack Pointer |
| SSP | System Stack Pointer |
| XSSP | Extended System Stack Pointer |
| STi | Status register i |
| WACx | Expanded (Wide) Accumulator registers group:<br>(ACx or ACLHx) (WACa, WACb)<br>AC0~15, AC0.H~AC15.H, AC0.L~AC15.L |
| Rx | Expanded Arithmetical/Logical registers group:<br>(WACx or TAx) (Ra, Rb)<br>AC0~AC15, AR0~AR15, T0~T3, AC0.H~AC15.H, AC0.L~AC15.L |
| RLHx | Expanded 16 bit Arithmetical/Logical registers group:<br>(TAx or ACLHx) (RLHa, RLHb)<br>AR0~AR15, T0~T3, DR0-DR3, AC0.H~AC15.H, AC0.L~AC15.L |
| DAx | Data Address registers group: (TAx, SSP, SP or DP) (DAa)<br>AR0~AR15, T0~T3, SSP, SP, DP |
| XDAx | Extended Address registers group:<br>(XARx, XSSP, XSP or XDP) (XDAa, XDAb)<br>XAR0~XAR15, XSSP, XSP, XDP |
| WDAx | Expanded Data Address registers group:<br>(DAx or XDAx) (WDAa, WDAb)<br>AR0~AR15, T0~T3, SSP, SP, DP, XAR0~XAR15, XSSP, XSP, XDP |
| XRx | Extended registers group: (ACx, XDAx) (XRa, XRb)<br>AC0~AC15, XAR0~XAR15, XSSP, XSP, XDP |
| RAx | Operands group for Register to Register move.<br>(WACx, DAx, CSR, RPTC or BRCx) (RAa, RAb)<br>Registers in WACx or DAx<br>CSR<br>(Only for destination from DAx)<br>RPTC (Only for source to DAx)<br>BRC0, BRC1 (Only to/from DAx) |
| ADRx | Operands group for Address phase load. (ADRa)<br>BSA01, BSA23, BSA45, BSA67, BSAC<br>PDP, DPH, BK03, BK47, BKC, CSR, BRC0, BRC |
| ALLx | Operands group for Push/Pop, Logical Load/Store:<br>(All CPU registers) (ALLa)<br>Registers in WACx, WDAx or ADRx<br>ACxG, RPTC, BRS1, RSA0, RSA1, RSA0.H, RSA1.H, RSA0.L, RSA1.L<br>REA0, REA1, REA0.H, REA1.H, REA0.L, REA1.L, RETA, ARxH<br>SSPH, SPH, ST0, ST0__55, ST1, ST1__55, ST2, ST3, ST3__55<br>IER0, IER1, DBGIMR0, DBGIMR1, IVPD<br>(ALLa = all CPU registers except IIR, BIOS, CPUCFG, CPUREV, BER, IFR0 and IFR1.) |

Figure 3:
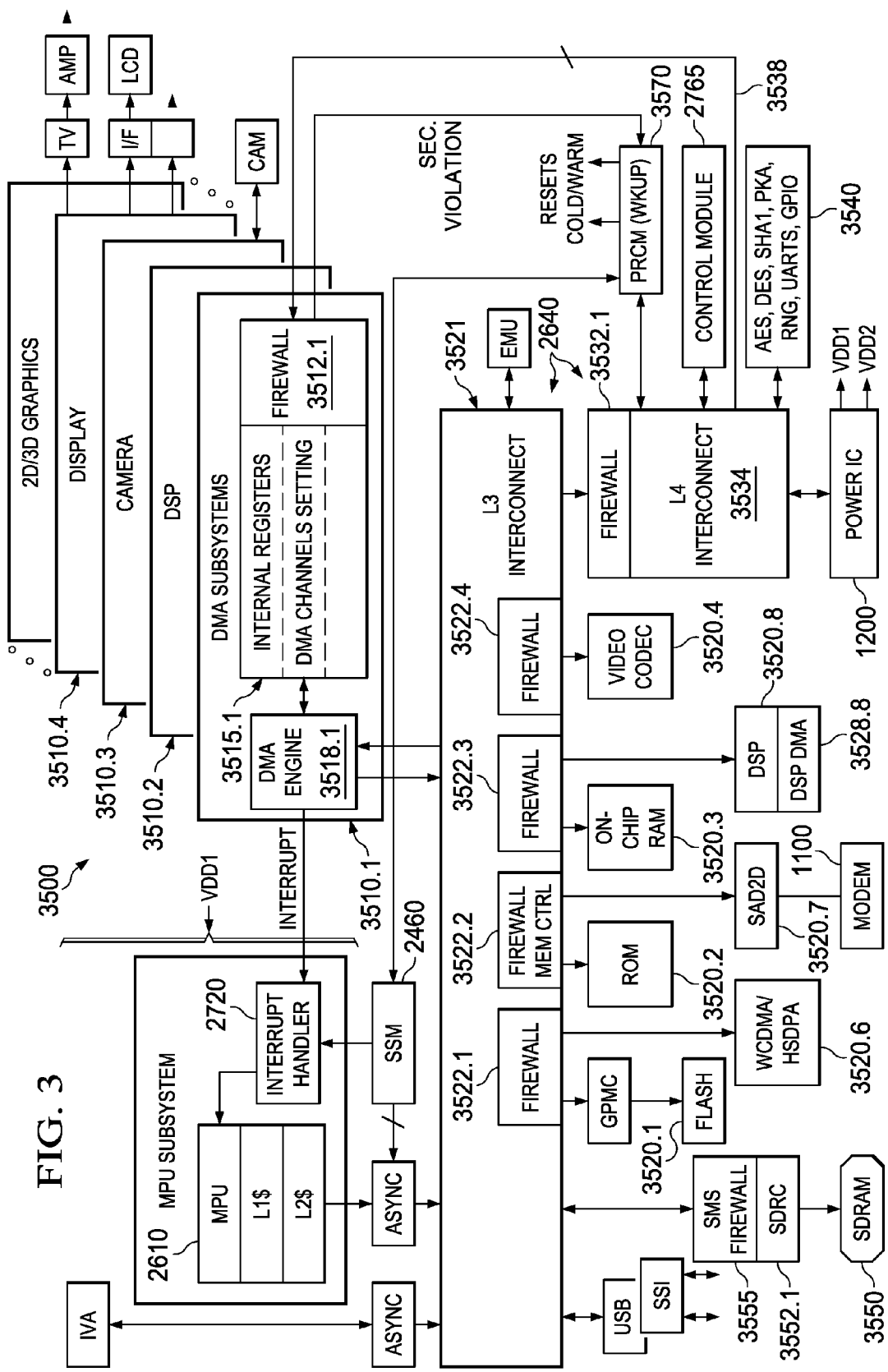
FIG. 3 is a block diagram of an inventive applications processor integrated circuit in FIG. 2 with associated integrated circuits.

In FIG. 3, a system 3500 has an MPU subsystem, an IVA subsystem, and DMA subsystems 3510.i. The MPU subsystem suitably has a RISC or CISC processor, such as a superscalar processor with L1 and L2 caches. The IVA subsystem has a DSP for image processing, video processing, and audio processing. The IVA subsystem has L1 and L2 caches, RAM and ROM, and hardware accelerators as desired such as for motion estimation, variable length codec, and other processing. DMA is integrated into the system 3500 in such a way that it can perform target accesses via target firewalls 3522.i and 3512.i of FIG. 3 connected on the interconnects 2640. A target is a circuit block targeted or accessed by an initiator. In order to perform such accesses the DMA channels are programmed. Each DMA channel specifies the source location of the Data to be transferred and the destination location of the Data.

Data exchange between the peripheral subsystem and the memory subsystem and general system transactions from memory to memory are handled by the System SDMA. Data exchanges within a DSP subsystem 3510.2 are handled by the DSP DMA 3518.2. Data exchange to refresh a display is handled in display subsystem 3510.4 using a DISP DMA 3518.4 (numeral omitted). This subsystem 3510.4, for instance, includes a dual output three layer display processor for 1xGraphics and 2xVideo, temporal dithering (turning pixels on and off to produce grays or intermediate colors) and SDTV to QCIF video format and translation between other video format pairs. The Display block 3510.4 feeds an LCD panel using either a serial or parallel interface. Also television output TV and Amp provide CVBS or S-Video output and other television output types. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview.

A hardware security architecture including SSM 2460 propagates qualifiers on the interconnect 3521 and 3534 as shown in FIG. 3. The MPU 2610 issues bus transactions and sets some qualifiers on Interconnect 3521. SSM 2460 also provides an MreqSystem qualifier(s). The bus transactions propagate through the L4 Interconnect 3534 and then reach a DMA Access Properties Firewall 3512.1. Transactions are coupled to a DMA engine 3518.i in each subsystem 3510.i which supplies a subsystem-specific interrupt to the Interrupt Handler 2720. Interrupt Handler 2720 is also coupled to SSM 2460.

Firewall protection by firewalls 3522.i is provided for various system blocks 3520.i, such as GPMC to Flash memory 3520.1, ROM 3520.2, on-chip RAM 3520.3, Video Codec 3520.4, WCDMA/HSDPA 3520.6, MAD2D 3520.7 to Modem chip 1100, and a DSP 3528.8. Various initiators in the system are given 4-bit identifying codes designated ConnID. Some Initiators and their buses in one example are Processor Core MPU 2610 [RD, WR, INSTR Buses], digital signal processor direct memory access DSP DMA 3510 [RD, WR], system direct memory access SDMA 3510.1 [RD, WR], Universal Serial Bus USB HS, virtual processor PROC_VIRTUAL [RD, WR, INSTR], virtual system direct memory access SDMA_VIRTUAL [RD, WR], display 3510.4 such as LCD, memory management for digital signal processor DSP MMU, camera CAMERA 3510.3 [CAMERA, MMU], and a secure debug access port DAP.

The DMA channels support interconnect qualifiers collectively designated MreqInfo, such as MreqSecure, MreqPrivilege, MreqSystem in order to regulate access to different protected memory spaces. The system configures and generates these different access qualifiers in a security robust way and delivers them to hardware firewalls 3512.1, 3512.2, etc. and 3522.1, 3522.2, etc. associated with some or all of the targets. The improved hardware firewalls protect the targets according to different access rights of initiators. Some background on hardware firewalls is provided in incorporated patent application, "Method And System For A Multi-Sharing Security Firewall," Ser. No. 11/272,532 filed Nov. 10, 2005, which is hereby incorporated herein by reference.

The DMA channels 3515.1, .2, etc. are configurable through the L4 Interconnect 3534 by the MPU 2610. A circuitry example provides a Firewall configuration on a DMA L4 Interconnect interface that restricts different DMA channels according to the configuration previously written to configuration register fields. This Firewall configuration implements hardware security architecture rules in place to allow and restrict usage of the DMA channel qualifiers used in attempted accesses to various targets.

When an attempt to configure access for DMA channels in a disallowed way is detected, in-band errors are sent back to the initiator that made the accesses and out-band errors are generated to the Control Module 2765 and converted into an MPU Interrupt. Some background on security attack detection and neutralization is described in the incorporated patent application, "System and Method of Identifying and Preventing Security Violations Within a Computing System," Ser. No. 10/961,344 filed Oct. 8, 2004, which is hereby incorporated herein by reference.

In FIG. 3, the MPU 2610, Others block, and System DMA (SDMA) 3530.1, 3535.1 each supply or have some or all of the MreqInfo signals MreqSystem, MreqSecure, MreqPrivilege, MreqDebug, MreqType, and other signals for various embodiments, with the signals as described in TABLE 7. L4 Interconnect 3534 supplies the MreqInfo signals to the DMA Firewall and other firewalls 3512.*i*. Interconnect 3534 is also coupled to Control Module 2765 and cryptographic accelerator blocks 3540 and PRCM 3570.

A signal ConnID is issued onto the various buses by each initiator in the system 3500. The signal ConnID is coded with the 4-bit identifying code pertaining to the initiator originating that ConnID signal. System Memory Interface 3555 in some embodiments also has an adjustment made to ConnID initiator code so that if incoming ConnID=MPU AND MreqSystem='1', then ConnID=MPU Virtual. If incoming ConnID=SDMA AND MreqSystem='1', then ConnID=SDMA Virtual. In this way the special signal MreqSystem identifies a virtual world for these initiators to protect their real time operation. For background on these initiators and identifiers, see for instance incorporated patent application, "Virtual Cores And Hardware-Supported Hypervisor Integrated Circuits, Systems, Methods and Processes of Manufacture," Ser. No. 11/671,752, filed Feb. 6, 2007, which is hereby incorporated herein by reference.

The System Memory Interface SMS with SMS Firewall 3555 is coupled to SRAM Refresh Controller SDRC 3552.1 and to system SRAM 3550. A new ConnID is suitably generated each time the processor core MPU 2610 or system SDMA 3530.1, 3535.1 perform an access in the case when the MreqSystem qualifier is one (1).

In FIG. 3, Control Module 2765 between Interconnect 3534 and DMA Firewall 3512.1 receives a Security Violation signal when applicable from DMA Firewall 3512.1. A Flag pertaining to the Security Violation is activated in a Control_Sec_Err_Status register and is forwarded to SSM Platform_Status_Register. This flag is read on every Monitor Mode switch or otherwise frequently read, or interrupt handler 2720 generates an interrupt each time one of the Flag bits is updated or activated by the hardware.

In FIG. 3, PRCM 3570 is provided in a voltage domain called Wakeup domain WKUP. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

The modem enters the deep sleep state by acknowledging the D2D idle request by asserting the signal MODEM_IDLE-ACK. The PRCM will gate the modem functional clock upon assertion of the D2D Idle Acknowledge. The modem exits this deep sleep state by asserting a D2D wakeup signal MODEM_SWAKEUP. The SAD2D OCP interface clock and modem functional clock are each restarted by the PRCM upon assertion of the D2D wakeup.

Numerous operations involving context switching, interrupts and various computations used in the circuits, blocks and systems of FIGS. 1-3 are facilitated by improved circuitry for repeat multiple instructions as described herein.

In FIGS. 4, 5, 5A and 6, a DSP core is provided with improved circuitry for repeat multiple instructions as described herein. See Glossary TABLE 1 for meanings of various designations in the structures illustrated.

Figure 4:
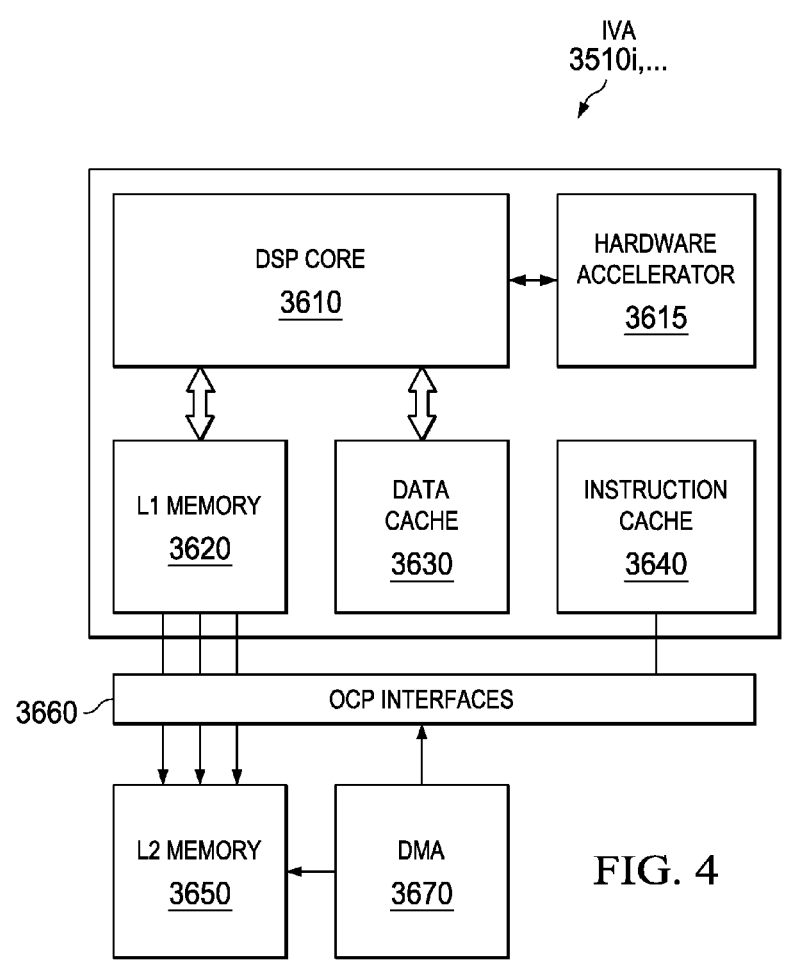
FIG. 4 is a block diagram of an inventive integrated circuit having a digital signal processor DSP core with repeat multiple instructions, hardware accelerator, memory subsystems, and direct memory access DMA.

In FIG. 4, a DSP subsystem is provided for use in the IVA block and/or any of the system blocks 3510.*i* of FIG. 3. A DSP core 3610 is bidirectionally coupled with a Hardware Accelerator 3615. The DSP core 3610 is bidirectionally coupled with a level 1 (L1) memory subsystem 3620 including SRAM banked memory. The DSP core 3610 is also bidirectionally coupled with a data cache 3630 and an instruction cache 3640. The memory subsystem 3620 and cache(s) are coupled to a level 2 (L2) memory subsystem 3650 by OCP interfaces 3660. L2 memory subsystem 3650 provides Level 2 SRAM banked memory caching for Data cache 3630 and Instruction cache 3640. A direct memory access (DMA) unit 3670 is coupled to memory subsystem 3650 and OCP interfaces 3660 and performs DMA information transfers.

Figure 5:
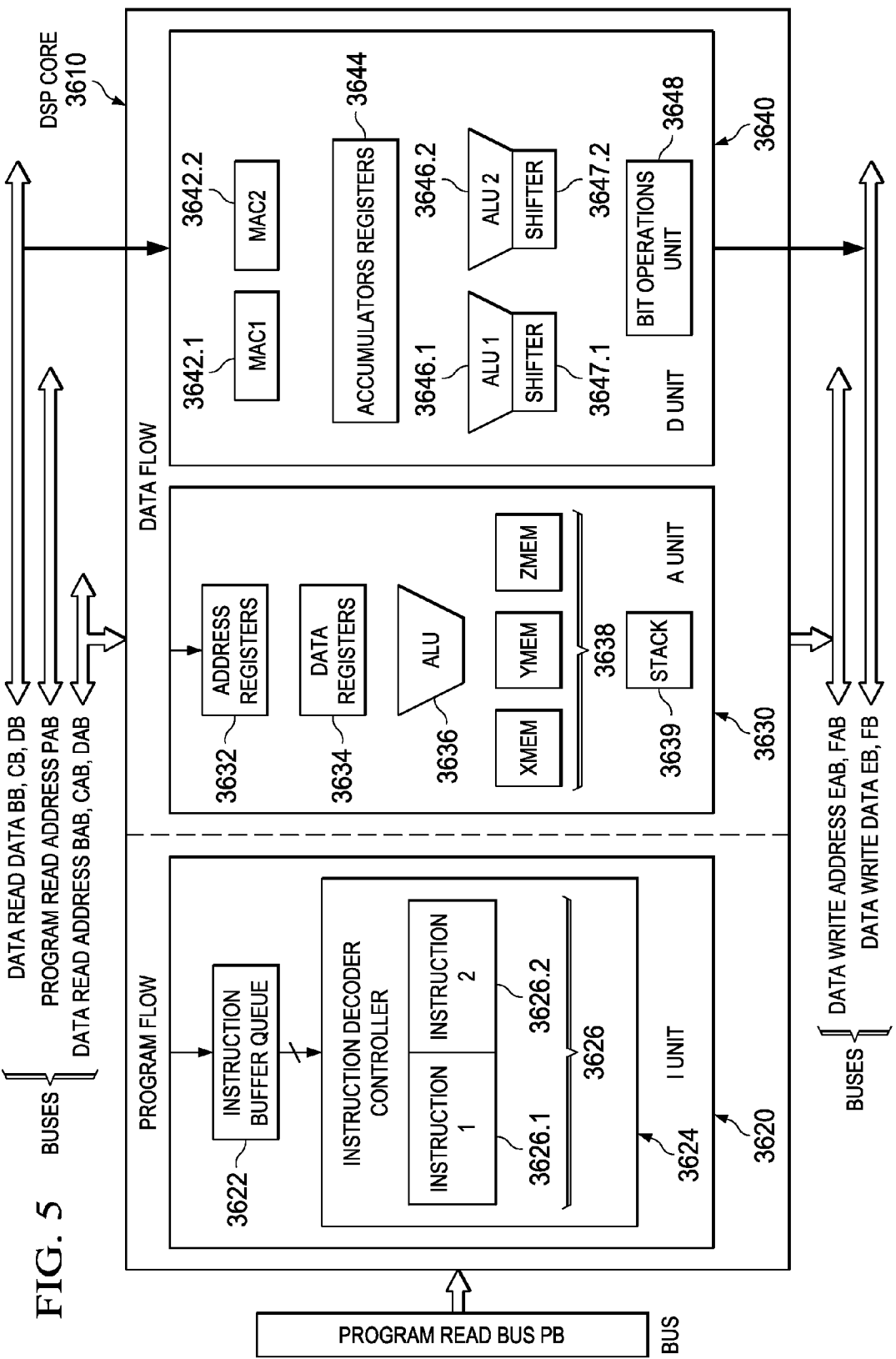
FIG. 5 is a block diagram of an inventive DSP core having repeat multiple instructions for use in FIG. 4.

In FIG. 5, the DSP core 3610 and its associated buses are further detailed. DSP core 3610 has an instruction unit (I unit) 3620 to control the program flow, an address unit (A unit) 3630 to control the data flow, and a data unit (D unit) 3640 to execute computations and other data path operations. DSP core 3610 is coupled to a set of buses including Data read Data Buses BB, CB, DB; Program read Address Bus PAB; and Data read Address Buses BAB, CAB, DAB. The D unit 3640 is suitably fed from Data read Data Buses BB, CB, DB. I unit 3620 suitably utilizes Program read Address Bus PAB to assert addresses, and receives program instructions thus read on a Program read Bus PB. The A unit 3630 supplies Write addresses to one or more of Data Write Address Buses EAB, FAB and D unit 3640 concurrently supplies Write data to the corresponding Data Write Data Buses EB, FB. The A unit 3630 supplies Read addresses to one or more of Data read Address Buses BAB, CAB, DAB and concurrently receives Read data for itself or for unit 3640 from the corresponding Data read Data Buses BB, CB, DB.

I unit 3620 receives instructions on a wide bus and stores some or many lines of instructions in a multi-word-wide Instruction Buffer Queue (IBQ) 3622. Instructions are transferred as needed to an Instruction Decoder Controller 3624 with associated Instruction Register 3626 having sections or slots 3626.1 for Instruction 1 and 3626.2 for Instruction 2. FIG. 5 depicts a dual issue machine. For an architecture accommodating a higher number of instruction issue, more corresponding sections or slots 3626.*i* are provided.

A Unit 3630 has a block of Address Registers 3632 and a block of Data Registers 3634. An arithmetic logic unit ALU 3636 supports data address generator DAG functions. Storage blocks 3638 for Xmem, Ymem, Zmem are coupled to ALU 3636. A Stack unit 3639 holds context-specific register contents and supports multiple push and multiple pop operations as taught herein.

D Unit 3640 has multiply-accumulate units MAC1 3642.1 and MAC2 3642.2, each coupled to receive Data read Data such as from any one or more of buses BB, CB, DB. A set of Accumulator registers 3644 are coupled to the MACs 3642.1 and 3642.2, as well as to a pair of arithmetic logic units ALU1

3646.1, 3646.2 with associated shifters 3647.1, 3647.2, and to a Bit Operations Unit 3648. D Unit 3640 is divided into execute pipe stages as described later hereinbelow. D Unit 3640 is coupled to and supplies Data Write Data to buses EB and FB.

Figures 1, 5A:
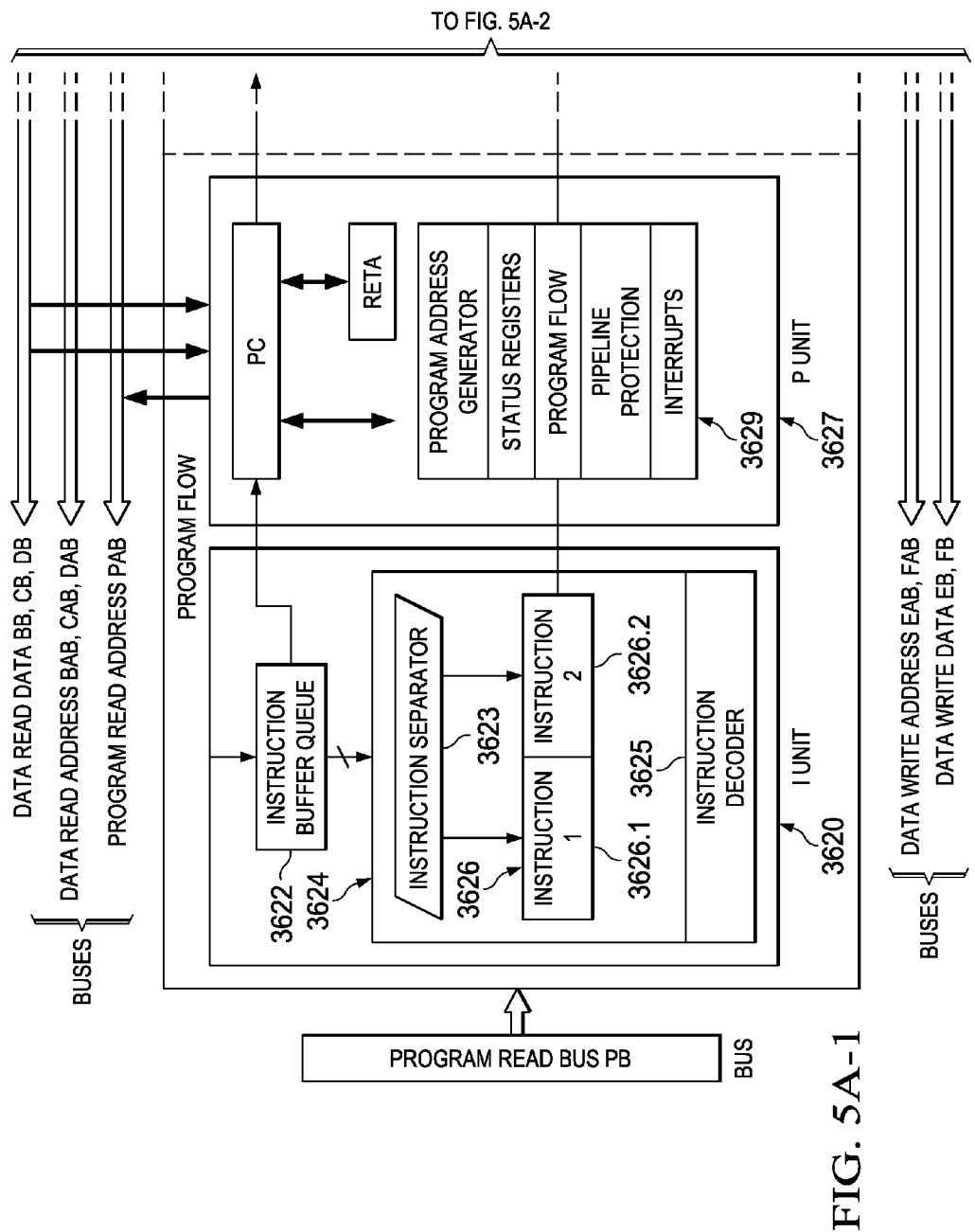
FIG. 5A is a block diagram of an inventive DSP core having repeat multiple instructions for use in FIG. 4, and FIG. 5A has drawing portions 5A-1 and 5A-2.
Figures 2, 5A:
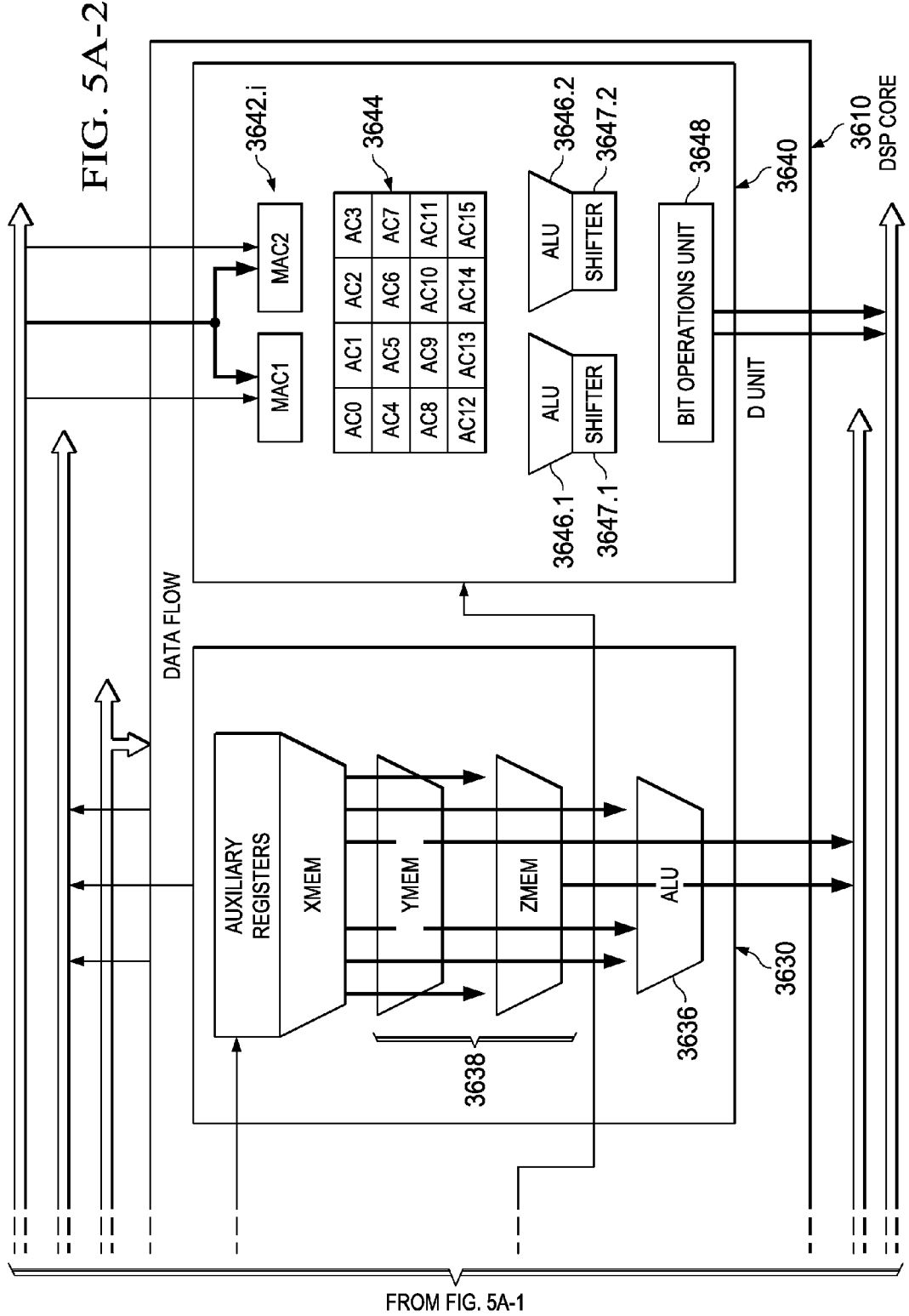

FIG. 5A depicts some parts of the circuitry of FIG. 5 in more detail, and for conciseness only the more detailed parts are described in connection with FIG. 5A. An Instruction Separator 3623 associated with Instruction Decoder Controller 3624 is fed from IBQ 3622. Instruction Separator 3623 delivers Instruction 1 and Instruction 2 to Instruction Register 1 (IR1) 3626.1 and Instruction Register 2 (IR2) 3626.2. Instruction Decoder 3625 decodes one or more of the instructions in Instruction Register 1 (IR1) 3626.1 and Instruction Register 2 (IR2) 3626.2. A Program Control block (P unit) 3627 includes a Program Address Generator to generate addresses for a Program Counter PC. One or more Return Address register(s) RETA acts as a Program stack and couples to the PC to support call and return from subroutine(s) that may be nested. Program Control (P unit) 3627 includes Status Registers, Program Flow circuitry as part of the pipeline from the IR1/IR2 to the execute pipe stages in D Unit 3640. Pipeline Protection circuitry provides for flush, replay and other pipeline management functions.

An Interrupt Control circuit 3629 vectors operations in response to any of plural interrupt inputs so that the Program Counter PC is loaded with the address of the initial instruction in the applicable interrupt service routine corresponding to the particular interrupt, and so that the Instruction Register(s) have the initial instruction itself entered (jammed) therein so that the applicable interrupt service routine commences.

In FIG. 5A, the A Unit 3630 has storage areas 3638 designated Xmem, Ymem, Zmem coupled with the Auxiliary Registers for data and addresses as well as coupled to one or more address generator ALU(s) 3636. FFT butterfly bit-reverse addressing is supported. In this way the A Unit 3630 has circuitry adapted to control the data flow for signal processing loops, transforms and their inverses, coding and decoding, compression and decompression, and image processing loops, and X/Y/Z three dimensional processing loops, among many other desirable high performance operations.

D Unit 3640 register block 3644 has a set of accumulator registers, e.g., designated AC0-AC15 coupled to ALUs 3646.i and shifters 3647.i and Bit Operations 3648 as well as to the Data Write Buses EB and FB. Bit Operations 3648 perform any of various logic operations on a bit-wise basis.

Figure 6:
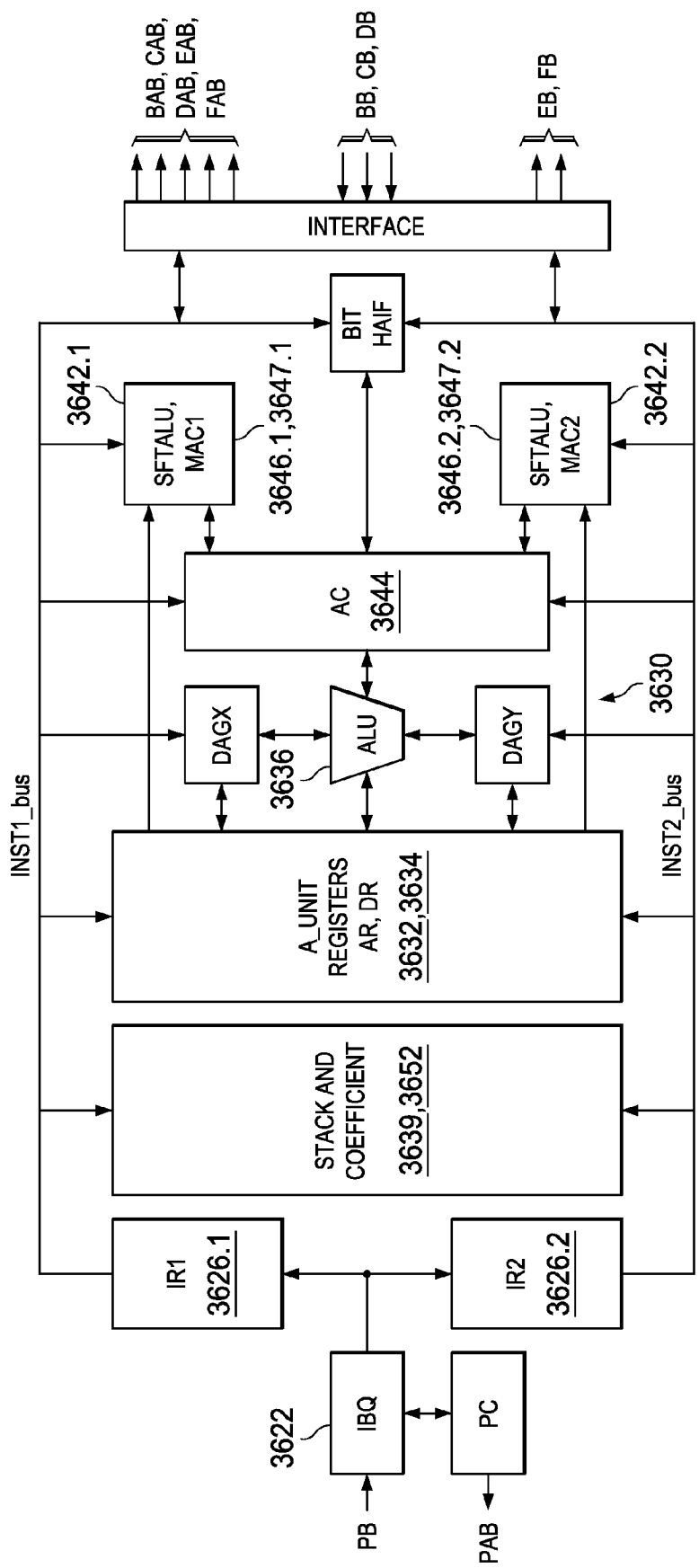
FIG. 6 is a block diagram of an inventive DSP core having repeat multiple instructions and dual issue architecture for use in FIG. 4.

In FIG. 6, some parts of the circuitry of FIG. 5 are depicted in more detail for a dual issue architecture, and for conciseness only the more detailed parts are described in connection with FIG. 6. Program Counter PC is coupled with the instruction unit so that jumps and calls are supported. Stack 3639 is also associated with a storage block for coefficients. A pair of buses INST1_bus and INST2_bus couples various parts of the pipeline together as shown. A Unit 3630 is shown with Data Address Generators DAGX and DAGY. A Hardware Accelerator Interface HAIF couples the DSP core to the Hardware Accelerator 3615 of FIG. 4. A Bus Interface block INTF couples the DSP core to the various buses for read and write operations.

Figure 7:
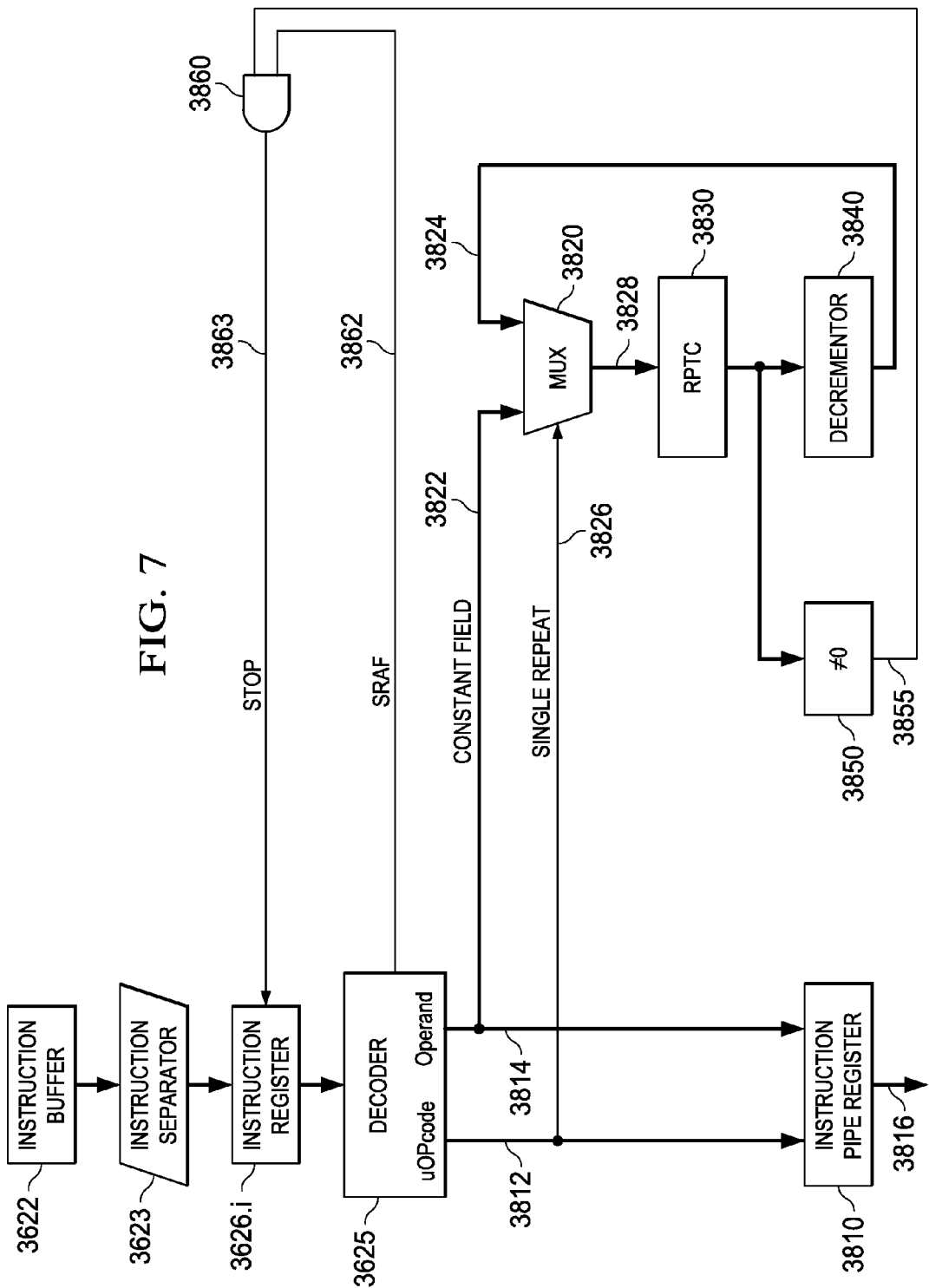
FIG. 7 is a partially block, partially schematic diagram of a circuit for single repeat instructions.

FIG. 7 shows a detail of a portion of I Unit 3620 that has circuitry to issue the same instruction identically a number of times, called Single Repeat. Instruction buffer 3622 is coupled by Instruction separator circuitry 3623 to Instruction Register(s) IR 3626.i, which in turn have their contents decoded by Instruction Decoder 3625. An instruction pipe register 3810 at the beginning of a pipeline is fed by microopcode (uOPcode) lines 3812 and instruction Operand lines 3814 and provides an output along lines 3816, whereupon the decoded instruction is carried into effect in piecemeal assembly-line fashion in various pipe stages of the pipeline as discussed in more detail in connection with FIGS. 9A-9E.

In FIG. 7, the Single Repeat circuitry has a mux 3820 feeding a Repeat Counter RPTC 3830, which in turn is coupled to both a decrementor 3840 and a Not-Zero detector 3850. Mux 3820 has first input lines 3822 which receive a Constant field or immediate operand n that is the operand of a Repeat instruction such as Repeat(#n). Mux 3820 has second input lines 3824 which are fed back from the output of the decrementor 3840. Mux 3820 has a selector control line 3826 labeled Single repeat. When a Single Repeat instruction uOPcode first emerges from Instruction Decoder 3625, the selector control line 3826 is active to cause mux 3822 couple the operand n to load repeat counter RPTC 3830 with the number n. Then mux 3820 has its selection changed to thereafter couple the decrementor 3840 and second input lines 3824 to mux 3820 output lines 3828 to the Repeat Counter RPTC 3830 on subsequent clock cycles until the Repeat counter RPTC 3830 counts down to zero.

In FIG. 7, during this time of downcounting in RPTC, the Instruction pipe register 3810 and the rest of the pipeline are concurrently being clocked, so that the decoded instruction from Instruction Decoder 3625 to which the Repeat pertains is repeatedly issued into the pipeline, thereby effectuating the Repeat instruction. To ensure that only one instruction is repeated, an AND-gate 3860 provides an active output on a STOP line 3863 to the Instruction Register IR to prevent new instructions from being entered into IR. The STOP output from AND-gate 3860 is active provided that both a Single Repeat Active Flag SRAF register bit from Instruction Decoder 3625 is active on a first input line 3862 to AND-gate 3860 and that an output from the Not-Zero detector 3850 is also active on a second input line 3855 to AND-gate 3860.

The Instruction Register IR 3626.i is controlled by the STOP so that the IR continues to hold a given instruction, such as Push or Pop, that is subject to the Repeat. Because the given instruction remains in the IR, the Instruction Decoder 3625 continues to output the same uOPcode corresponding to the given instruction which is to be repeated as long as Repeat Counter RPTC 3830 is down counting. When zero is reached in RPTC, the STOP from AND-gate 3860 is terminated, and the Instruction Register IR receives a subsequent instruction, and Instruction Decoder 3625 provides a subsequent corresponding uOPcode. The selector control associated with mux 3820 is then ready to detect that subsequent uOPcode. If the uOPcode is a Single Repeat at that time or at some later time, then circuits 3820, 3830, 3840, 3850 again cooperate and respond as just described.

In FIGS. 7 and 8A-8C, execute time increases in proportion to the repeat number in a repeat counter RPTC. A repeat instruction RPT sends an instruction kept in an instruction register IR multiple times to a pipeline as shown in FIGS. 9A-9E. Repeat counter RPTC is loaded when the repeat instruction RPT is decoded. When the value in repeat counter RPTC is not zero (/=0), instruction register IR update is stopped and keeps the instruction next after the repeat instruction RPT in software code from updating the IR.

For example, a signal STOP is applied to the IR when both the instruction decoder has a flag active indicative of a type of instruction from which update may need to be stopped (e.g. Single Repeat Action Flag SRAF) and the value in repeat counter RPTC is not zero. Concurrently, the instruction is repeatedly delivered to the instruction pipe register. Repeat counter RPTC is decremented at each cycle until it reaches zero, whereupon the STOP signal goes inactive and the IR is updated with a new instruction because the repeat instruction RPT generation is completed.

Execute time of the repeat instruction RPT is proportional or equal to the repeat number plus one. For example, in the case of a multiple push the execute time is proportional to (number_of_push+1). Stack size is user defined (software stack), not limited by hardware. Some embodiments are provided, situated, and operated near the circuitry where the instruction is decoded.

A single repeat instruction saves program space when a loop iterates one instruction, such as a computation in a digital filter, or initialization, e.g., zero-filling) of some memory region.

```
repeat(#count)
AC0 = AC0 + (*AR0+ * *AR1+) ; a multiply-and-accumulate instruction,
    fetching data from memory pointed to (register prefix *)
    by AR0 (address reg 0) and to by AR1,
    then AR0 and AR1 are auto-post-incremented
    (register suffix +).
``` is almost identical to the train of the repeated:

```
AC0 = AC0 + (*AR0+ * *AR1+) ; 1st time
AC0 = AC0 + (*AR0+ * *AR1+) ; 2nd
.
.
.
AC0 = AC0 + (*AR0+ * *AR1+) ; last
```

As between those two listings, when executed in the processor, the repeat instruction itself consumes a cycle. Summarizing, the repeat instruction saves many bytes in the code size, and acceptably incurs a cost of one execution cycle.

A memory-fill loop is represented by:

```
repeat(#n)
*AR2+ = #0   ; store value 0 to n+1 successive memory spaces
                starting from an address to which register AR2 points
                and auto-post-incrementing AR2.
```

Save/restore of a set of CPU registers to the stack could laboriously be coded as follows, at considerable cost in code size:

```
dbl(push(AC0))    ; push to stack a longword(32bit) which is
                    accumulator 0
dbl(push(AC1))
.
.
.
dbl(push(AC15)).
```

Suppose registers were mapped on the data memory space as Memory Mapped Registers (MMR) and sequential access to CPU registers were realized by using memory addressing mode. However, using such a memory addressing mode would take up one of the data address registers AR of FIG. 6 for pointing to each MMR address. An example below shows software code that might use MMR addressing for saving 16 address registers by taking up or occupying the AR0 data address register.

```
PSH AR0        ; Save address register 0 (AR0) at first
AR0 = *(AR15)  ; Load the address of AR15 to data address register
                 AR0
RPT #14        ; Repeat next instruction 15 times
PSH *AR0-      ; Decremented addressing points AR15, AR14,...AR1.
```

MMR mapping as described presents an inevitable difficulty of expandability, or issue of increasing the space for new registers. To map increased CPU registers on data memory space can lead to data memory allocation policy change. This policy change may force old codes developed by old policy to be modified. If some old CPU registers cannot be mapped, then upgrading software code in accordance with the policy change necessarily entails a tedious and burdensome revision of the software code so that those registers are still saved or restored one by one by corresponding upgrade instructions.

Some processors have a few scoreboard style multiple registers such as for a Load/Store instruction. But other processors have many more registers that vary generation by generation of processors. In one particular example of a processor addressed by some of the embodiments herein, more than 100 registers are to be saved, and the embodiments are applicable to smaller or larger numbers of registers.

By contrast, a code example using hardware of an embodiment can execute same thing by below code.

```
RPT #15        ; Repeat next instruction 16 times
PSH AR0        ; Saving AR15~AR0
```

In words, some embodiments herein single-repeat a push instruction (and pop also), which takes the register ID as an operand. Using an embodiment, suppose this piece of code is executed as follows, saving a great deal of code size:

```
repeat(#15)
    dbl(push(AC0))    ; repeated
```

However, without more, the repeated push instruction supported by the circuit of FIG. 7 would repetitively push the content of the one register identified in the instruction (e.g. AC0 sixteen times) when instead all of a set of registers AC0-AC15 are to be saved.

To solve this problem, some embodiments provide and execute a single-repeat-of-a-push wherein the static operand of the push instruction is automatically and sequentially offset with a decrementing value 15, 14, . . . , 2, 1, 0 during repetition. A repeat counter register RPTC 3830 in the CPU is augmented with hardware including Register ID Generation Logic 4010 of FIG. 8C. That register RPTC is loaded with an initial counter value and then decremented to zero, whereupon the zero signifies the end of repetition. In this way, one example of a counter circuitry operable to supply a varying counter value in a programmable range is shown. The register RPTC together with the decrementor 3840 act as one example of a bias value generator circuit. Register ID Generation Logic 4010 operates so that during each single repeat, a modified operand for the instruction is loaded to the instruction pipe register instead of the unchanging operand in the original instruction. In this way the modified operand has a repeatedly changing value varying over an operand value range determined as a function of the counter value varying over the programmable range, so that a series of instructions in effect are automatically generated.

Using the code "repeat (#15) dbl (push (AC0))", now supported by the hardware of FIG. 8, the instruction unit issues a succession of push instructions with varying operand values to the execution pipeline while saving considerable cost in code size.

--- repeat(#15)
dbl(push(AC15))   ; the first repetition; the original operand in instruction which is AC0 when offset by 15 delivers results into AC15
dbl(push(AC14))
.
.
.
dbl(push(AC0))

---

A given one instance of push instruction generated from this stored instruction code "repeat (#15) dbl (push (AC0))" in the code memory is thus repeated in actual operation by being replicated into multiple issued instructions supplied into the pipeline for execution. The repeat instruction provides the number 15 to program the range of counting for register RPTC. The dbl push instruction has an associated operand AC0 that is used together with the varying counter value of RPTC to vary the operand of instruction dbl push over its desired operand value range AC15, . . . AC0.

Figure 8A:
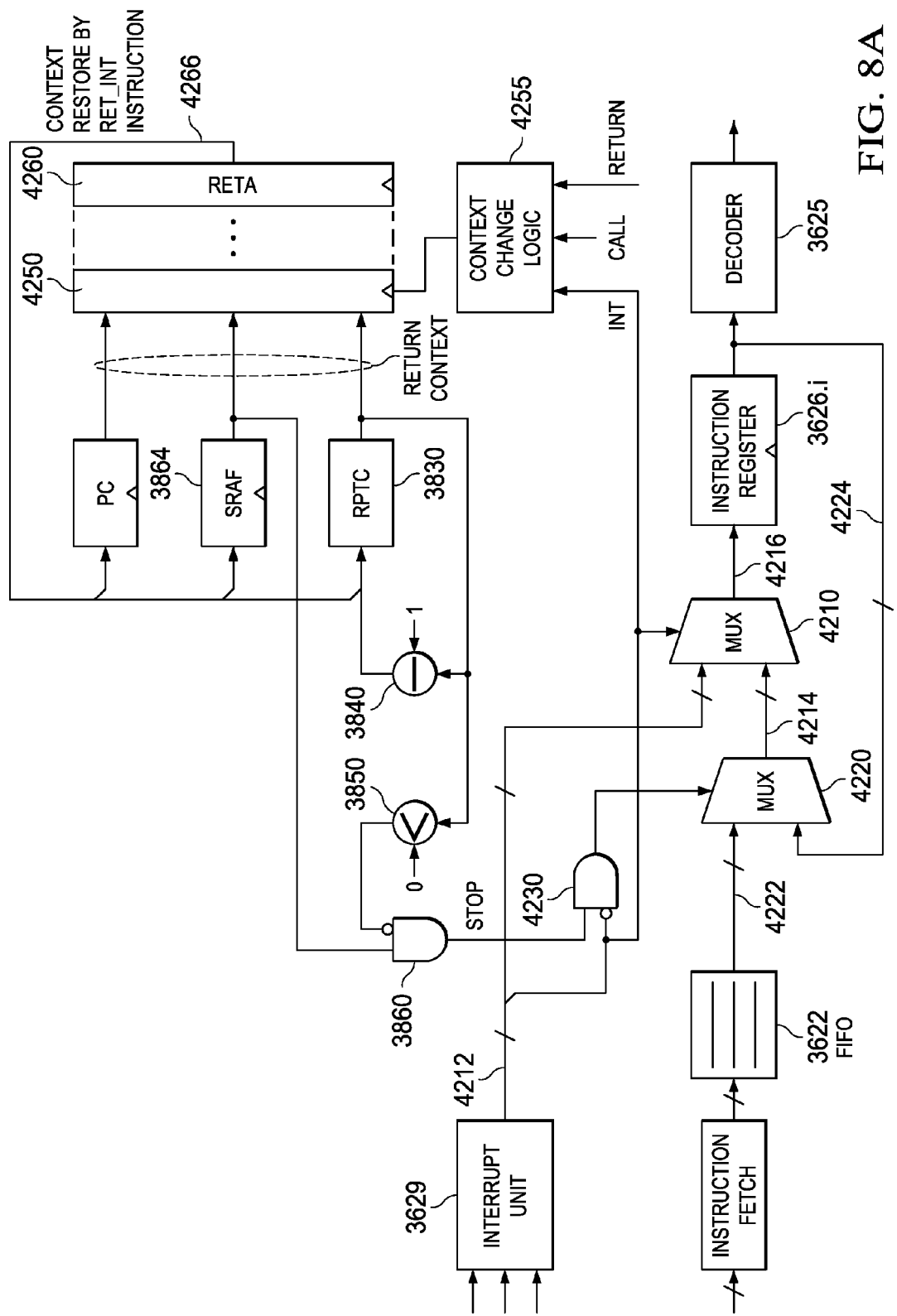
FIGS. 8A-8B illustrate a partially block, partially schematic diagram of an inventive circuit for inventive repeat multiple push pop instructions.
Figure 8B:
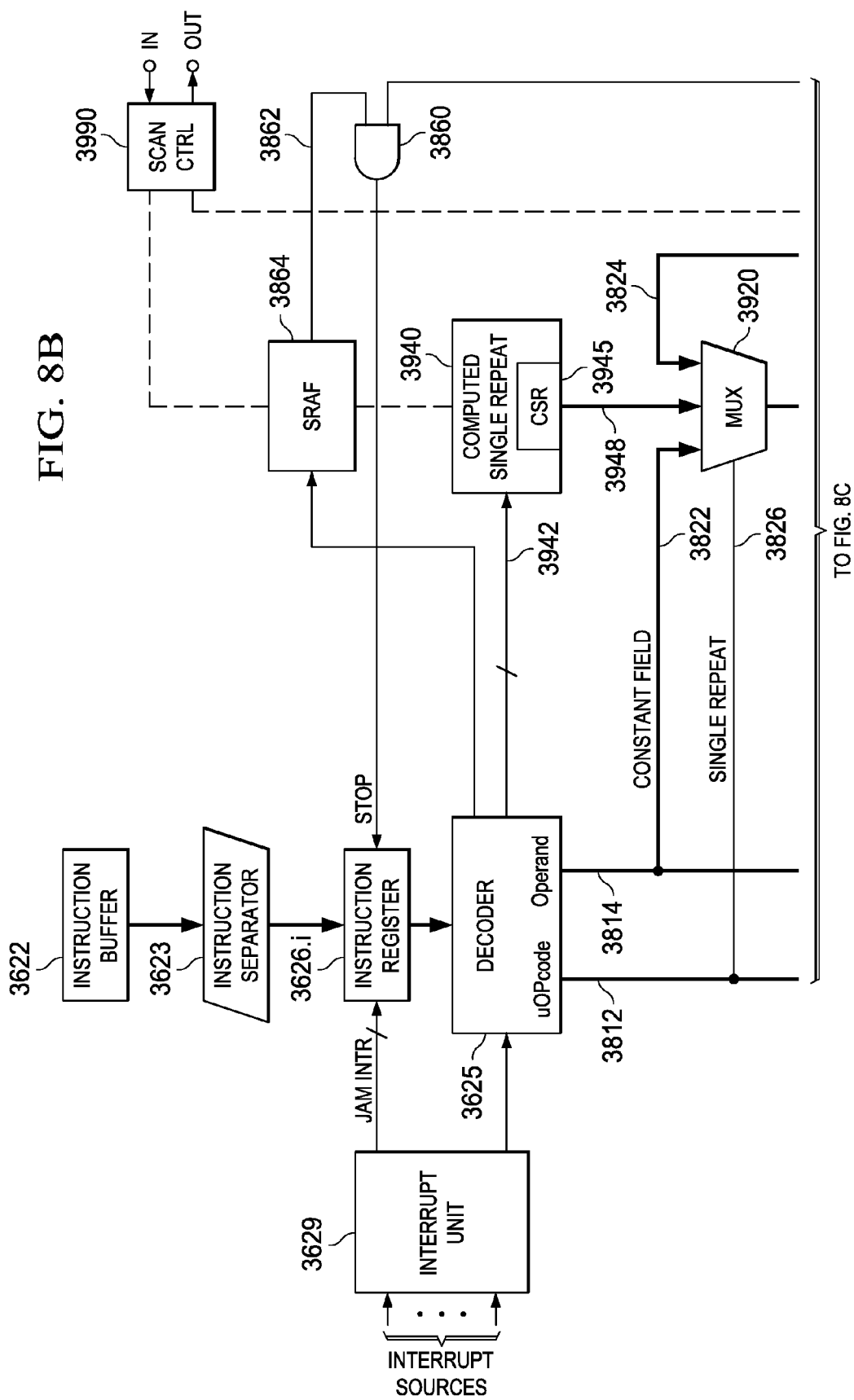
Figure 8C:
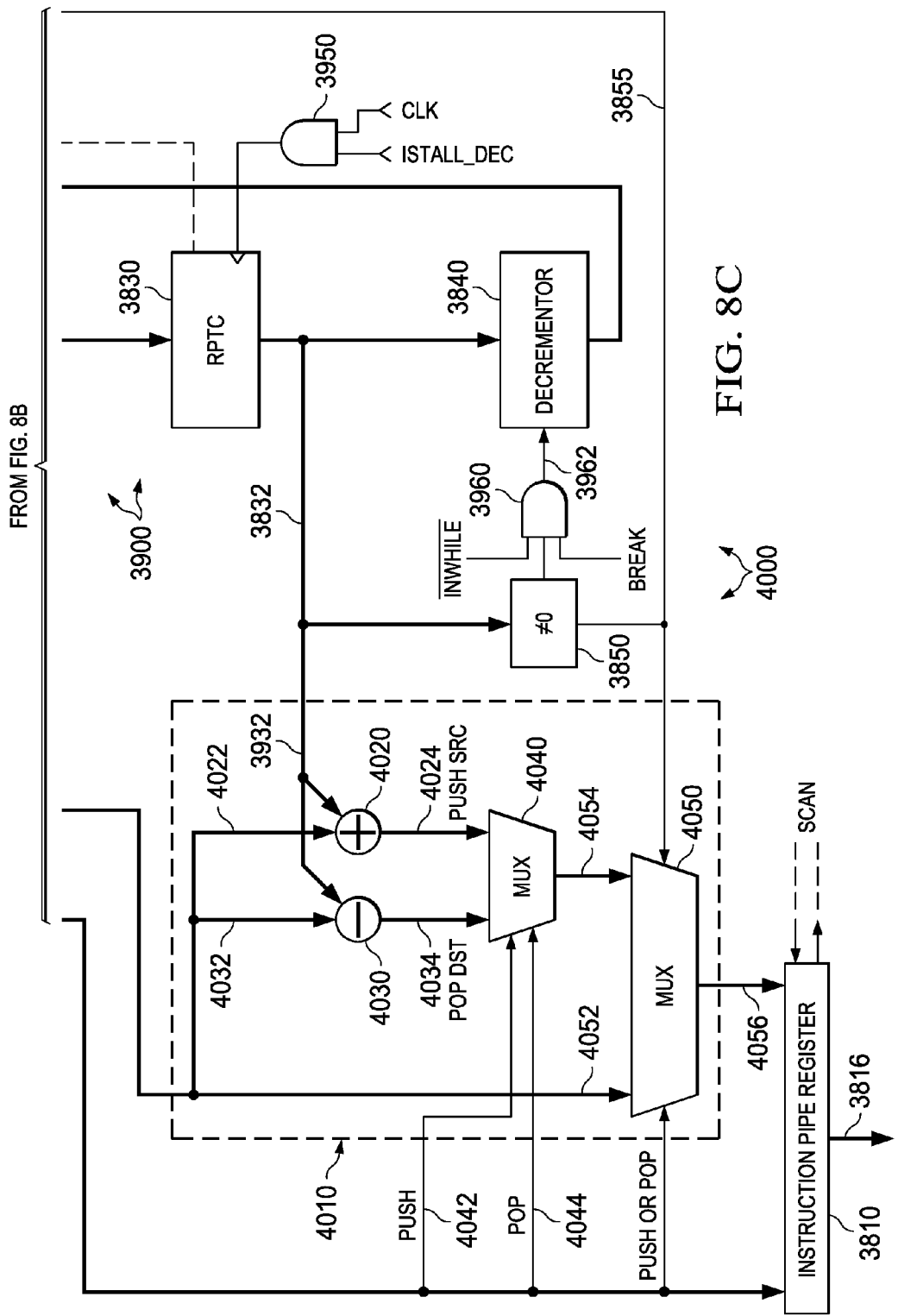

In FIGS. 8A-8C and 9A and 9B, some processors have many register files that are to be saved or restored when context switching is requested. And the code size that is necessary for saving or restoring those registers gets bigger as the number of registers increases and a processor architecture gets more extensive. FIGS. 8A-8C show an embodiment that can forestall this code size increase and has future expandability.

The processor has an instruction to store register content to top-of-stack (PSH) and load register from top-of-stack (POP). And the processor has an instruction that repeats next instruction N+1 times (RPT). At the repeat, RPTC (dedicated register for single repeat) is initialized by N and decrements once for each instruction execution in the repeat sequence.

The concept is here introduced of Register Space which contains some set of the CPU registers, or all CPU registers, regardless of its register group. Any CPU register is assigned its own Register ID (RegID) and mapped onto the Register Space.

Also introduced are remarkable PSH and POP instructions that can take the all CPU registers as their source or destination field (PSH RegID, POP RegID). And when that is repeated, the source or destination RegID field of that instruction is modified at instruction decode phase by adding or subtracting the value of RPTC. In an example of the repeat process and structure, the syntax PSH RegID actually works as PSH RegID plus RPTC value, PSH(RegID+RPTC), and POP RegID actually works as POP RegID minus RPTC value, POP(RegID-RPTC).

In FIGS. 8B-8C a detailed repeating instruction circuitry embodiment 4000 is responsive to both the repeat instruction RPT and repeated instruction PSH or POP for performing this remarkable operational process and may be compared with the circuitry of FIG. 7. For conciseness, the description FIGS. 8B-8C build on the description of corresponding parts that have already been described in connection with FIG. 7. In FIGS. 8B-8C, an electronic circuit 4000 has a bias value generator circuit 3900 and a RegisterID Generation Logic 4010. RegisterID Generation Logic 4010 includes an Adder 4020 having output lines 4024 coupled to a first input of a mux 4040, and also includes a Subtracter 4030 analogously having output lines 4034 coupled to a second input of the mux 4040. Mux 4040 has selector controls that are responsive to uOPcodes of instructions like Push and Pop, or Load and Store, etc, that are the inverse of each other.

In FIG. 8C, Repeat Counter RPTC 3830 lines 3832 are extended as lines 3932 to respective first inputs of Adder 4020 and Subtracter 4030. Also the Operand output lines 3814 from Instruction Decoder 3625 are extended as lines 4022 and 4032 to respective second inputs of Adder 4020 and Subtracter 4030. In this way, Adder 4020 delivers the desired sum on line 4024 so that PSH RegID actually works as PSH RegID plus RPTC value. Moreover, Subtracter 4030 delivers the desired difference on line 4034 so that POP RegID actually works as POP RegID minus RPTC value. If uOPcode represents a Push on a selector control lines 4042, then the mux 4040 couples the output of Adder 4020 as a Source Identification SrcID value to the output of mux 4040 coupled to first input lines 4054 of a mux 4050. If uOPcode represents a Pop on selector control lines 4044, then the mux 4040 couples the output of Subtracter 4030 as a Destination Identification DstID value to the output of mux 4040 coupled to first input lines 4054 of mux 4050. Mux 4050 also has second input lines 4052 that extend from Operand lines 3814. Both Source Identification SrcID value and Destination Identification DstID value are names for Register ID RegID Operand values used in different ways later in a pipeline.

In FIG. 8C, Repeat counter RPTC 3830 is coupled to decrementor 3840 and to muxed adder 4020, subtracter 4030 so that the bias value in RPTC 3830 and the Operand value delivered to Instruction Pipe Register 3810 are varied jointly. The varying Operand value is provided by the hardware of FIG. 8C in response to the repeated instruction that itself has the Operand. The Operand value provided by the hardware of FIG. 8 is reversibly varied in a direction depending on whether the repeated instruction performs save or restore. The Operand value is varied as a function of the varying bias value represented in register RPTC 3830. The Operand value is varied in an operand value range equal to the repeat number #n originally stored in register RPTC 3830. No translator or translation of any macro instruction to a micro instruction is necessary to obtain the repeated instruction with its varying operand values. If the Repeat instruction is not listed with the repeated instruction, then the repeated instruction executes once with the Operand value that comes with the repeated instruction itself. That is, if the Repeat instruction is absent, the repeated instruction is simply issued with the Operand once and not varying.

Mux 4050 has a selector control responsive so that if the repeated instruction opcode uOPcode is either Push OR Pop, then mux 4050 couples mux 4040 via first input lines 4054 to an output 4056 of mux 4050 coupled to Instruction pipe register 3810. In this way Instruction pipe register 3810 receives either a Source Identification SrcID value if the instruction is a Push or receives a Destination Identification DstID value if the instruction is a Pop. If the instruction is neither a Push nor a Pop, nor any other instruction improved by the teachings herein to which the mux 4040 output is relevant, then the selector controls for mux 4050 perform default selection and couple the Operand input 4052 through mux 4050 to the Instruction pipe register 3810, as if the rest of the RegisterID Generation Logic 4010 were absent.

FIG. 8B also shows a Interrupt Unit 3629 coupling Interrupt Sources to enter a first instruction of an interrupt service routine via jam interrupt lines JAM_INTR to Instruction Register IR and to enable the Instruction Decoder for decoding thereof Also in FIG. 8B, a Computed Single Repeat block 3940 is responsive to lines 3942 from Instruction Decoder 3625 to configure a Register CSR 3945 with a Computed Single Repeat value. This CSR value is coupled to a third input 3948 of mux 3920. The selector controls of mux 3920 are augmented so that when a repeat instruction calling indirectly for the use of whatever value has previously been entered in the register CSR 3945 is to be used as the repeat #n=CSR, then the mux 3920 couples CSR 3945 via third input 3948 to the Repeat Counter RPTC 3830.

Further in FIG. 8C, clock control for the Repeat Counter RPTC 3830 and for decrementor 3840 is explicitly provided by an AND-gate 3950. Notice that decrementor 3840 is one example of a count-changing circuit that establishes the direction of counting as down counting. AND-gate 3950 has a first input for clock CLK and a second input for gating the clock in accordance with a stall signal ISTALL_DEC. RPTC is part of the bias value generator circuit that has AND-gate 3950 and its second input for the stall signal. The circuit is responsive to the stall signal when active at the stall signal input to supply the bias value currently reached in counter register RPTC without further varying the bias value while the stall signal is active. The stall signal ISTALL_DEC is activated for instance when a context switch is needed in the midst of execution of a multiple push or multiple Pop instruction. A context switch may be applied, for instance, when a higher priority application or interrupt is effectuated. AND-gate 3950 and stall signal ISTALL_DEC are used to respond to any instance of pipeline stall in which the counter RPTC 3830 is to be stalled as well. Halting the processor for power management or other purposes is also facilitated by AND-gate 3950 and stall signal ISTALL_DEC.

Another AND-gate 3960 further controls clock and ends decrementing by decrementor 3840. AND-gate 3960 and operates so that if any of the following conditions occur, decrementor 3840 operation is suspended or terminated: 1) Not-Zero detector 3850 detects that Repeat Counter RPTC value has reached zero, 2) a processor Break signal is active, 3) active state of a low-active signal INWHILE/ generated elsewhere in the processor in response to duration of a predetermined condition in a status register or otherwise.

In FIGS. 8B-8C, for example, when saving 16 data address registers to the stack, RPT #15; Repeat next instruction 16 times
PSH AR0; Push data address register 0, RegID=x0h where x is a predetermined bit field that depends on implementation and represents the particular register.

The above set of instructions execute the instruction "PSH AR0" differently each time for 16 times and produce a succession of sixteen PSH instructions. Here, the operand RegID field of "PSH AR0" is x0h. At the first iteration, RPTC shows decimal number 15. Its RegID field of the instruction is modified as RegID+RPTC, generates RegID=xFh where xFh is the hexadecimal RegID of AR15.

Then the example instructions "RPT #15, PSH AR0" use the circuitry of FIGS. 8B-8C in response to active PUSH line 4044 to generate the following 16 different instructions.

| | |
|---|---|
| PSH AR15 | ; RegID field = x0h and RPTC = 15, generates RegID = xFh |
| PSH AR14 | ; RegID field = x0h and RPTC = 14, generates RegID = xEh |
| . | |
| . | |
| . | |
| PSH AR1 | ; RegID field = x0h and RPTC = 1, generates RegID = x1h |
| PSH AR0 | ; RegID field = x0h and RPTC = 0, generates RegID = x0h |

In FIGS. 8, 8A and 9, when restoring a context, the following code is used:

RPT #15
POP AR15; Pop data address register 15, RegID=xFh,

The stack operates as a Last In First Out (LIFO) memory so the operation is done in the reversed order. The operand RegID field is modified as RegID-RPTC.

Then, above set of instructions "RPT #15, POP AR15" uses the circuitry of FIGS. 8B-8C in response to active POP line 4042 to generate a series or succession of sixteen (16) different POP instructions with POP operand values varying in reverse (AR0-AR15) compared to the varying operand values (AR15-AR0) for Push. There is no need to change pre-existing bus widths with these modified instructions unless it is desired to reduce context switching latency an increase data transfer rates generally using extended bus widths.

| | |
|---|---|
| POP AR0 | ; RegID field = xFh and RPTC = 15, generates RegID = x0h |
| POP AR1 | ; RegID field = xFh and RPTC = 14, generates RegID = x1h |
| . | |
| . | |
| . | |
| POP AR14 | ; RegID field = xFh and RPTC = 1, generates RegID = xEh |
| POP AR15 | ; RegID field = xFh and RPTC = 0, generates RegID = xFh |

Stack size is defined by an allocation of adequate memory bytes for data, memory bytes for program code, and memory bytes for stack. Some embodiments e.g., "repeat (#n) dbl (push/pop (AC0))" desirably provide a compression of program code in the program memory compared to the amount of program memory bytes that would otherwise be used for an explicitly-lengthy block of code such "dbl (push/pop (AC15)), dbl (push/pop (AC14)), . . . dbl (push/pop (AC0))". In some embodiments, the repeat parameter n can be revised in a parameter memory referenced by the repeat instruction RPT, and such revision inexpensively and effectively accommodates system upgrades.

In some other embodiments tabulated in TABLES 3 and 4 herein below, the scope of the registers intended to be covered by a multi-push or multi-pop instruction is abstractly represented by mnemonics like ALL, RLH, or XR, etc. instead of using a repeat number n. The decoding hardware in each hardware upgrade or generation of a processor automatically executes the tabulated instruction syntax to cover the scope of registers applicable to that generation of the processor.

The multiple push and multiple pop and other multiple instructions herein are applicable to data unit DU, address unit AU, memory spaces and to all other units and pipeline stages to which their advantages make them applicable.

FIG. 8A provides further detail pertaining to interrupts and context save/restore associated with and building on the circuitry shown in FIG. 5A and FIGS. 8A-8B. Notice that when Single Repeat Active Flag SRAF and the Not-Zero detector 3850 are both active, the AND-gate 3860 output supplies the STOP signal to a first input of another AND-gate 4230. Detector 3850 is for example shown as a less-than-zero detector. A low-active, second input of AND-gate 4230 is disabled by a high active interrupt request delivered from Interrupt Control circuit 3629. A first interrupt instruction for the corresponding interrupt routine comes from path 4212 from Interrupt Control circuit 3029 and is fed to a first input of a mux 4210. If the interrupt is sufficiently high in priority relative to the active routine then the interrupt request line INT is high active at the selector input of mux 4210, and mux 4210 couples the interrupt instruction from path 4212 to mux output 4216 to Instruction Register 3626.i for Instruction Decoder 3625. A second input of mux 4210 receives the output of a mux 4220. Mux 4220 has its selector control driven by the AND-gate 4230. Mux 4220 has a first input 4222 fed by instruction fetch as buffered by instruction queue 3622. Mux 4220 is part of more complex circuitry of instructions separator 3623 the details of which are omitted for clarity.

A second input 4224 of mux 4220 receives the current contents of Instruction Register IR 3626.i. In an aspect of the FIG. 8A circuit operation, an active STOP enables AND-gate 4230 to cause mux 4220 to select that second input 4224, instead of a subsequent fetched instruction from FIFO 3622, provided there is no interrupt request active on line INT. When mux 4220 selects second output 4224 in response to STOP, it causes the current contents of Instruction Register IR 3626.i to be fed back into Instruction Register IR, thereby effectively freezing the IR and stopping update thereof so that the multiple push/pop instruction uOPcode can be repeatedly delivered clock cycle after clock cycle to the pipeline.

Further in FIG. 8A, the Single Repeat Active Flag SRAF is saved as part of the context, along with the Program Counter PC value to form the return context or part thereof for use herein. The save is suitably made by a context saving circuit, for example a stack including a stack input register 4250. Context save is performed at interrupt, or subroutine call, or virtual machine context switch, or otherwise, by a push to stack input register 4250. The register RETA 4260 of FIGS. 8A-8B and FIG. 5A in due course is subject to a context-restoring read return or a return-from-interrupt RET_INT instruction.

Context change logic 4255 pulses the stack for pushing and popping the stack in response to inputs such as Call, Return, and Interrupt Request as shown in FIG. 8A. Accordingly, not only is the original program address returned to the Program Counter PC but also the saved state of the Single Repeat Active Flag SRAF is returned on lines 4266 to the SRAF register. The Repeat Counter RPTC 3830 is also coupled to and saved onto the stack via stack input register 4250 and restored via RETA 4260 as part of the context so that if a multiple push pop instruction, for instance, were in progress when the context save occurred, then the multiple push/pop instruction benefits from the context restore and resumes from the point where it left off.

In this way, the instruction circuit is operable over a time interval to repeatedly issue the repeated instruction with its Operand thus varied, and the instruction circuit is interruptible prior to completion of the time interval to issue an interrupt instruction and further operable to subsequently resume from the interruption and complete the repeatedly issuing of the second instruction with the Operand varied in an operand value range determined as a function of the varying bias value.

FIG. 8A illustrates an embodiment of a single-repeat mechanism with interrupt support. Circuitry to feed the input side of the instruction register 3626.i is also shown. The DSP core has a FIFO (first-in first-out) buffer IBQ 3622 for instructions, from which one (pair of) instruction(s) is taken. In a first cycle, a first instruction in the pair is then passed to instruction register IR 3626.1, and in a second cycle, the second instruction in the pair is passed to instruction IR 3626.2. This process is called sequential dispatching herein.

The IBQ 3622 FIFO desirably absorbs the gap between fixed-width instruction fetch and variable-length instruction dispatch.

Once a single-repeat instruction is decoded, the processor then freezes instruction register IR 3626.1, for instance, by holding the repeated instruction content in the IR 3626.1 for multiple cycles. This freeze operation is symbolized by the feedback path from IR via line 4224, mux 4220, mux 4210, and back to IR. During this repeat process, RPTC is decremented toward zero (0). A logic gate 3860 performs an AND function represented by SRAF (single repeat active flag) AND (RPTC>0)

When that logic function is True (AND-gate 3860 output active), the circuit thereby determines if repeat is ongoing and should continue. The AND circuit 3860 supplies STOP to AND-gate 4230 that controls multiplexer 4220 coupled after the instruction FIFO. The multiplexer 4220 selectively controls and delivers either a new instruction from IBQ 3622 or delivers a repeated instruction, when that logic function is true, to mux 4210 to feed the instruction register IR.

Now suppose an interrupt request is presented at mux 4210. The processor desirably hangs up the repeat process in the sense of interrupting execution of the repeat process and saving its context for resumption later. The processor then serves the interrupt by coupling an interrupt-related instruction from interrupt control circuit 3629 via mux 4210 to IR and executing the associated interrupt service routine ISR. Then when a return from interrupt is executed, the processor restores the context of the repeat process and resumes the repeat process. (It should be understood that some embodiments alternatively flush IBQ 3622 and load the ISR through IBQ 3622.)

The interrupt request de-freezes IR using mux 4210. At the same time, the interrupt request loads specific instruction(s) designated INTR into instruction register IR. Instruction(s) INTR saves a return context for the interrupt software, then saves SRAF and PC to RETurn Address register RETA, and invokes a branch to an interrupt service routine. (INTR itself can include a multiple push as taught herein.)

At this point the value in register SRAF 3864 representing repeat-active (e.g. a one bit) is packed into the return context. At the same time SRAF itself is cleared to prevent further decrementing of RPTC.

The interrupt service routine ends with a RET_INT instruction, with which SRAF is restored, then the first instruction loaded into IR (which is the very instruction that was repeated) will be again repetitively processed (until RPTC reaches 0; during CPU's executing the interrupt service routine SRAF is 0 thus RPTC is not decremented). If some instruction is repeated in the interrupt service routine, then SRAF is set and the repeat instruction in the ISR loads the RPTC. A repeat multiple pop can be used to restore the context of the interrupted code as well.

TABLE 3

PUSH TO STACK INSTRUCTIONS

| no: Syntax | Symbolic | Size | DAG mode |
|---|---|---|---|
| 1: push(ALLa) | PSHR_SPW | 2 | StackW |
| 2: dbl(push(ALLa)) | PSHR_SPW | 2 | StackWW |
| 3: push(Smem) | PSHD_ | 3 | SingleR_StackW |
| 4: push(dbl(Smem)) | DPSHD_ | 3 | SingleRR_StackWW |
| 5: push(RLHa, Smem) | PSHRD_ | 4 | SingleR_StackWW |
| 6: push(RLHa, RLHb) | PSHR_RR | 3 | StackWW |

TABLE 3-continued

PUSH TO STACK INSTRUCTIONS

| 7: pshboth(XRa) | SPSHR_SSPW | 2 | StackWW |
|---|---|---|---|
| Operands | Registers Represented | | |
| ALLx | ALL CPU architecture registers (see "Logical load") | | |
| RLHx | AR[0 . . . 15], T[0 . . . 3], AC[0 . . . 15].H, AC[0 . . . 15].L | | |
| XRx | AC[0 . . . 15], XAR[0 . . . 15], XSSP, XSP, XDP | | |
| Smem | Word single memory access (write W or read R) | | |
| dbl(Smem) | Long word single memory access(write WW or read RR) | | |

In TABLE 3, the instructions perform a respective Push to Top Of Stack operation, and have a word pointer mode and a byte pointer mode as alternative modes, for instance. In the operations represented next, XSP is the extended data stack pointer (position), and *XSP is the stack space at the position to which pointer XSP points. HI and LO represent high and low words or the first and second halves of a long word.

When in the word pointer mode of PUSH, some embodiments operate as shown in TABLE 3A, see corresponding enumeration in the Syntax TABLE 3 above.

TABLE 3A

WORD POINTER MODE OF PUSH

1: XSP <- XSP − 1
  *XSP <- ALLa          (ALLa is any of the single word registers)
2: XSP <- XSP − 2
  *XSP <- ALLa.H,  *(XSP+1) <- ALLa.L (ALLa is any of the long word registers)
3: XSP <- XSP − 1
  *XSP <- Smem
4: XSP <- XSP − 2
  *XSP <- HI(Smem), *(XSP+1) <- LO(Smem)
5: XSP <- XSP − 2
  *XSP <- RLHa, *(XSP+1) <- Smem
6: XSP <- XSP − 2
  *XSP <- RLHa, *(XSP+1) <- RLHb
7: XSSP <- XSSP − 1, XSP <- XSP − 1
  *XSSP <- XRa.H, *XSP <- XRa.L When in the byte pointer mode of PUSH, the pointer value XSP is twice as large and the decrements are twice as large as in word mode. This is because a word is twice as large as a byte here. The corresponding operations on the same operands are as shown in TABLE 3B:

TABLE 3B

BYTE POINTER MODE OF PUSH

1: XSP <- XSP − 2
  *XSP <- ALLa          (ALLa is any of the single word registers)
2: XSP <- XSP − 4
  *XSP <- ALLa.H, *(XSP+2) <- ALLa.L (if ALLa is any of the long word registers)
3: XSP <- XSP − 2
  *XSP <- Smem
4: XSP <- XSP − 4
  *XSP <- HI(Smem), *(XSP+2) <- LO(Smem)
5: XSP <- XSP − 4
  *XSP <- RLHa, *(XSP+2) <- Smem
6: XSP <- XSP − 4
  *XSP <- RLHa, *(XSP+2) <- RLHb
7: XSP <- XSP − 4
  *XSP <- XRa.H, *(XSP+2) <- XRa.L The instructions of TABLES 3, 3A, 3B perform various forms of a PUSH operation. Operand(s) such as a CPU register (e.g., ALLx, RLHx, XRx) or a data memory location addressed by Smem is moved to a data memory location addressed by XSP (and XSSP). If the source is a member of ALLa, (e.g., includes RLHa, XRa), a memory store is performed that is the same as a Store instruction. For instruction #1 and #2, when it is used in the single repeat loop, multiple CPU registers are pushed sequentially.

An instruction push(regID) when repeated works additively as pseudocode "push(regID+RPTC)" in a repeat loop, and uses adder "(+)" of FIG. 8C to provide source identification SrcID for push.

Example:

repeat(#15)
    dbl(push(AC0))
In first iteration, AC0 + #15 is AC15, thus AC15 is pushed.
In second iteration, AC0 + #14 is AC14, thus AC14 is pushed.
. 
.
.
In last iteration, AC0 + #0 is AC0, thus AC0 is pushed.

Some processor embodiments are dual issue as in FIG. 6 and have a wide instruction register having a respective instruction slot 1 and an instruction slot 2 to hold two instructions that can be issued simultaneously. The multi-push scheme is applicable, for example, if the instruction is in the instruction slot 1 ("1st Instruction" in FIG. 5A) of a dual issue processor. During multi-pop, a generated register identification regID remains within the boundary between single word register and long word register. The multi-pop instruction operates on single word registers or long word registers but not both in the same multi-pop instruction in this example, although hybrid instructions for different register lengths in the same instruction are also contemplated.

Different dual issue processor embodiments can utilize different embodiments of circuitry as regards the matter of entering the multi-push or multi-pop instruction into the wide instruction register and whether to enter it if another type of instruction occupies instruction slot 1. Multi-push and multi-pop instructions (instruction #1 and #2) in this particular example are not used as the slot 2 instruction in the single repeated instructions having a wide instruction register for plural instructions held in slots of the wide instruction register, although alternative embodiments can be arranged to operate differently. Some embodiments replicate the circuitry of FIG. 8 and integrate it with the pipeline structure so that multi-Push and multi-Pop are operable for each of two or more pipelines servicing one thread or plural threads concurrently.

For instruction type #7, when in the byte pointer mode, operation is same as instruction #1 or #2. When stack configuration is 32 bit stack mode, For instruction #1, #2, #3, #4, #5 and #6, same amount of decrement is applied to XSSP. For instruction #7, when in the byte pointer mode, same amount of decrement (−4) is applied to XSSP.

TABLE 4

POP FROM STACK INSTRUCTIONS

| no: Syntax | Symbolic | Size | DAG mode |
|---|---|---|---|
| 1: ALLa = pop( ) | POPR_SPR | 2 | StackR |
| 2: ALLa = dbl(pop( )) | POPR_SPR | 2 | StackRR |
| 3: Smem = pop( ) | POPD_ | 3 | SingleW_StackR |
| 4: dbl(Smem) = pop( ) | DPOPD_ | 3 | SingleWW_StackRR |
| 5: RLHa, Smem = pop( ) | POPRD_ | 4 | SingleW_StackRR |

TABLE 4-continued

POP FROM STACK INSTRUCTIONS

| 6: RLHa, RLHb = pop( ) | POPR_RR | 3 | StackRR |
|---|---|---|---|
| 7: XRa = popboth( ) | SPOPR_SSPR | 2 | StackRR |

| Operand | Registers Represented |
|---|---|
| ALLx | ALL CPU architecture registers (see "Logical load") |
| RLHx | AR[0 ... 15], T[0 ... 3], AC[0 ... 15].H, AC[0 ... 15].L |
| XRx | AC[0 ... 15], XAR[0 ... 15], XSSP, XSP, XDP |
| Smem | Word single memory access (write W and read R) |
| dbl(Smem) | Long word single memory access (write WW and read RR) |

These instructions in TABLE 4 perform Pop from Top Of Stack operation in a single cycle and have a word pointer mode and a byte pointer mode analogous to such modes for the Push to Top of Stack operation of TABLE 3 but performing operations in reverse.

When in the word pointer mode of POP, some Pop embodiments operate as shown in TABLE 4A. See corresponding enumerated operations in the Syntax TABLE 4 above.

TABLE 4A

WORD POINTER MODE OF POP

```
1: ALLa <- *XSP
   XSP <- XSP + 1          (ALLa is any of the single word registers)
2: ALLa.H <- *XSP, ALLa.L <- *(XSP+1)
   XSP <- XSP + 2          (ALLa is any of the long word registers)
3: Smem <- *XSP
   XSP <- XSP + 1
4: HI(Smem) <- *XSP, LO(Smem) <- *(XSP+1)
   XSP <- XSP + 2
5: RLHa <- *XSP, Smem <- *(XSP+1)
   XSP <- XSP + 2
6: RLHa <- *XSP, RLHb <- *(XSP+1)
   XSP <- XSP + 2
7: XRa.H <- *XSSP, XRa.L <- *XSP
   XSSP <- XSSP + 1, XSP <- XSP + 1
```

When in the byte pointer mode of POP, some other Pop embodiments operate as shown in TABLE 4B:

TABLE 4B

BYTE POINTER MODE OF POP

```
1: ALLa <- *XSP
   XSP <- XSP + 2          (ALLa is any of the single word registers)
2: ALLa.H <- *XSP, ALLa.L <- *(XSP+2)
   XSP <- XSP + 4          (ALLa is any of the long word registers)
3: Smem <- *XSP
   XSP <- XSP + 2
4: HI(Smem) <- *XSP, LO(Smem) <- *(XSP+2)
   XSP <- XSP + 4
5: RLHa <- *XSP, Smem <- *(XSP+2)
   XSP <- XSP + 4
6: RLHa <- *XSP, RLHb <- *(XSP+2)
   XSP <- XSP + 4
7: XRa.H <- *XSSP, XRa.L <- *(XSP+2)
   XSP <- XSP + 4
```

The instruction types of TABLES 4, 4A, 4B perform a POP operation. A data memory location *XSP addressed by pointer XSP (or *XSSP by XSSP) is moved to a CPU register or data memory location addressed by Smem.

If the destination is a member of register group ALLa (includes RLHa, XRa), then a register update is performed and is same as a Logical load (copy) instruction.

For instruction #1 and #2, when it is used in the single repeat loop, multiple CPU registers are popped sequentially.

Syntax "regID=pop( )" works subtractively as "regID–RPTC=pop( )" in the loop. Expressed in other symbolism, an instruction pop(regID) when repeated works as pseudocode "pop(regID–RPTC)" in a repeat loop, and uses subtractor "(−)" of FIG. 8C to provide destination identification DstID for pop. A multiplexer Mux selects the output of adder "(+)" or subtractor "(−)" of FIG. 8C, depending on whether Push or Pop is involved as opcode in the repeat instruction. In FIG. 8C, a succeeding Mux is controlled by repeat active flag SRAF register to deliver an operand directly from the Decoder or to deliver the output of the adder/subtractor mux to a following Instruction Pipe Register.

Example:

```
repeat(#15)
    AC15 = dbl(pop( ))
In first iteration, AC15 − #15 is AC0, thus AC0 is popped.
In second iteration, AC15 − #14 is AC1, thus AC1 is popped.
    .
    .
    .
In last iteration, AC15 − #0 is AC15, thus AC15 is popped.
```

This multi-pop instruction is applicable when the instruction is in the instruction slot 1. During multi-pop, generated register identification regID remains within the boundary between single word register and long word register. For instruction #7, when in the byte pointer mode, operation is same as instruction #1 or #2. When stack configuration is 32 bit stack mode, then for instruction #1, #2, #3, #4#5 and #6, same amount of increment is applied to XSSP. And for instruction #7, when in the byte pointer mode, a same amount of increment (+4) is applied to XSSP.

In the multi-push/pop, using some other register besides AC0 as base for repeating works just as well. For example, repeat(#14)
dbl(push(AC1)); pushes AC15, AC14, . . . AC1

Any register which is in sequential order in the ALLx register ID can be pushed or popped sequentially by single repeat. For example, in an embodiment herein, the repeat push instruction could be:
repeat(#3)
push(AC4).

Then, the order of push is push(AC7), push(AC6), push (AC5), push(AC4). The corresponding repeat pop instruction is:
repeat(#3)
pop(AC7).

That repeat pop instruction then pops in the order AC4, AC5, AC6, AC7.

Even if the interrupt contains its own sequence like single repeat on push from AC0, the register index is generated from register ID in the instruction and the RPTC value. In this way, the RPTC is saved on interrupt and that is sufficient information for restoring the repeat instruction at the point at which the repeat instruction was interrupted. For example, let a repeat push instruction be:
repeat(#3)
push(AC0)

In operation, the sequence of pushes and corresponding RPTC contents are:
push(AC3); RPTC=3
push(AC2); RPTC=2
push(AC1); RPTC=1
push(AC0); RPTC=0

Suppose Reg ID of AC0 is x00. Then RPTC value is added to regID of AC0 to generate register index with which to restore a point in the sequence after an interrupt and then resume pushes.

The assembler is suitably structured to check for repeat instructions that are incompatible with the hardware architecture of the processor and flags an error. For example, suppose there are 16 accumulator registers in the hardware but the repeat instruction calls for a push/pop relating to more accumulator registers than exist in the hardware.

repeat(#15)
dbl(push(AC1));

Push AC16, AC15, . . . AC1 is being requested, and results in an error.

TABLE 5

REPEAT INSTRUCTIONS

| nr: | Syntax | Symbolic | Size | DAG mode |
|---|---|---|---|---|
| 1: | repeat(#k16) | RPT_P_LK16 | 3 | NODAG_cf |
| 2: | repeat(CSR) | RPTI_P | 2 | NODAG_cf |
| 3: | repeat(CSR), CSR += #k4 | RPTI_P_KA | 2 | NODAG_cf |
| 4: | repeat(CSR), CSR -= #k4 | RPTI_P_KS | 2 | NODAG_cf |
| 5: | repeat(CSR), CSR += DAa | RPTI_P_R | 2 | NODAG_cf |

Operands:

kx: x-bit width unsigned value.
DAa: from AR[0 . . . 15], T[0 . . . 3], SSP, SP, DP These various embodiments of repeat instructions operating on the circuitry of FIGS. 8B-8C make the next-following instruction (or two paralleled instructions) on the next-following line of the code listing just below the repeat instruction repeatedly do operand-decrement and execute the number of times specified in the operand of the repeat instruction. The iteration count is taken from immediate value (instruction #1) or from register CSR 3945 of FIG. 8B. The next code-listing-line instruction (single or parallel-plural) is repeated ((k16 or CSR)+1) times (value zero means one-time repeating, i.e. a sequential execution).

For the repeat instruction #1 and #2 of TABLE 5, in the decode phase of the pipeline of FIG. 8A, repeat counter RPTC 3830 is loaded with the iteration count, and single repeat active flag SRAF is set and thus indicates that the repeating instruction circuit of FIGS. 8A-8B is currently active. Then in the Execute2 X2 pipestage register, CSR 3945 is loaded by post modification. In the case of TABLE 5 instructions #3, #4, #5, in the Execute2 X2 pipestage, register CSR 3945 is loaded by post-modification. In the case of instruction #5 of TABLE 5, a data address DAa is asserted by pipe stage AD2 using address unit AU ALU 3636 of pipe stage AD2, and memory at that data address is read by pipe stage AC1, and fed to Execute1 X1 stage of the pipeline 4410 of FIG. 9A, and then in the Execute2 X2 pipestage, register CSR 3945 is loaded by post-modification. The single repeat active flag SRAF is set, and repeat is active. RPTC is decremented as decode of the repeated instruction, e.g., push/pop is validated or continued using STOP.

In FIGS. 8B-8C, the repeated instruction indirectly accesses a repeat value by using CSR to load repeat register RPTC 3830. Then a mux 3820 connects RPTC input to output 3824 from decrementor 3840 so that RPTC counts down from the CSR value, wherein RPTC sequentially holds value after decremented value fed back from and supplied by decrementor 3840 via line 3824 and coupled by mux 3820 via output line 3828 to RPTC. An Interrupt can be serviced during repeating. Single repeat active flag SRAF is saved to the stack of FIG. 8A along with the return address for PC, then SRAF is cleared. Upon a return, SRAF and the return address are recovered automatically.

In FIGS. 8A-8C, after first preserving an RPTC value and SRAF applicable to a calling routine, user can program a repeat instruction for a subroutine via selector line 3826 to cause mux 3820 to couple an operand constant or immediate field from decoder 3625 on line 3822 to repeat counter RPTC 3830. Before returning to the calling routine from the subroutine, the earlier-preserved RPTC value and SRAF are restored as in FIG. 8A for use by the calling routine when it resumes.

Expanded Push/Pop and Load/Store instructions are now described using TABLE 5A, which tabulates each of several types of repeated instructions that are repeated by application of any given repeat instruction of TABLE 5. Push/Pop instructions and supporting hardware embodiments are expanded to support all CPU architecture registers including any exception registers that might exist in a given processor architecture. Also, Load/Store instructions LD/ST that support all CPU architecture registers are added as embodiments to unify load/store instructions for particular registers.

TABLE 5A

REPEATED INSTRUCTION TYPES*

1) Push/Pop: push(ALLa);ALLa = pop( ); For more push/pop, see TABLES 3, 4.
2) push(RLHa,RLHb); RLHa, RLHb =pop( );
3) Logical LD/ST: ALLa = Smem/Lmem; Smem/Lmem = ALLa;
Note: Smem or Lmem is selected automatically by source/destination register type.
Register load behavior of above load and pop instructions are logical copy. ACx load instructions are separately prepared.
4) Constant LD: Ra = k16; Ra = k4; Ra = -k4;
5) HI/LO(ACx) LD: HI(ACa) = uns(Smem); LO(ACa) = uns(Smem);
6) Byte LD/ST: Ra = uns(high_byte(Smem)); low_byte(Smem) = Ra;
Byte LD/ST:
7) Ra = uns(low_byte(Smem)); high_byte(Smem) = Ra;
8) Pair LD/ST: HI(Lmem) = RLHa, LO(Lmem) = RLHa+1;
On Pair LD/ST instructions, Ra+1 or RLHa+1 are referred from global register ID in Register ID mapping.
9) Ra = HI(Lmem),Ra+1 = LO(Lmem);

*Note for TABLE 5A: See Glossary TABLE 2 for designation meanings.

TABLES 6 and 7 respectively show an example sequence of context save and context restore for use in interrupt processing and return. The tabulated code saves a very substantial percentage of code storage space compared to register-by-register instructions pushing/popping, and results will vary depending on embodiment and application. The code sequence of TABLE 7 effectively undoes or reverses the operations of TABLE 6.

Notice that the assembler conveniently responds to register mnemonics in TABLES 6 and 7, and the repetition number #n covers a set of registers over a contiguous set of pointer positions in Register Space. One example in TABLE 6 is "repeat(#3); dbl(push(RSA0))" which pushes four registers REA1, REA0, RSA1, RSA0 in decreasing underlying numerical order in Register Space and completes the operation by pushing the register (e.g., RSA0) that is explicitly specified in the repeat push instruction. The corresponding repeated pop in TABLE 7 is "repeat(#3); REA1=dbl(pop( ))" which pops those four registers RSA0, RSA1, REA0, REA1 in increasing underlying numerical reverse order in Register Space, completing the operation by popping the register (e.g., REA1) that is explicitly specified in the repeat pop instruction.

A still more complicated operational example in TABLE 6 is given by the remarkably uncomplicated instructions "repeat(#24); push(PDP)". Instructions are decoded whereupon a whole panoply of 24 contiguous registers in Register Space are pushed in decreasing underlying numerical order in Register Space and operationally ending with register PDP. The panoply of registers includes sixteen sequentially numbered registers AC15.G, AC14.G, . . . AC0.G, as well as BK47, . . . , BKC circular buffer size register, BOFC, . . . , BOF01 buffer offset, and finally the PDP peripheral data page pointer that is literally specified in the repeat push syntax. Conversely, the context restore repeat pop syntax is "repeat (#24); AC15.G=pop( ).

In other words, the repeat pop syntax uses the circuitry of FIGS. 8A-8C to generate 24 different successive instructions for the pipeline to pop the whole panoply of 24 contiguous registers in increasing underlying numerical order in register space and operationally ending with register AC15.G. Thus some embodiments can do a repeat push/pop on a mixture of different sets of successively numbered registers and miscellaneously-named registers. In this way a considerable code-preparation convenience and flexibility are provided, as well as substantially saving code storage space.

In a particular processor and outside of the context save of TABLE 6, status registers ST0_55, ST1_55, ST2 and RETA (with SRAF and PC) are automatically saved. Certain other registers IIR, BER, BIOS, IFRx, IERx, DBGIERx, IVPx, SP and SSP do not need to be saved in some embodiments.

TABLE 6

CONTEXT SAVE SEQUENCE (PUSH)

push(RPTC)
push(DR0,DR1)
push(DR2,DR3)
push(XDP)
push(BRS1); BRC1 save register
push(CSR)
push(BRC0)
push(BRC1)
push(ST3_55); status reg
repeat(#15)
dbl(push(AC0)) ; push AC15 -> AC0
repeat(#15)
dbl(push(XAR0)) ; push XAR15 -> XAR0
repeat(#24)
push(PDP) ; push AC15.G -> AC0.G, BK47 -> BKC circular buffer
    size register,
    BOFC -> BOF01 buffer offset,
    PDP peripheral data page pointer
repeat(#3)
dbl(push(RSA0)) ; push REA1, REA0, RSA1, RSA0
push(BIOS)

TABLE 7

CONTEXT RESTORE SEQUENCE (POP)

repeat(#3)
REA1 = dbl(pop( )) ; pop RSA0, RSA1, REA0, REA1
repeat(#24)
AC15.G = pop( ) ; pop PDP, BOF01 -> BOFC, BKC -> BK47,
AC0.G -> AC15.G
repeat(#15)
XAR15 = dbl(pop( )) ; pop XAR0 -> XAR15
repeat(#15)
AC15 = dbl(pop( )) ; pop AC0 -> AC15
ST3_55 = pop( )
BRC1 = pop( )
BRC0 = pop( )
CSR = pop( )

TABLE 7-continued

CONTEXT RESTORE SEQUENCE (POP)

BRS1 = pop( )
XDP = pop( )
DR2,DR3 = pop( )
DR0,DR1 = pop( )
RPTC = pop( )

Depending on various considerations and type of embodiment, save/restore operations on registers according to teachings herein may be performed using a set of different multiple repeat instructions as in TABLES 6 and 7 supported by the hardware of FIG. 8A-8C or 11A-11B or otherwise, or in one simple sequence defined by one multiple repeat instruction. Considerations that encourage the use of a set of different multiple repeat instructions are listed next.

1) If a machine context involves information stored in types of registers involving different register lengths, e.g., a word (16 bit) register and a longword (32 bit) register. In a processor that has distinct instructions to support different register lengths (a single-word push then pop, and a longword push then pop), it is advisable to use different multiple repeat instructions to save and restore the machine context. Dynamic computing of the register identification RegID in Register Space using adder 4020 or subtracter 4030 is associated with a repeated push/pop instruction operating on one length or type of register throughout the counting process in RPTC 3830 established by a given repeat(#n) instruction.

2) If a machine context involves information stored in a subset of particular registers that are sparsely or not contiguously mapped among the RegIDs comprising Register Space, then it may be more convenient to save/restore the machine context by using different multiple repeat instructions to piecewise save/restore only the particular registers. However, some other embodiments can be prepared to store a contiguous set of registers that includes the subset of the particular registers, and then to ignore some of the registers in the contiguous set in the restoring process.

Figure 9B:
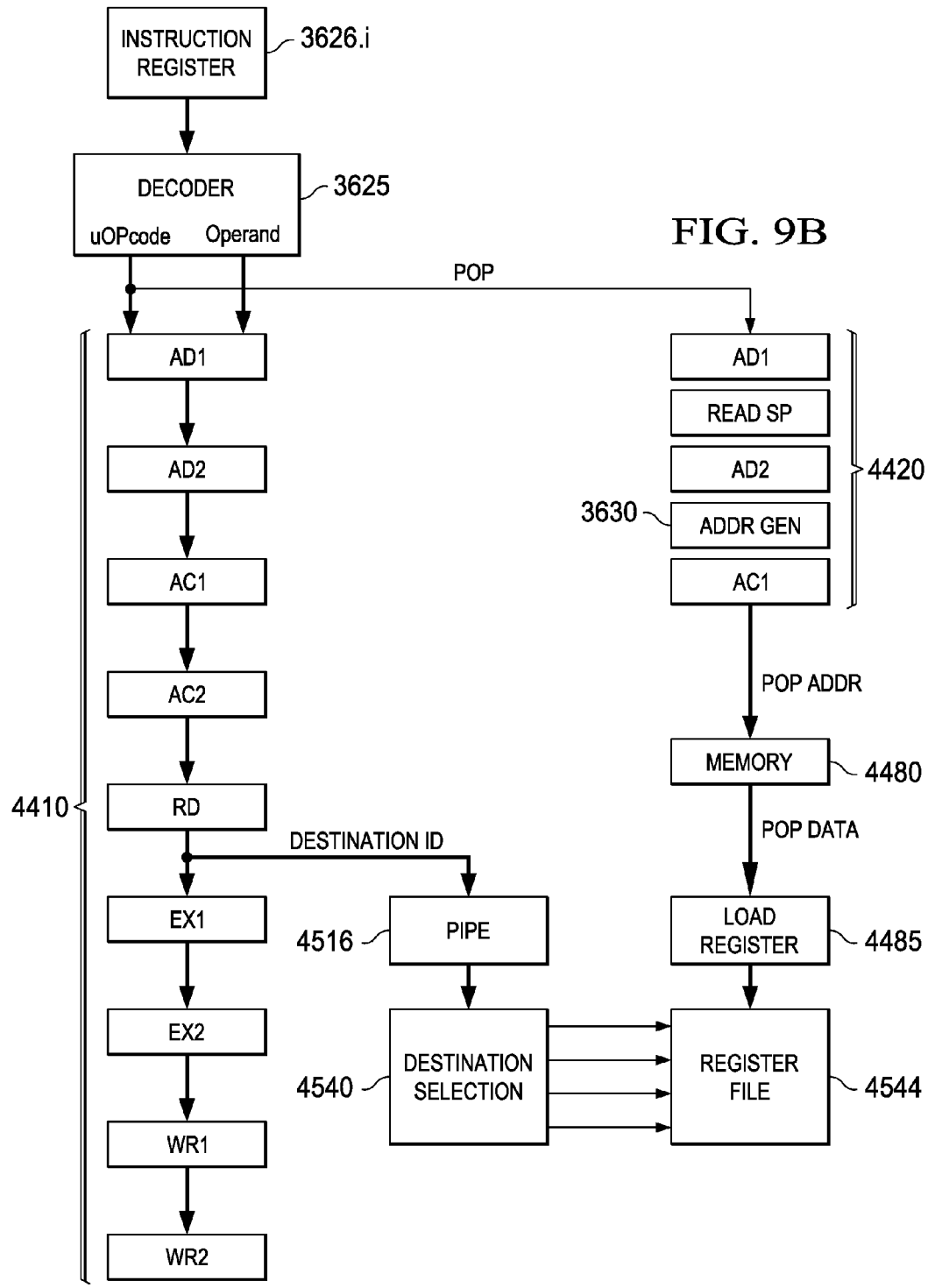
FIGS. 9A-9B illustrate a partially block, partially schematic diagram of an inventive pipeline circuit for inventive repeat multiple instructions.
Figure 9C:
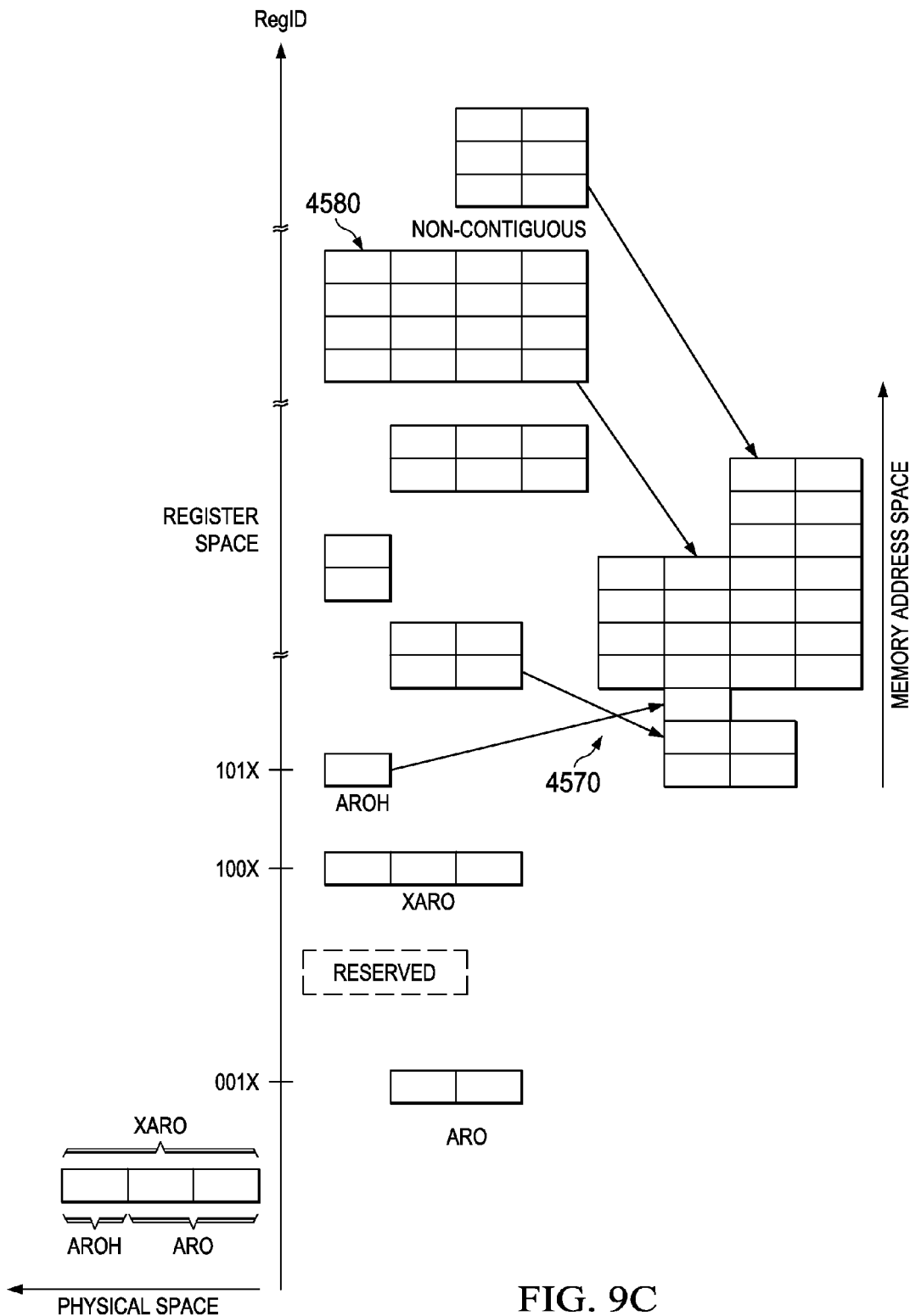
FIG. 9C is a diagram of context registers arrayed in Physical Space, and Register Space, and in Memory Address Space, as established by the structure and circuitry of the other Figures.
Figure 9D:
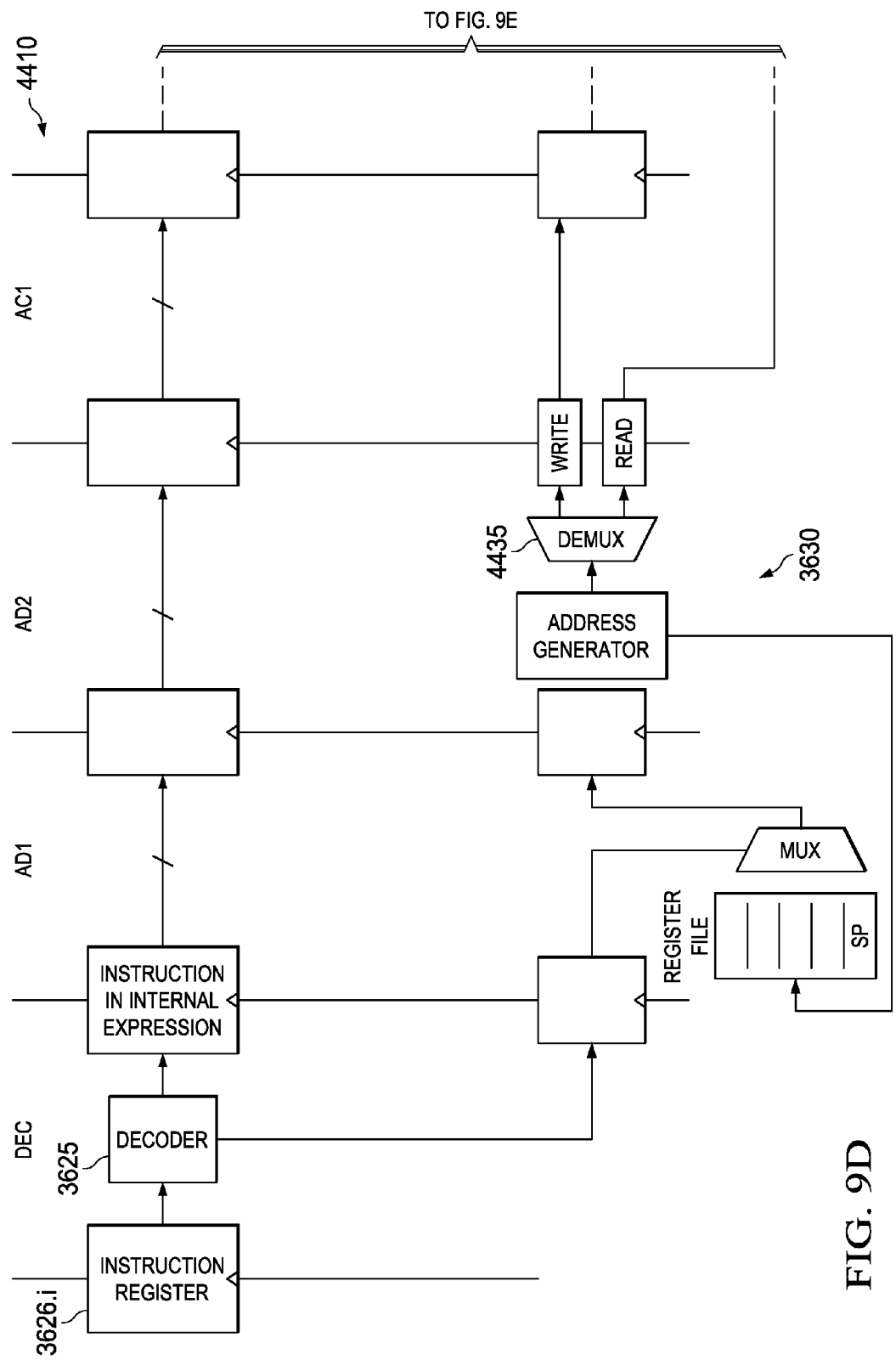
Figure 9E:
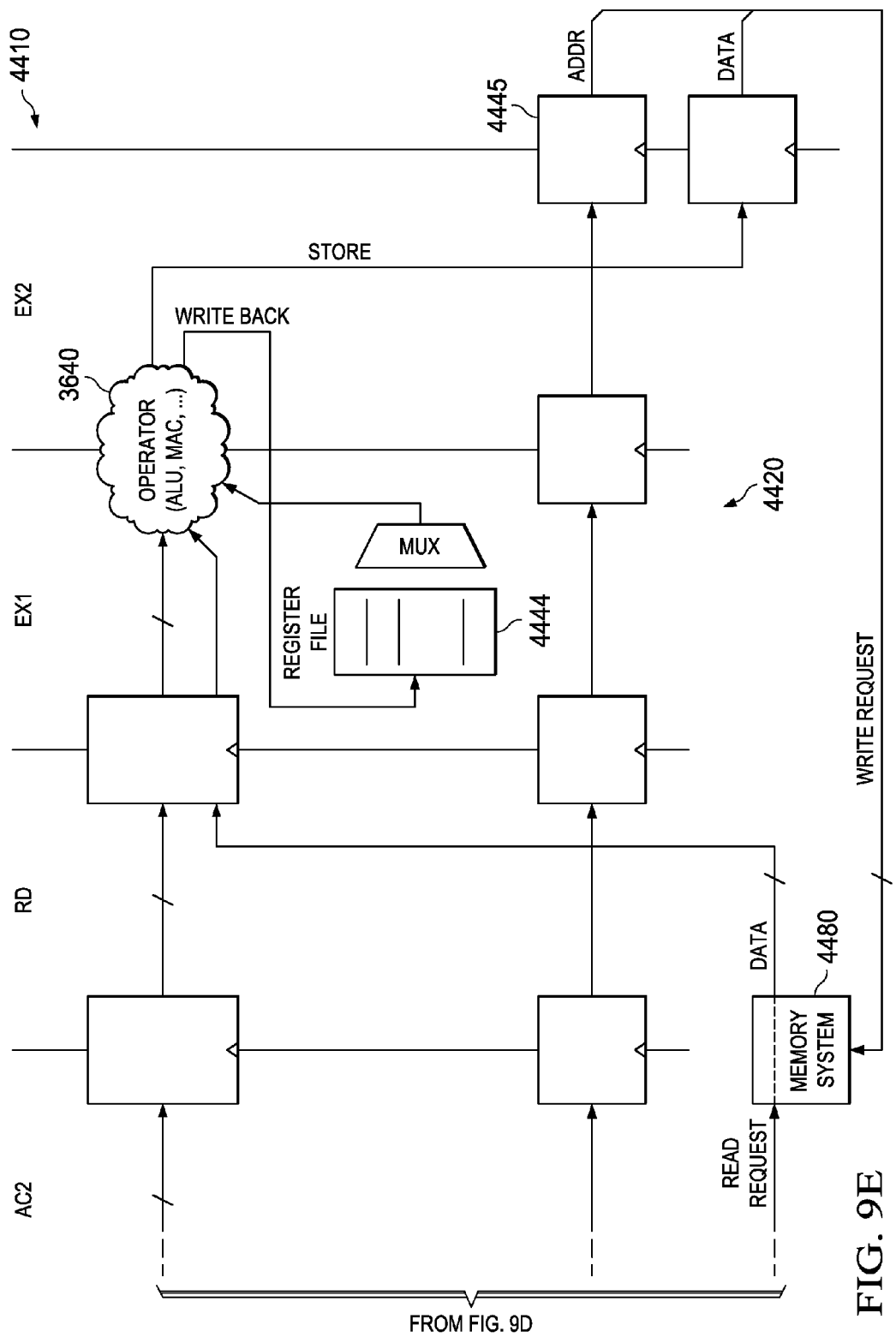

3) In some embodiments, some registers are seen twice, reflecting a capability of the processor to access some registers or part of them. Thus, one register can be seen twice, with "full" form and with "divided" form. An example of such is address registers. In FIG. 9C, a consider an example of a 24 bits wide address register XAR0, which has different register names for the different forms and can be accessed in the full form or can be accessed partially. "x" refers to leading or trailing RegID bits.

x001x AR0 [15:0] <- lower 16 bits of XAR0
x100x XAR0 [23:0] <- full form
x101x AR0H [7:0] <- upper 8 bits of XAR0 [23:16].

Notice that Register Space in FIG. 9C does not necessarily resemble either a Physical Space of a register nor a Memory Address Space of a physically regular structure like a memory. The selection circuits 4520 and 4540 of FIGS. 9A and 9B are suitably arranged in this example just above to respond to widely different RegID values in Register Space to access different parts of the same register. Conversely, closely spaced RegID values in Register Space may access operationally distinct and physically quite separate structures on the processor semiconductor chip layout.

4) Some processor embodiments may have one or more RegIDs that are reserved in the sense that no corresponding actual register is implemented in the hardware of the processor. In such case, the actual registers holding information representing a machine context are not contiguous in Register Space, and different multiple repeat instructions are suitably used to save/restore the actual registers.

Turning to a further consideration of TABLE 4, the instruction types #1, #3, #5, #6 of TABLE 4 perform a multiple or single 16-bit word Pop from top of Stack, and they move one, two, or multiple data memory locations addressed by XSP to the 16-bit destination operand. The destination operand may be: 1) a 16-bit data memory operand (Smem), 2) an accumulator low part, an accumulator high part, an auxiliary register, or a temporary register, 3) any 16-bit CPU register having a register ID symbol within the defined Register Space and some registers may be excluded either in here late from the Register Space or at excluded from the instruction operations as desired. These instructions use a dedicated datapath independent of the Address Unit AU ALU 3636 and independent of the Data Unit DU operations to perform the specified instruction operation.

Instruction #1 performs a single 16-bit word pop from the top of the stack. The content of the 16-bit data memory location addressed by XSP is moved to the 16-bit data memory location Smem. XSP is incremented to address the following 16-bit word.

Instruction #2 performs two 16-bit word pops from the top of the stack. The content of the 16-bit data memory location addressed by XSP is moved to the 16-bit destination register RLHa. XSP is incremented to address the following 16-bit word. The content of the 16-bit data memory location addressed by XSP is moved to the 16-bit data memory location Smem. XSP is again incremented to address the next following 16-bit word.

Instruction #3 performs two 16-bit word pops from the top of the stack. The content of the 16-bit data memory location addressed by XSP is moved to the 16-bit destination register RLHa. XSP is incremented to address the following 16-bit word. The content of the 16-bit data memory location addressed by XSP is moved to the 16-bit destination register RLHb. XSP is again incremented to address the next following 16-bit word. Instruction #4 performs either a single 16-bit word pop from the top of the stack, or multiple 16-bit pops from the top of the stack.

When executed out of an unconditional repeat single structure, this instruction #3 performs a single 16-bit word pop from the top of the stack as follows. The content of the 16-bit data memory location addressed by XSP is moved to the 16-bit register ALLa. XSP is incremented to address the following 16-bit word. The user designates the 16-bit ALLa registers by using the valid register ID symbols (register names). When accumulator high parts (ACx.H) are referenced as the destination operand, the 16-bit data memory location addressed by XSP is loaded to bits 16-31 of ACx. When accumulator low parts (ACx.L) are referenced as the destination operand, the 16-bit data memory location addressed by XSP is loaded to bits 0-15 of ACx. When XARx.H, XSSP.H, XSP.H, XDP.H, or ACx.G are referenced as the destination operand, the eight lowest bits of the 16-bit data memory location addressed by XSP are loaded to the destination register. When peripheral data page register (PDP) is referenced as the destination operand, the nine lowest bits of the 16-bit data memory location addressed by XSP are loaded to the destination register.

When Block Repeat Counter BRC1 is loaded with the content of a data memory location addressed by XSP, the block repeat save register (BRS1) is also loaded with the same value. Therefore, when performing a CPU register context save with push( ) instructions, instructions are coded to save the BRS1 register to the stack before BRC1. At context restore with pop( ) instructions, the BRS1 register is restored after BRC1.

When executed inside an unconditional repeat single structure, this instruction performs a sequence of pops from the top of the stack to a 16-bit ALLx register with the registerID of the popped register incrementing along the iterations of the single repeat structure.

Consider an example using the instruction in the repeat single structure below:
repeat(#(NB_REG_TO_POP−1))
ALLa=pop( ).

The register ID (regIDa) of the selected 16-bit ALLa register references another 16-bit CPU register ALLb with a register ID regIDb equal to (regIDa−NB_REG_TO_POP+1). This reference is made by subtracter 4030 for pop subtraction. At the first iteration of the repeat single structure, the following operations occur. ALLb register is popped from the top of the stack. XSP is incremented to address the following 16-bit word. At the next iteration, the 16-bit register with the register ID (regIDb+1) is popped, XSP is again incremented to address the next following 16-bit word, and so on, until, at the last iteration the 16-bit register (ALLa) is popped and XSP is again incremented to address the next following 16-bit word.

Note that a dual issue embodiment might not execute another instruction in parallel of this instruction when used in an unconditional repeat single structure. The set of registers popped by this multiple pop structure are of the same type (16-bit). Also, note that when XSP is incremented to address the following 16-bit word, this means that in word-pointer mode, XSP is incremented by 1, and in byte-pointer mode, XSP is incremented by 2. In byte-pointer mode, he software code is written to ensure that the Smem address and XSP are aligned on a multiple of two bytes. If not, then the CPU generates a bus error in one example processor embodiment.

When stack configuration is 32-bit stack mode, XSSP is incremented by the same amount as XSP. The registers modified by these instructions are updated in the execute2 pipeline phase (X2). The increment operations performed on XSP (and XSSP in 32-bit stack mode) are performed by the AU DAGEN S dedicated to the stack addressing management. XSP and XSSP registers are read in the address1 pipeline phase (AD1) and are updated in the address2 pipeline phase (AD2). Note that there may be a latency between PDP, SP, SSP, ARx, BSAxx, BKxx, BRCx, BRS1, and CSR write by these instructions and their subsequent read in the AD1 phase by the AU DAGENs or by the P-unit loop control management.

Consider the following example syntax: AC0.L, AC1.L=pop( ). The content of the memory location addressed by the data stack pointer (XSP) is copied to AC0[15-0] and the content of the memory location addressed by XSP+1 is copied to AC1[15-0]. The XSP register is incremented by 2. SP and SP+1 are unchanged.

Execution of the syntax AC8.H, *AR3=pop( ) involves the following operations. The content of the memory location addressed by the data stack pointer (XSP) is copied to AC8 [31-16], and the content of the memory location addressed by XSP+1 is copied to the location addressed by XAR3. The XSP is incremented by 2.

Instruction types #2 and #4 of TABLE 4 perform multiple or single 32-bit word pop from the top of stack. In TABLE 4B, these instructions move one or multiple data memory locations addressed by XSP to the 32-bit destination operand. The destination operand may be a 32-bit data memory operand (dbl(Smem)), or any 32-bit CPU register having a register ID symbol. These instructions use a dedicated datapath independent of the AU ALU and the DU operators to perform the operation.

Instruction #4 of TABLE 4 performs a single 32-bit word pop from the top of the stack. The content of the 16-bit data memory location addressed by XSP is moved to the higher 16 bits of the 32-bit data memory operand dbl(Smem). XSP is incremented to address the following 16-bit word. The content of the 16-bit data memory location addressed by XSP is moved to the lower 16 bits of the 32-bit data memory operand dbl(Smem). XSP is again incremented to address the next following 16-bit word.

Instruction #2 of TABLE 4 performs either a single 32-bit word pop from the top of the stack, or multiple 32-bit pops from the top of the stack. When executed out of an unconditional repeat single structure, this instruction #2 performs a single 32-bit word pop from the top of the stack as follows. The content of the 16-bit data memory location addressed by XSP is moved to the higher 16 bits of the 32-bit register ALLa. XSP is incremented to address the following 16-bit word. The content of the 16-bit data memory location addressed by XSP is moved to the lower 16 bits of the 32-bit register ALLa. XSP is incremented to address the following 16-bit word. The user designates the 32-bit ALLa registers by using valid register ID symbols.

When accumulators (ACx) are referenced as the destination operand, the 32-bit words popped from the stack (as described previously) are loaded to bits 0-31 of ACx. When a particular width register (XARx, XSSP, XSP, XDP, RSAx, or REAx) is referenced as the destination operand, the corresponding part of the width of the 32-bit word popped from the stack is loaded to the destination register.

When RETA register is referenced as the destination operand, the 32-bit word popped from the stack is loaded to the width of RETA register content (the return address of the calling subroutine) and the balance of the content to a CFCT register having active control flow execution context flags of the calling subroutine.

When executed inside an unconditional repeat single structure, this instruction #2 performs a sequence of pops from the top of the stack to a 32-bit ALLx register with the registerID of the popped register incrementing along the iterations of the single repeat structure.

Consider a process example using the following instruction in a repeat single structure:
repeat(#(NB_REG_TO_POP−1));
ALLa=dbl(pop( )).

The register ID (RegIDa) of the selected 32-bit ALLa register references another 32-bit CPU register ALLb with a register ID regIDb equal to (RegIDa−NB_REG_TO_POP+1). At the first iteration of the repeat single structure the ALLb register is popped from the top of the stack. XSP is incremented to address the following 32-bit word. At the next iteration the 32-bit register with the register ID (RegIDb+1) is popped, and XSP is again incremented to address the next following 32-bit word, and so on. At the last iteration, the 32-bit register (ALLa) is popped, and XSP is again incremented to address the next following 32-bit word. Note that a dual issue embodiment might not execute another instruction in parallel with this instruction when used in an unconditional repeat single structure. The set of registers popped by this multiple pop structure are of the same type (32-bit). Also, note that when XSP is incremented to address the following 16-bit word, this means the following: In word-pointer mode, XSP is incremented by 1. In byte-pointer mode, XSP is incremented by 2. In byte-pointer mode, ensure the dbl(Smem) address is aligned on a multiple of four bytes. If not, then the CPU generates a bus error. Similarly, the code is written to ensure that XSP is aligned on a multiple of two bytes. If not, then the CPU generates a bus error. When the stack configuration is 32-bit stack mode, XSSP is incremented by the same amount as XSP.

For instruction #4 of TABLE 4 in word-pointer mode, when dbl(Smem) is at an even address, the two 16-bit values popped from the stack are stored in memory in the same order as they are stored at memory location dbl(Smem). When dbl(Smem) is at an odd address, the two 16-bit values popped from the stack are stored in the reverse order of the one at memory location dbl(Smem). Regarding pipeline operations, the registers modified by these instructions are updated in the execute2 pipeline phase (X2). The increment operations performed on XSP (and XSSP in 32-bit stack mode) are performed by the AU DAGEN S dedicated to the stack addressing management. The XSP and XSSP registers are read in the address1 pipeline phase (AD1) and are updated in the address2 pipeline phase (AD2). Note that a latency may exist between XDP, XSP, XSSP, and XARx write by these instructions and their subsequent read in the AD1 phase by the AU DAGENs or by the P-unit loop control management. When executing a block-repeat loop, registers RSAx and REAx are not modified by these instructions #4 and #2.

Consider this example syntax: dbl(*AR2+)=pop( ). The content of the memory location addressed by the data stack pointer XSP is stored at the address pointed to by XAR2. If the address pointed to by XAR2 is even, the content of the memory location addressed by
XSP+1 is stored at the address pointed to by XAR2+1. If the address pointed to by XAR2 is odd, the content of the memory location addressed by XSP+1 is stored at the address pointed to by XAR2−1. The XSP register is incremented by 2. XAR2 is incremented by 2. When *AR[0-15]+ is used with dbl( ), XAR[0-15] is incremented by 2.

Regarding the syntax AC2=dbl(pop( )), the content of the memory location addressed by the data stack pointer XSP is copied to AC2[31-16]. The content of the memory location addressed by XSP+1 is copied to AC2[15-0]. The XSP register is incremented by 2.

Register Space is independent from the other spaces in the processor so as to permit easily expanding the number of registers in the future without losing upward compatibility. A repeated instruction is generated dynamically in every instruction decode stage. A new Instruction is dynamically generated at each time by just using and referring to the base instruction being repeated and to the repeat counter RPTC. Real estate is conserved in some embodiments as shown. Some embodiments use a state machine to perform the dynamically repeated multi-cycle instruction.

Some other embodiments repeatedly issue the same instruction down the pipe and then vary its effect at the point somewhere down in the pipe where Source ID SID is used by Source selection block 4520 in FIG. 9A, and where Destination ID DST is utilized by Destination selection block 4540 in FIG. 9B.

Some of the embodiments remarkably provide compatibility with interrupts asserted during the repeat process. An additional register is unnecessary here to save instruction state of the repeated instruction. Since instruction is generating a dynamically repeated version at each time, this sequence is interruptible without an additional register.

Some of the embodiments can provide any one or more of the following desirable features and/or other desirable features: smaller code size, easily expandable number of registers in processor upgrades, unnecessary to assign new instruction opcode as number of registers is expanded, unnecessary to introduce new CPU register, unnecessary to provide new mode bit or status bit, interrupt response time remains undiminished. Dynamic instruction modification at decode stage is also applied in some embodiments.

In some embodiments, the code size reduction saves more real estate than the adder, subtracter, mux and selector circuitry 4010 of FIG. 8C involve. In some other embodiments, the convenience and increased economic efficiency of upgrading software from one processor generation to another justify the hardware improvements regardless of a little amount of real estate used. Multiple repeat pushing eight registers is believed to save 11 code bytes (2×8 regs.−(3+2) =11), where 2×8 represents conventional code space and (3+2) represents repeat multiple push code space. Multiple repeat pushing 16 registers is believed to save 27 code bytes (2×16 regs.−(3+2)=27). Four multiple repeat 8-register pushes are believed to save 4×11=44 code bytes. Thus there is no statically predetermined amount of code bytes saving, and generally the Savings are believed to increase according to the equation $$\text{Savings} = \sum_i (2n(i) - 5)$$

as more multiple repeat instructions and larger repeat number n(i)=1+#n in the argument of each repeat instruction i are used. Since the real estate expense for the circuitry appears to be fixed by the structure of any particular embodiment, the code savings and convenience of the various embodiments appear to easily justify their use.

In FIGS. 9A-9E, a push/pop instruction goes through a DSP processor pipeline and is processed and activates DSP components. See also a push instruction in pipeline of FIG. 9A, and a pop instruction in pipeline of FIG. 9B. Description suitably starts with an instruction register IR, into which a processor instruction is loaded. An instruction is a specific bit pattern disclosed as machine language and sometimes called binary code. For example, a binary code 0x0e 0x30 can represent a push to data register zero, as symbolized by push (DR0).

A decoder analyzes the instruction(s) and interprets each one into an internal expression or machine language that is implementation-dependent. The decoder also activates a data address generator DAgen when desired. The decoder activates the data address generator in the case of a push/pop, using the stack pointer SP to produce a write-to/read-from memory operation.

For address generation, the register file is read in Address1 stage then processed into effective address in Addr2 stage, which is then sent off-the-CPU to memory for a read operation/operand or pipelined to a later stage for a write operation/ operand. In one example, a so-called memory-operand pipeline is used wherein memory access is intimately, closely or tightly combined into the processor pipeline.

Following such memory read-request issuance, when MPU pipelines an instruction to Execute stage, the MPU activates a math-operating unit named DU (data unit) for some sort of computing. The DU has operational units (ALU or MAC) inside which the units take operand(s) from memory(s) and from registers and compute as the instruction specifies (e.g., add, compare or multiply).

Here a push instruction acts as a store-to-memory instruction, for which the selected register is read in Execute1 stage then finally passed to the memory interface to be stored, coupling with a corresponding address. A pop instruction acts as a load-from-memory for which no computation is performed and the value from memory, which was once pushed to the stack, is retrieved. A stack is a specific region in the memory, pointed to by SP (stack pointer) register. The stack is provided to preserve the MPU register contents temporarily and then is retrieved by writing back to the destination register.

Some embodiments provide a remarkable operation that dynamically produces the source/destination register for a push/pop instruction under single-repeat. The register value is embedded in the instruction as immediate constant, which is intentionally biased with RPTC (single repeat count) register.

Instruction pipe register 3810 of FIG. 8C refers to either or both the register for the first stage AD1 of Main pipe 4410 or Address pipe 4420 of FIG. 9A/9B as applicable to the instruction. In FIG. 9A/9B, the circuitry of FIGS. 8A-8C is located just after Decoder 3625 and just before Main pipe 4410 pipe stage AD1. FIGS. 8A-8B are a close-up view near the Decoder block in FIG. 9A/B. FIGS. 8A-8B show circuitry occupying only a small area to add extra processing functionality after and associated with Instruction Decoder 3625, whereupon the results are piped down the pipeline. The Source identification SrcID from adder 4020 or destination identification DstID from subtracter 4030 in FIG. 8C is piped down the Main pipe 4410 in FIG. 9A/9B.

Sourcing and reading of the register file registers is performed using the source/destination selection block in FIG. 9A/9B. For source selection, a multiplexer tree inside the selection block has Source identification SrcID for selection signal. For destination selections, Destination identification DstID is fully decoded and used for the enable signal on the clock line to the particular destination target register with which to update that target register.

As shown in an FIG. 9A, the processor has a memory 4480 having memory locations accessible by memory addresses, and an address pipeline 4420 responsive to the repeated instruction PSH and varying values of the operand to assert write addresses PUSH ADR to the memory 4480 as a function of the varying values. The processor further has a register file 4544 and source selector circuitry 4520 coupled to pipeline 4410 and responsive to the repeated instruction PSH with the varying values of the operand to access registers in the register file 4544. The register(s) thus accessed in the register file 4544 are piped down a Store Pipeline 4530 having store pipe stages EX2, WR1, WR2, whereupon a write of PUSH DATA is completed to the memory locations in the memory 4480 corresponding to the asserted write addresses from the address pipeline 4420.

As further shown in FIG. 9B, the processor address pipeline 4420 is also responsive to the repeated instruction POP and varying values of the operand to assert read addresses to the memory 4480 as a function of the varying values to read information from the memory locations addressed by the asserted read addresses. Register file 4544 and destination selector circuitry 4540 of the processor are coupled to pipeline 4410 and responsive to the repeated instruction POP with the varying values of the operand to load registers in the register file 4544 with the information read from the memory locations.

For context changing purposes, register file 4544 in this description suitably also is meant, in addition to those registers in a physically regular register file structure, to stand for all the registers which are used to specify a processor context even though some of these registers may be operationally non-analogous and physically quite separate or different structures on the chip real estate. The use of register identification RegID values in Register Space (FIG. 9C) provides a useful and efficient way of interfacing a somewhat miscellaneous set of structurally less-regular storage elements that define a context in some processor embodiments with the more organized and structurally regular circuitry of a stack or memory.

The architecture of FIGS. 9A, 9B and 8A-8C also makes remarkably efficient use of the processor pipeline(s). In FIGS. 9A and 9B, the main pipeline 4410 has plural pipe stages after the instruction decode stage so that a Beginning, Middle and End of main pipeline 4410 are distinct from one another. The Beginning of main pipeline 4410 is in the decode and first Address pipe stage. The Middle of main pipeline 4410 lies between the pipe stage RD and a first Execute pipe stage EX1. The End of main pipeline 4410 is situated at the writeback WR portion. In both Push and Pop, the repeat multiple instruction hardware of FIG. 8A-8C or 11A-11B is situated in the decode stage at the Beginning or top of the pipelines 4410 and 4420 so that the hardware can immediately deliver instruction(s) without any pipeline bubble. Notice also that Stack Pointer SP is very high up or early in the address pipeline 4420, and the Address Generator 3630 can increment off Stack Pointer SP as a base address or otherwise off an appropriately-provided base address to access Memory Address Space. Stack Pointer SP is a memory starting address from which an Address Generator increments or provides a memory base address to which the Address Generator adds the incrementing Operand as an offset from the Push/Pop circuitry of FIG. 8A-8C or 11A-B as a function of RPTC.

The address generator, if used to sum the Operand as an offset to a base address, may deliver a succession of memory address values in non-contiguous portions of Memory Address Space in response to a succession of a repeat multiple instructions that operate through the hardware of FIG. 8A-8C or 11A-11B to deliver operand values over noncontiguous operand value ranges. Delivering memory address values in non-contiguous portions of Memory Address Space is acceptable and desirable when the mapping of the context registers in Memory Address Space is intended to be a straightforward translation of the mapping of the context registers in Register Space, see middle column of registers in FIG. 9C. On the other hand, when very compact storage of some or all of the context registers in Memory Address Space is desired, then the Address Generator 3630 is operated to increment (or decrement) continuously to store the registers on Push and conversely decrements (or increments) on Pop in a continuous and contiguous manner instead of summing a base address with the Operand values.

In FIG. 9C, the middle column shows registers arrayed in non-contiguous operand value ranges in Register Space, while the right column shows registers selected by repeat multiple instructions operating on Register Space stored in a more compact manner in contiguous address ranges in Memory Address Space in the right column in FIG. 9C. Moreover, the ordering of stored register contents in Memory Address Space can be reversed compared to their ordering in Register Space, as indicated by crossed arrows 4570.

A simple example of contiguous ranges of numbers is that a range 1-5 (decimal) is noncontiguous with a range 8-12. By contrast a range 8-12 is contiguous with a range 13-14. Non-contiguous ranges are such that when range end and start values are subtracted from each other, the differences are all at least two (2). Contiguous ranges have at least one difference of range end and start values that exactly equals one (1).

A refinement of the contiguousness concept is that byte ranges are bytewise contiguous when the foregoing numerical subtraction definition pertains at the byte level, such as when all bytes in a series of 32-bit registers have contents full. Word ranges are wordwise contiguous when the foregoing numerical subtraction definition pertains at the word level even though the word may have only one byte of content. Longword ranges are longword-wise contiguous when the foregoing numerical subtraction definition pertains at the longword level even though the longword may be missing one, two or three bytes of content, as illustrated in FIG. 9C. Note that FIG. 9C is not limiting since some embodiments of structure and process operate to completely pack full the register contents into memory and Memory Address Space on a bytewise contiguous basis, for instance. If the context does not indicate otherwise, use of the word "contiguous" without further qualification indicates that the content is at least contiguous at 32-bit width level.

In the Middle area of main pipeline 4410, a first Push PSH in a series of pushes makes a Source selection using Source selector 4520 and the actual source register in Register File 4544 is just updated by execution of one or more previous instructions farther down in the Execute pipestage(s). The selected part of Register File 4544 is muxed out and piped down to the End area of the main pipeline 4410. Concurrently, the address from Address Generator of address pipeline 4420 is piped down correspondingly to the End area of address pipeline 4420 before assertion as a memory address PUSH ADDR for the Push to access memory 4480 and write the data PUSH DATA from the End area of main pipeline 4410 to memory 4480. In this way the data PUSH DATA is fully updated with the any pertinent results of execution of the previous instruction(s) that were farther down in the Execute pipestage(s) of main pipeline 4410 when the Source selector 4520 was operated as part of the overall operation of Push.

By contrast, the last POP in a series of pops makes a Destination selection using Destination selector 4540, also in the Middle area of main pipeline 4410. Destination selector 4540 loads Register File 4544 in the Middle of the pipeline 4410. A new non-Pop instruction is likely to be right behind the last POP in the pipeline. In this way, the new non-Pop instruction is able to immediately use the restored contents of Register File 4544 in the Execute stages thereafter. Thus, Pop operates conversely to Push in the sense that restore is the opposite of save, but the location and timing of the Pop operation in the pipeline is not simply a reverse operation in the same place. In FIG. 9B, Pop performs the memory 4480 read access in a manner focused on the Middle area of the address pipeline 4420, and the Destination selection and restore-write to Register File 4544 likewise is focused on the Middle area of the main pipeline 4410. Push, in FIG. 9A makes the Source selection in Register File 4544 in a manner focused on the Middle area of the main pipeline 4410 but performs the memory write access for Push in a manner focused on the End area of both the main pipeline 4410 and the End area of the address pipeline 4420.

From a pipeline architecture viewpoint, RegisterID generation logic 4010 of FIG. 8C (and arithmetic unit 4820 with mux 4050 of FIG. 11B) is situated just after Instruction Decoder 3625 in a decode pipe stage prior to main pipeline 4410 and address pipeline 4420. This location for the RegisterID generation logic 4010 associates the altered repeated instruction Operand with the same pipe stage (Decode) as the pipe stage holding the counter of RPTC that generates the RPTC value of which a given Operand value RegID is a function. This assures that the pipeline operations in every pipe stage thereafter are properly coordinated not only for regular operation of Push/Pop but also are coordinated for operations on interrupt, save/restore and context switch. RegisterID generation logic 4010 provides one hardware circuit delivering operand values for use by both the main pipeline 4410 and the address pipeline 4420. In this way, for instance, main pipeline 4410 utilizes varying RegID values from RegisterID generation logic 4010 while address pipeline 4420 can offset the memory base address with the same varying RegID values from the sameRegisterID generation logic 4010. The two pipelines 4410 and 4420 cooperate elegantly. Provision of one instance of RegisterID generation logic 4010 in this example to serve both pipelines conserves chip real estate.

The selection circuits 4520 and 4540 of FIGS. 9A and 9B even respond to widely different RegID values in Register Space to access different parts of the same register, as noted in an example of a register XAR0 earlier hereinabove and as shown in FIG. 9C. Conversely, closely spaced RegID values in Register Space may access operationally distinct and physically quite separate structures on the processor semiconductor chip layout in Physical Space. The address pipeline uses a succession of RegID values in the operand value range in resulting from the operation of the bias value generating circuitry (e.g., counting operation in FIGS. 8A-8C) to access a succession of memory locations in memory 4480 while the selection circuits 4520 and 4540 coupled to Main pipe 4410 are concurrently using the same succession of RegID values to access the somewhat miscellaneous set of structurally and/or functionally more-regular and less-regular, longer width and shorter width, storage elements that define a context in some processor embodiments, and thereby effectuate transfers of information therebetween. In FIGS. 9A and 9B, some embodiments use a stack organization with a stack pointer SP so that asserting non-contiguous successive RegIDs and Register Space delivers a contiguous succession of information into memory space from the miscellaneous registers and storage elements in the processor.

The selection circuits 4520 and 4540 have some circuitry for decoding the operand (RegID) onto access signal lines that enable the access and that physically realize and correspond to the organization of Register Space, i.e., the correspondences of various RegID values in Register Space to each respective actual register or storage element in the processor hardware that is needed to define the context or is otherwise pertinent to a given transfer of information that is to be effectuated. The organization of Register Space and the circuitry of the selection circuits 4520 and 4540 that implement Register Space are suitably arranged or designed by the skilled worker in accordance with the teachings herein so that the amount of context save/restore software, an example of which is shown in TABLES 6 and 7, operates on few enough sets of contiguous RegID values so that the number of operand value ranges (indexed i, not n, in the Savings equation elsewhere herein) is small enough to be convenient for purposes of a given system and its foreseeable upgrades. A nonvolatile memory such as a flash memory in the system, or boot flash space in the processor core or other suitably located nonvolatile memory, is programmed with a plurality of repeat and repeated instructions as sequential instructions defining plural operand value ranges indexed i that can be non-contiguous, for specifying operations of an instruction operand value generating circuit.

A first example of an instruction operand value generating circuit is the combination of bias value generator circuit 3900 with RegisterID generation logic 4010 of FIG. 8C. A second example of an instruction operand value generating circuit is the alternative corresponding circuitry of FIGS. 11A-11B. The instruction operand value generating circuit is operable in response to a plurality of sequential instructions defining plural non-contiguous operand value ranges to generate a succession of values in plural non-contiguous operand value ranges.

In some embodiments as illustrated in FIG. 9C, the address pipeline is responsive to the succession of values in the plural non-contiguous operand value ranges from the instruction operand value generating circuit to access a succession of memory locations in contiguous memory address spaces. Indeed the address pipeline is operable, when the instruction operand value generating circuit generates in non-contiguous operand value ranges, to access a succession of memory locations in contiguous memory address spaces either in response to the succession of operand values or simply from repeated clocking of the repeated instruction (Push, Pop, etc.) itself through the pipeline.

Some embodiments also utilize register access by RegID asserted by multiple repeat of the repeated instruction in plural non-contiguous operand value ranges for information transfer between each accessed register and a hardware stack. The hardware stack automatically responds to each Push and Pop without need of address generation to push and pop the hardware stack.

Parallelizing execution of the Repeat instruction is also contemplated by using plural-ported memory for memory 4480 in some embodiments, performing wide accesses to register file 4544, and using the address pipeline or associated circuitry to do concurrent accesses to the plural ports of the plural-ported memories. Source selection circuit 4520 and Destination selection circuit 4540 are hardwired or configured to respond to each RegID identifying a given shorter or wider width portion of a context register (like AR0H and AR0) or the entire shorter or wider width context register itself (like XAR0 and registers 4580) to apply appropriate byte enable(s) to access the corresponding portion of that register or the entire register. The circuitry accommodates various types of memory caching and caches with cache line access. For instance, access to a memory cache in some embodiments transfers an entire wide cache line of several words between cache and a cache line wide register for quick access and the appropriate byte enables are applied at both the context register and the cache access bus and/or the cache line wide register to transfer one or more bytes therebetween.

This approach also confers flexibility to software to retrieve context in pieces, if desired, and execute some application code right away that may only depend on part of the context information. Thus, some application code may be executed in between the execution of pieces of software that retrieve parts of a given context for effectively-faster context switches or returns.

In FIG. 9C, multiple repeat logic in the decode stage in FIGS. 8A-8C and 11A-11B automatically generates a sequence of RegID values in Register Space. Source selection circuit 4520 and Destination selection circuit 4540 automatically map the RegID values in Register Space to access Physical Space, as it is called herein. Physical Space is the actual layout of the context registers and their shorter and wider widths on the integrated circuit. Address pipeline 4420 is responsive to the decode stage to automatically map the RegID values in Register Space to corresponding values in Memory Address Space for establishing a software stack or other data structure. In this way, Physical Space is mapped and translated to Memory Address Space.

Memory Address Space usefully accommodates information from registers that describes each of several contexts, wherein respective context saves of information in context registers specified by the RegID values in Register Space are performed as the processor goes through operations in different contexts and switches between contexts. In some embodiments, Register Space is independent of and separate from Memory Address Space. For example, when Source selection 4520 and Destination selection 4540 are not directly accessible by asserting a memory address on a memory address bus, then Register Space is independent of and separate from Memory Address Space. Security of Register Space is enhanced and pipeline operation does not involve accesses to Register Space by memory addresses.

The circuitry of FIGS. 8A-8C and 11A-11B together with the pipeline arrangement of FIGS. 9A and 9B decouples the FIG. 9C Register Space and the Memory Address Space while providing save/restore between them in a very flexible manner. The save or restore order of RegID values does not need to be linear in Memory Address Space and can be flexibly established in simple and piecewise linear more complicated ways. For instance, higher RegID values can precede lower RegID values in a save to increasingly higher memory address values and vice versa. The instructions in the save/restore sequences can be repeat instructions that increase memory address values continually while piecewise first increasing over an operand value range of RegID and then decreasing over some noncontiguous operand value range of Reg ID.

Register Space can be separate and independent from Memory Address Space, or may partially overlap Memory Address Space. Register Space pertains to all registers which the skilled worker designers to include and in some embodiments suitably includes all context-defining registers of a processor.

"ALLa" herein means a register belongs in ALLx register group, see TABLE 2 Glossary. The instruction format dbl (push(ALLa)) is decoded to deliver a register identification RegID value as operand on line 4022 of FIG. 8 that specifies a register at one end of the range of Register Space pointer values for the ALLx register group. In one type of embodiment, the specified register is the one at the end of the range at which the last repeated push or last repeated pop is performed in the repeat sequence. The instruction format dbl (push(ALLa)) is suitably implemented by the same circuitry that supports repeat(#n)

dbl(push(AC0)).

"ALLa" is also used as a generalized expression of "a register" in processor assembly language, similar to expressing a concept in algebra, to which concrete numbers are applied later. ALLa and ALLb are analogous to pronouns of a language. ALLa can be used to indicate the register which is literally named in a given instruction, and ALLb can be used to indicate the register which is actually indicated in any given instance of successive generation of different instances of a repeated instruction.

The same encoding is assigned for "ALLa" and register identification RegID. Alphabetic "ALLa" is encoded at assembly time. ALLx when it is first register operand in the instruction, is written ALLa. ALLx when it is second register operand in the instruction, is written ALLb.

In the generalized use herein, a push instruction is represented (on documents, or in generic form) as "push(ALLa)" and then used in the computer program code with actual register selection dbl(push(AC0)); push to stack accumulator0 32 bit value, or push(AC1.L); push to stack the lower 16 bits of accumulator1.

Data access is suitably any appropriate width, and in one example the register file RF registers are accessed register by register when reading from or writing to memory.

RPT instruction followed by PUSH/POP instruction results in a multi-cycle instruction that does not pre-establish or limit operation to a fixed range of registers. Instead, a number N of registers to save and identification of which registers to save are both user defined.

Further Embodiments

Figure 11A:
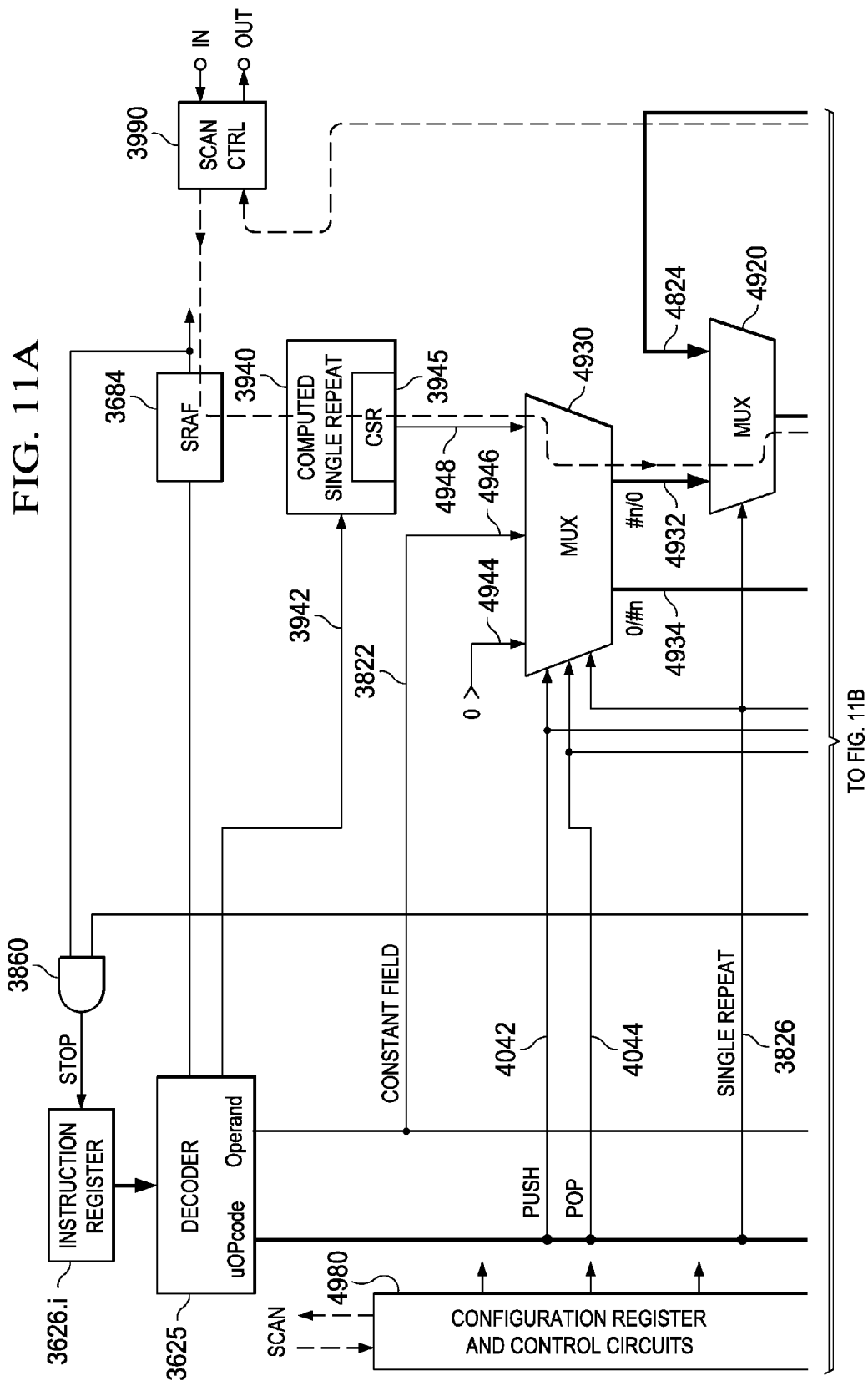
FIGS. 11A-11B illustrate a partially block, partially schematic diagram representing inventive circuitry for inventive repeat multiple push pop and other repeat multiple instructions.
Figure 11B:
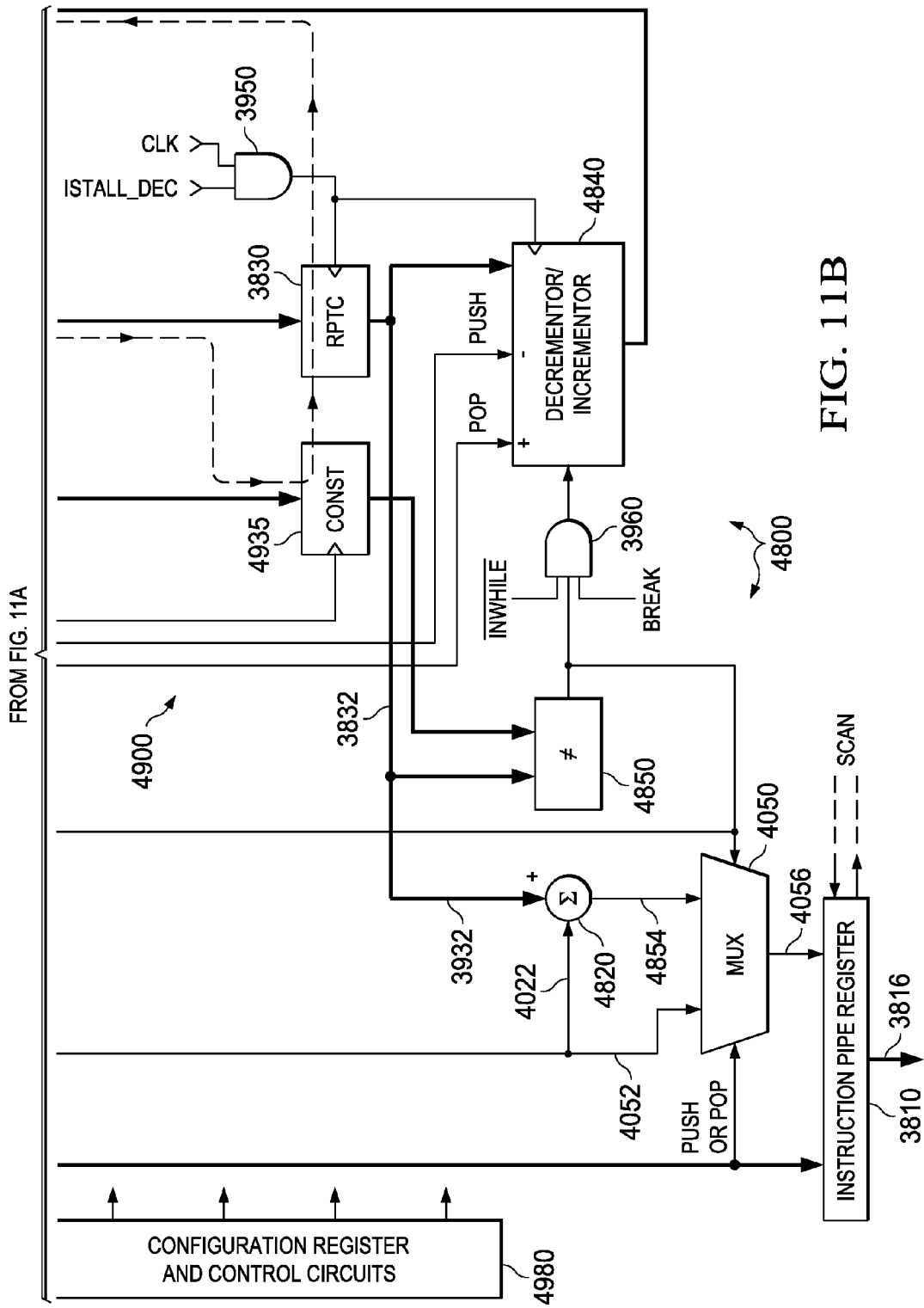

FIGS. 11A-11B depicts circuitry of another embodiment and is useful for describing still other embodiments representing variations thereof. Compare with FIGS. 8A-8C. The description of FIG. 11 compares and contrasts with FIG. 8, and for conciseness does not repeat description of correspondingly-numbered parts already described in connection with FIG. 8.

In FIGS. 11A-11B, some embodiments provide hardware support for exactly symmetrical syntax for push and pop. Assembler encodes the operand field as the same register designation (e.g., AC0) for both push and pop, and hardware of FIGS. 11A-11B performs the multiple push in decreasing order and a multiple pop in increasing order. For example, when saving n accumulator registers to the stack, the following code is used:

RPT #n; Repeat next instruction n+1 times, initialize RPTC to n.

PSH AC0; Push sequence starts at RegID of register AC0 plus RPTC repeat #n and decrements RPTC, ending at RegID of AC0 itself.

When restoring an accumulator context, the following code is used:

RPT #n ; Repeat next instruction n+1 times, initialize RPTC to 0.

POP AC0; Pop sequence starts at RegID of register AC0 plus RPTC=0 and increments RPTC, ending at RegID plus repeat number #n.

The stack operates as a Last In First Out (LIFO) memory so the operation is done in the reverse order. The operand RegID field is modified as RegID plus RPTC for both Push and Pop.

In FIG. 11B, electronic circuit 4800 has bias value generator circuitry 4900 revised relative to circuitry 3900 of FIG. 8C by replacing decrementer 3840 with a decrementor/incrementor circuit 4840, replacing Non-Zero detector 3850 with a Not-Equal detector or comparator 4850, and replacing muxes 3920 with muxes 4920 and 4930. A constant register CONST 4935 holds a different constant for use by the Not-Equal detector depending on whether the instruction is a Push or Pop (or Store or Load). The Logic 4010 of FIG. 8C is changed to alternatively vary the operand value as a function of the varying bias value from RPTC by omitting subtracter 4030 and changing an adder 4022 to be an arithmetic element 4820.

In FIG. 11A, Mux 4930 has selector controls that are responsive to uOPcodes of instructions like Push and Pop, or Load and Store, etc., that are the inverse of each other. If the instruction is Push, then a hardwired zero field is coupled via a mux 4930 from input 4944 to output 4934 and clocked into CONST register 4935 at the time when the Repeat (#n) instruction is decoded. Concurrently, mux 4930 on a second input 4932 delivers, as the case may be, the Repeat operand value from input 4946 or CSR value from input 4948 to output 4932 and then through a mux 4920 to initialize Repeat Counter 3830 with an initial counter value for Push. When the repeated instruction such as PSH AC0 is decoded, decrementor/incrementor circuit 4840 is activated for decrementing by uOPcode for Push, and mux 4920 couples the output 4824 of decrementor/incrementor circuit 4840 to the Repeat Counter RPTC 3830. In this way, downcounting by RPTC becomes operative.

Instruction Register IR 3626.*i* is frozen by the STOP signal from AND-gate 3860 during the down counting. The down counting RPTC value is successively summed by arithmetic element 4820 with the Operand value for RegID (e.g. of AC0) provided by Instruction Decoder 3625 on line 4022. The output 4854 of arithmetic element 4020 operating as an adder is coupled by mux 4050 output 4056 to an operand portion of Instruction Pipe Register 3810. Comparator 4850 detects when the RPTC value on line 3832 equals zero, the value stored in CONST register 4935 for push. Then comparator 4850 disables decrementing by decrementor/incrementor circuit 4840 and the repeated Push is complete.

Conversely, in FIGS. 11A-11B, if the instruction is Pop, then a hardwired zero field is coupled via a mux 4930 from input 4944 to output 4932 and then through a mux 4920 to initialize Repeat Counter 3830 for Pop at the time when the Repeat(#n) instruction is decoded. Concurrently, mux 4930 on its output 4934 delivers, as the case may be, the repeat operand value from input 4946 or CSR value from input 4948 to output 4934, which clocks into CONST register 4935. When the repeated instruction such as POP AC0 is decoded, decrementor/incrementor circuit 4840 is activated for incrementing by uOPcode for Pop, and mux 4920 couples the output 4824 of decrementor/decrementor circuit 4840 to the Repeat Counter RPTC 3830. In this way, upcounting by RPTC becomes operative. Instruction Register IR 3626.*i* is frozen by the STOP signal from AND-gate 3860 during the upcounting. The upcounting RPTC value is successively summed by arithmetic element 4020 operating as an adder with the Operand value for RegID (e.g. of AC0) provided by Instruction Decoder 3625 on line 4022. The output 4854 of arithmetic element 4820 is coupled by mux 4050 output 4056 to an operand portion of Instruction Pipe Register 3810. Comparator 4850 detects when the RPTC value on line 3832 equals the value stored in CONST register 4935 for pop, i.e., #n (repeat operand or CSR). Then comparator 4850 disables incrementing by decrementor/incrementor circuit 4840 and the repeated Pop is complete.

Notice that for either Push or Pop, decrementor/incrementor circuit 4840 selectively establishes the direction of counting depending on the nature of the repeated instruction as Push or Pop, Store or Load, or otherwise. Also, notice that for either Push or Pop, comparator 4850 determines when register RPTC has reached an opposite end of the programmable range of bias values from which counting began.

As in FIG. 8B, the circuitry of FIG. 11A includes Interrupt Unit 3629 coupling Interrupt Sources to enter a first instruction of an interrupt service routine via jam interrupt lines JAM_INTR to Instruction Register IR and to enable the Instruction Decoder for decoding thereof.

In FIG. 11, a block 4980 for Configuration Register and Control Circuits is used to configurably revise the operation of the circuitry of FIG. 11 for any of the following types of syntax support. A Configuration Register in block 4980 can hold any of a plurality of configuration codes representing different structure embodiments and/or method of operation embodiments of circuitry of FIG. 11 or variations thereof and having concatenated code fields. For enhanced security, the Configuration Register is loaded in a secure manner and protected by security protection hardware such as a secure state machine SSM. Various lines in FIG. 11 are labeled for code 0010001 merely by way of example and not of limitation. For instance, the circuit of FIG. 8 is structured as a hardware embodiment having operation corresponding to code 0010000 in FIG. 11. Control Circuits in the block 4980 decode and couple first and second code fields so as to establish mux selector controls, determine decrementing or incrementing, and determine add or subtract functionality as specified in TABLES 8.1 and 8.2.

Scan controller 3990 is operable to probe, debug, and verify this circuitry along at least one scan path linking the following registers to the scan controller by serial scanning in and scanning out bits in register SRAF, the Configuration Register in block 4980, the CSR register 3945, CONST register 4935, Instruction Pipe Register 3810, and register RPTC 3830.

Examples of a set of configuration codes for a first code field are shown in TABLE 8.1, with xxx in the second code field:

TABLE 8.1

| CONFIGURATION CODES, FIRST CODE FIELD | |
|---|---|
| 000xxx: | No multiple Repeat instructions, second field ignored. Operand from Instruction Decoder 3625 is coupled directly by mux 4050 to Instruction Pipe Register 3810. |
| 001xxxx | Multiple Push and Multiple Pop only. |
| 010xxxx | Multiple Store and Multiple Load only. |
| 011xxxx | Multiple Push and Multiple Pop, Multiple Store and Multiple Load. |
| 1xxxxxx | Additional multiple repeated instructions. |

Examples of a set of configuration codes for a second code field are shown in TABLE 8.2, with xxx in the first code field. The terminology uOPcode1 refers to a first operation that generates data or sets up a first transition of location of data, such as PSH, ST, etc; and uOPcode2 refers to a second reverse operation that restores things as they were before the application of uOPcode1 or reverses the first transition of location of data, such as POP, LD, etc. The symbolism <RegID> means an alphanumeric register name (e.g., AR6, AC0, PDP, etc.) having a register identification RegID in Register Space. CONST refers to register 4935 value for comparison with RPTC for Not-Equal detector 4850. RPTC in this TABLE 8.2 refers to the initial value is supplied by mux 4930 output 4932 to register 3830 from which counting begins. Dec or Inc refers to mode of operation of decrementor/incrementor 4840. Add or Subtract refers to mode of operation of arithmetic element 4020. In TABLE 8.2, a respective such list {CONST, RPTC, Inc/Dec, Add/Subtract} is respectively provided underneath each corresponding uOPcode1 and uOPcode2.

TABLE 8.2

| CONFIGURATION CODES, SECOND FIELD |
|---|
| LIFO (Stack-Related) Configuration Codes, Second Field |
| xxx0000: RPT#n; uOPcode1 <RegID>;...RPT#n; uOPcode2 <RegID+n>. |
| CONST=0, RPTC=n, Dec, Add;  CONST=0, RPTC=n, Dec, Subtract. |
| FIG. 8 circuit is a hardware embodiment. |

TABLE 8.2-continued

CONFIGURATION CODES, SECOND FIELD xxx0001: RPT#n; uOPcode1 <RegID>;...RPT#n; uOPcode2 <RegID>.
    CONST=0, RPTC=n, Dec, Add;   CONST=n, RPTC=0, Inc, Add.
    FIG. 11 circuit as labeled is a hardware embodiment, arithmetic 4820 Add.
xxx0010: RPT#n; uOPcode1 <RegID+n>;...RPT#n; uOPcode2 <RegID>.
    CONST=0, RPTC=n, Dec, Subtract;   CONST=0, RPTC=n, Dec, Add.
    Hardware embodiment is FIG. 8 with adder 4020 and Subtractor 4030 reversed.
xxx0011: RPT#n; uOPcode1 <RegID+n>;...RPT#n; uOPcode2 <RegID+n>.
    CONST=0, RPTC=n, Dec, Subtract ;   CONST=n, RPTC=0, Inc, Subtract.
    Hardware embodiment is FIG. 11 with arithmetic 4820 Subtract.
xxx0100: RPT#n; uOPcode1 <RegID>;...    RPT#n; uOPcode2 <RegID+n>.
    CONST=n, RPTC=0, Inc, Add;   CONST=n, RPTC=0, Inc, Subtract.
xxx0101: RPT#n; uOPcode1 <RegID>;...    RPT#n; uOPcode2 <RegID>.
    CONST=n, RPTC=0, Inc, Add;   CONST=0, RPTC=n, Dec, Add.
xxx0110: RPT#n; uOPcode1 <RegID+n>;...    RPT#n; uOPcode2 <RegID>.
    CONST=n, RPTC=0, Inc, Subtract;   CONST=n, RPTC=0, Inc, Add.
xxx0111: RPT#n; uOPcode1 <RegID+n>;...    RPT#n; uOPcode2 <RegID+n>.
    CONST=n, RPTC=0, Inc, Subtract ;   CONST=0, RPTC=n, Dec, Subtract.
FIFO (Queue-related, not Stack-Related) Configuration Codes, Second Field
xxx1000: RPT#n; uOPcode1 <RegID>;...RPT#n; uOPcode2 <RegID+n>.
    CONST=0, RPTC=n, Dec, Add;   CONST=n, RPTC=0, Inc, Subtract.
xxx1001: RPT#n; uOPcode1 <RegID>;...RPT#n; uOPcode2 <RegID>.
    CONST=0, RPTC=n, Dec, Add;   CONST=0, RPTC=n, Dec, Add.
xxx1010: RPT#n; uOPcode1 <RegID+n>;...RPT#n; uOPcode2 <RegID>.
    CONST=0, RPTC=n, Dec, Subtract;   CONST=n, RPTC=0, Inc, Add.
xxx1011: RPT#n; uOPcode1 <RegID+n>;...RPT#n; uOPcode2 <RegID+n>.
    CONST=0, RPTC=n, Dec, Subtract ;   CONST=0, RPTC=n, Dec, Subtract.
xxx1100: RPT#n; uOPcode1 <RegID>;...    RPT#n; uOPcode2 <RegID+n>.
    CONST=n, RPTC=0, Inc, Add;   CONST=0, RPTC=n, Dec, Subtract.
xxx1101: RPT#n; uOPcode1 <RegID>;...    RPT#n; uOPcode2 <RegID>.
    CONST=n, RPTC=0, Inc, Add;   CONST=n, RPTC=0, Inc, Add.
xxx1110: RPT#n; uOPcode1 <RegID+n>;...    RPT#n; uOPcode2 <RegID>.
    CONST=n, RPTC=0, Inc, Subtract;   CONST=0, RPTC=n, Dec, Add.
xxx1111: RPT#n; uOPcode1 <RegID+n>;...    RPT#n; uOPcode2 <RegID+n>.
    CONST=n, RPTC=0, Inc, Subtract ;   CONST=n, RPTC=0, Inc, Subtract.

A first form of reconfiguration changes the mode of operation of adder 4020 to provide a subtracting input mode for a line 3932. Then, for example, when saving/restoring n accumulator registers to the stack, the following code is used:

| | |
|---|---|
| RPT #n | ; Repeat next instruction n+1 times, initialize RPTC to n. |
| PSH ACn | ; Push sequence starts at RegID of register ACn minus RPTC repeat number #n and decrements RPTC, ending at RegID of AC0. |
| ... | |
| RPT #n | ; Repeat next instruction n+1 times, initialize RPTC to 0. |
| POP ACn | ; Pop sequence starts at RegID of register AC0 minus RPTC = 0 and increments RPTC, ending at RegID plus repeat number #n. |

Assembler syntax in another example has a listing as follows.

RPT #15

PUSH ARx; push AR0~AR15, Assembler encode operand field as AR0

RPT #15

POP ARx; pop AR15~AR0, Assembler encodes an operand field as AR15.

Some further embodiments prepare an assembler macro like push (AC15-AC0) and it is encoded as repeat+push.

Some other further embodiments pack "RPT #15" and "PUSH ARx" as one instruction symbol like "MPUSH ARx," for instance. In such embodiments, a further code packing advantage is obtained by packing a repeat instruction and a push or pop instruction together.

Another application of an embodiment utilizes the below example.

ADD AC0 AC1; AC0=AC0+AC1

In the RPT,

RPT #5

ADD AC0 AC1; Accumulate AC1, AC2, AC3, AC4, AC5 and AC6

Some other embodiments apply not only to the operand field but also to the opcode field of an instruction. Operations are suitably performed sequentially on one register and/or memory space at a time or on plural registers and/or memory spaces at a time. In such case, consider the multiple repeat instruction

RPT #8

Push (AC0,AC1)

This multiple repeat instruction pushes AC0 and AC1 in a first push, then AC2 and AC3 in a second push, ... and finally AC14 and AC15 in a last push. Besides pairs of registers of this example, other numbers of registers can be concurrently repeat-pushed/popped.

Still further embodiments provide a useful instruction sequence by assigning a sequential sub-opcode field for a given instruction. Repeat counter RPTC modifies the sub-opcode field (and perhaps operand field also) of the given instructions and thereby realizes that instruction sequence. Some of these embodiments also have Repeat counter RPTC modify the operand field of the given instruction and thereby realizes a further type of instruction sequence.

A repeat instruction in yet further embodiments is applied to a block of instructions thereafter. For instance, in such an embodiment with a block of just two instructions held in parallel in Instruction Registers IR1 and IR2 respectively for execution down a pair of superscalar pipes, an example of the code is written

```
RPT #n
PSH(AC0), PSH(PDP)
...
RPT #n
POP(AC0), POP(PDP)
```

Each of the instructions in the block has the same repeat number #n applicable to it, so the Repeat Counter RPTC circuitry of FIGS. 8A-8C or FIG. 11A-11B is straightforwardly applied. However, because there are two pipes to handle parallel execution, the circuitry of FIGS. 8A-8C is revised to replicate circuitry 4010 as revised circuitry pair 4010.1 and 4010.2, and Instruction Pipe Register 3810 is revised as a register pair 3810.1 and 3810.2 to serve the respective superscalar pipes. The hardware embodiment(s) represented by FIGS. 11A-11B are analogously revised. In operation, the Push instruction pair performs the context save in a manner that intersperses different sequences (first sequence based on AC0, second sequence based on PDP) of registers in Register Space in the pushes to memory 4480. Thus, the order of the saving of the registers to the memory 4480 is different from the order of saving that occurs using the code:

```
RPT #n
PSH(AC0)
RPT #n
PSH(PDP)
...
RPT #n
POP(AC0)
RPT #n
POP(PDP).
```

The order of the saving of the registers to the memory 4480 presents no difficulty for a multiple repeat Push operation like context save because the reverse operation of multiple repeat Pop performs context restore into the original register locations in Register Space.

Some embodiments have a multiple repeat instruction of any of the foregoing types that is made to be a conditional instruction that operates on a built-in condition such as IF, WHILE, etc., involving status bits or status register bit fields for statuses such as carry, less than zero, equal to zero, etc. The instruction evaluates a condition defined by its condition field and as long as the condition is true, the repeat instruction is repeatedly executed. In the decode pipeline, the SRAF and a While Repeat Active Flag WRAF are set active. At each repeat operation, the condition defined in the condition field of the instruction is tested in an execute pipe stage, and when the condition becomes false, the repeat operation is stopped. RPTC shows how many iterations remained to be performed. In a pipeline structure wherein the condition is evaluated in an execute pipestage, then when the condition tests false, some of the succeeding iterations of that repeated instruction may already be in address generation or read pipestages. When the while repeat structure is exited, reading the computed single repeat (CSR) content enables a determination of how many instructions have gone through the address generation phase of the pipeline. An unconditional single repeat instruction is used to rewind the pointer registers if a false condition has been met inside the while repeat structure. An interrupt can be serviced during conditional repeating. SRAF and WRAF are saved to the stack along with the returned address and then recovered upon the return.

Some embodiments have one or more types of macroinstruction that includes multiple micro-instructions, one or more of which micro-instructions includes a multiple repeat instruction.

Some other embodiments program the counter and the counter counts to some end-of-range value other than #n or zero (0). Both ends of the range are programmed by configuration of plural register values for start and end of the range in some embodiments.

Still other embodiments use some other function for value V besides an addition $$V = Op + RPTC$$

to vary the operand. For instance, another contemplated function is a more complicated linear function wherein either or both of the operand Op and the counter value RPTC have multiplicative constants or coefficients associated with them according to the relationship $$V = c_1 Op + c_2 RPTC.$$

In FIGS. 8A-8C, $c_1=1$ and $c_2=+/-1$. Some other embodiments use other integer values for the constants $c_1$ and $c_2$, and this can accomplish a staggering of values in memory space, or a rotation of values in one or more dimensions in memory space.

Some further embodiments use a nonlinear function. One simple example of a nonlinear function is a multiplicative product of the operand Op times the counter value RPTC according to the relationship $$V = c_1 Op \times RPTC.$$

Other further embodiments vary the values and cover the programmable range in some manner such as $$Op + (n, n-2, n-1, n-3, \ldots 0),$$

or in a pseudorandom manner in the programmable range, or otherwise.

Put another way, the RPTC register in some embodiments is not used as a counter and instead holds successive values that are not all in a decrementing or incrementing order of counting. The successive values result from operation of any suitable circuit for generating them. Some embodiments do not wholly use the operand value range and/or do not fill up or cover the programmable range with RPTC values. The phrase "bias value generator circuit" is expansively used herein to refer to all counting and non-counting types of embodiments because both generate bias values with which to bias the operand. Thus many embodiments are contemplated.

Figure 10:
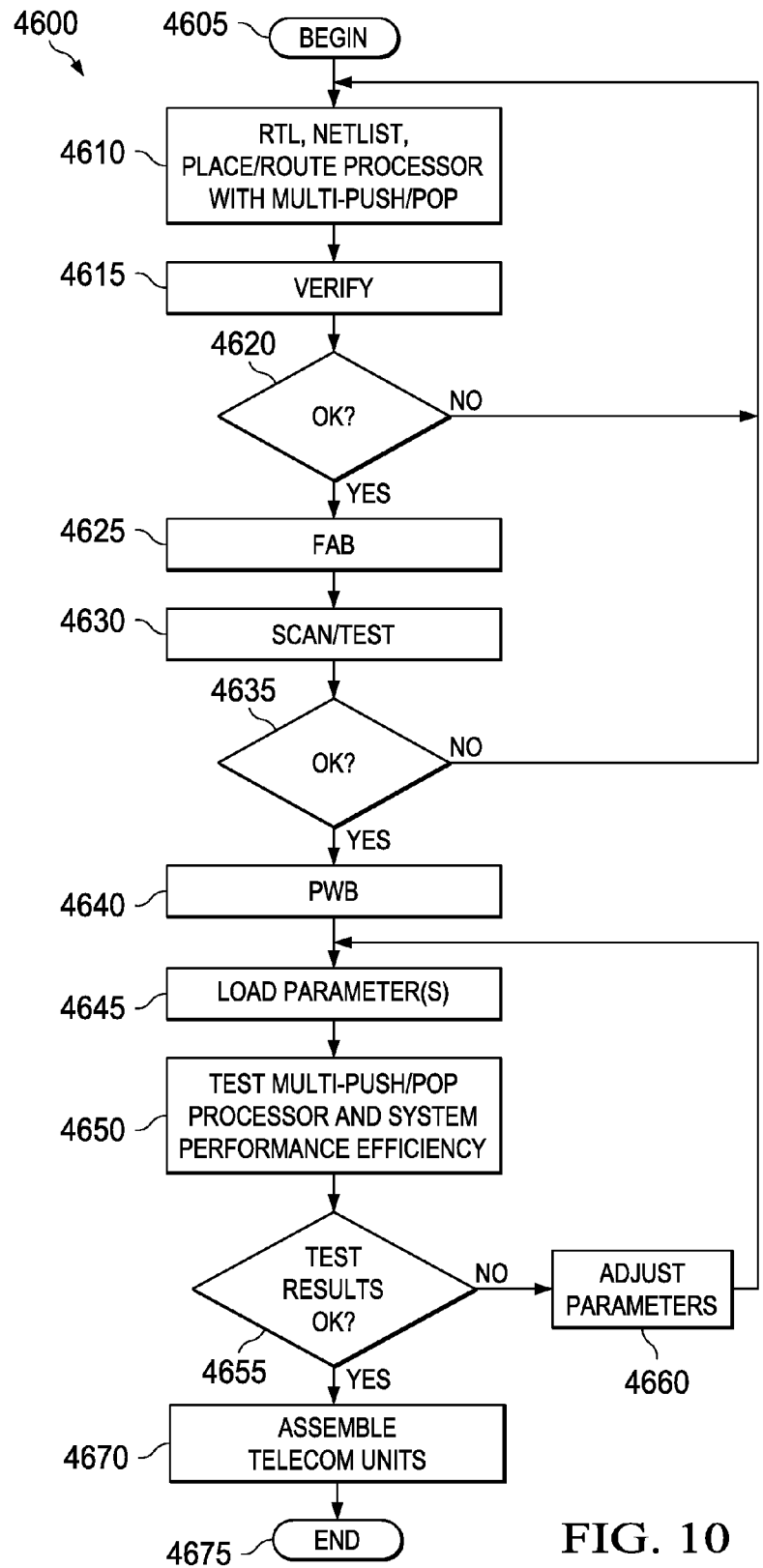
FIG. 10 is a flow diagram of an inventive process of manufacturing various embodiments of the invention.

In FIG. 10, various embodiments of an integrated circuit improved as described herein are manufactured according to a suitable process of manufacturing process 4600 as illustrated in the flow of FIG. 10. Operations commence with a begin 4605 and prepare RTL, netlist, and place-and-route for processor circuitry having repeat multiple instructions and hardware to support them as taught elsewhere herein. The resulting design is verified in a step 4615 so that the architecture design actually implements the structures and operations taught herein. An evaluation step 4620 loops back to step 4610 if the design needs to be corrected, otherwise operations proceed to a step 4625 to fabricate numerous integrated circuits including structures defining the processor circuitry herein on integrated circuit wafers using silicon, silicon-germanium (SiGe), gallium arsenide (GaAs), or other materials family. After wafer fabrication, integrated circuits are tested in a step 4630 using wafer probe for actual electrical power-up and verification of actual electrical operations as taught herein. For instance, step 4630 suitably involves electrically testing the structures to verify that the instruction circuit is responsive to a first instruction such as a repeat instruction to program the range of the bias value generator circuit and that the bias value generator circuit supplies a varying bias value in the programmed range and that the instruction circuit is further responsive to a second instruction such as push, pop, load, store, etc., having an operand to repeatedly issue the second instruction with the operand varied in an operand value range determined as a function of the varying bias value. Also, at this time and/or after subsequent packaging, scan controller 3990 performs serial scan-in and scan-out of bits for electrically testing the operation of the integrated circuits as described.

The results of scan/test 4630 are evaluated at a step 4635, and if corrections are needed, then operations loop back to step 4610. Otherwise operations proceed to system integration step 4640 wherein one or more processor integrated circuits are stuffed onto printed wiring board(s).

In a step 4645, a flash memory is programmed with system parameters, boot configuration, and data for configuration register 4980 for the circuitry of FIG. 11 and with representations of repeat instructions and repeated instructions to accommodate sets of storage elements as in FIG. 9C. For embodiments having a Configuration Register 4980 as in block 4984 of FIG. 11, the system parameters suitably include information for the Configuration Register to establish the desired forms of repeat multiple instructions and their operations which the processor(s) and system are to support. The printed wiring board PWB is stuffed with the flash memory, and the system is actually powered up.

A step 4650 tests the multiple push/pop or other repeat multiple instructions for correct operation of the processor and in the system. An evaluation step 4655 determines whether the test results are all right, and if not, operations of a step 4660 adjust the parameters and loop back to step 4645 or back to step 4610 if need be. If the test results are all right, operations proceed to a step 4670 to assemble telecommunications units or other products for sale and consumption, whereupon an End 4675 is reached.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors and other structures. Photonic integrated circuit blocks, components, and interconnects are also suitably applied in various embodiments.

Aspects (See Explanatory Notes at End of this Section)

1A. The electronic circuit as claimed in claim 1 wherein said bias value generator circuit has a counter register and a circuit for establishing the programmable range and coupled to said counter register.

1B. The electronic circuit as claimed in claim 1A wherein said circuit for establishing the programmable range includes a multiplexing circuit for selectively coupling an initial counter value to said counter register.

1C. The electronic circuit as claimed in claim 1 wherein said instruction circuit is also responsive if an instance occurs wherein the second instruction is present but the first instruction is absent so that the second instruction is issued just once in such instance with said operand unchanged.

4A. The electronic circuit as claimed in claim 4 wherein said bias value generator circuit includes a detector circuit operable to determine when the counter register has reached an opposite end of the programmable range.

11A. The processor claimed in claim 11 wherein said pipeline is operable to execute a push instruction, and said repeating instruction circuit is responsive to said repeat instruction and to the push instruction as said repeated instruction to deliver a succession of push instructions with varying operand values to said pipeline.

11B. The processor claimed in claim 11A wherein said pipeline is also operable to execute a pop instruction, and said repeating instruction circuit is responsive to the pop instruction as another repeated instruction to deliver a succession of pop instructions to the pipeline with operand values varying in reverse compared to the varying operand values for the push instruction.

11C. The processor claimed in claim 11 wherein said pipeline is operable to execute a store instruction, and said repeating instruction circuit is responsive to said repeat instruction and to the store instruction as said repeated instruction to deliver a succession of store instructions with varying operand values to said pipeline.

11D. The processor claimed in claim 11C wherein said pipeline is also operable to execute a load instruction, and said repeating instruction circuit is responsive to the load instruction as another repeated instruction to deliver a succession of load instructions to the pipeline with operand values varying in reverse compared to the varying operand values for the store instruction.

11E. The processor claimed in claim 11 further comprising a repeat active register coupled to said instruction decoder and representing whether said repeating instruction circuit is currently active, and the processor further comprising a context circuit for storing said repeat active register.

11F. The processor claimed in claim 11 wherein said repeating instruction circuit includes a counter register, and the processor further comprises a context circuit for storing said counter register.

11G. The processor claimed in claim 11 further comprising a memory having memory locations accessible by memory addresses, and an address pipeline responsive to the repeated instruction and varying values of said operand to assert write addresses to said memory as a function of the varying values, and the processor further comprising a register file and source selector circuitry coupled to said first named pipeline and responsive to the repeated instruction with the varying values of said operand to access registers in said register file and write data to the memory locations in said memory corresponding to the asserted write addresses from said address pipeline.

18A. The electronic circuit claimed in claim 18 further comprising a multiplexer circuit having a first input to receive said immediate constant and a second input to receive a repeat count, and a count-changing circuit operable to feed said repeat count to said second input of said multiplexer, said multiplexer having an output to deliver the changing count to said count register.

18B. The electronic circuit claimed in claim 18 further comprising pop instruction execution circuitry operable to dynamically pop data from said destination stack.

18C. The electronic circuit claimed in claim 18 further comprising pop instruction execution circuitry operable to dynamically pop data from said destination stack in response to an immediate constant from said instruction register biased, in a reverse manner relative to push, with the changing count from said count register.

22A. The electronic circuit claimed in claim 22 further comprising a second pipeline coupling said instruction operand value generating circuit with said selection circuitry.

22B. The electronic circuit claimed in claim 22 wherein said selection circuitry includes decoding circuitry for decoding each value onto access signal lines to select storage elements in said set.

22C. The electronic circuit claimed in claim 22 further comprising a nonvolatile memory coupled to said instruction operand value generating circuit and programmed with a plurality of repeat and repeated instructions defining plural operand value ranges for operations of said instruction operand value generating circuit.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

While some embodiments may have an entire feature totally absent or totally present, other embodiments, such as those performing the blocks and steps of the Figures of drawing, have more or less complex arrangements that execute some process portions, selectively bypass others, and have some operations running concurrently sequentially regardless. Accordingly, words such as "enable," disable," "operative," "inoperative" are to be interpreted relative to the code and circuitry they describe. For instance, disabling (or making inoperative) a second function by bypassing a first function can establish the first function and modify the second function. Conversely, making a first function inoperative includes embodiments where a portion of the first function is bypassed or modified as well as embodiments where the second function is removed entirely. Bypassing or modifying code increases function in some embodiments and decreases function in other embodiments.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A processor for electronic computing comprising:
    an instruction register;
    an instruction decoder having a decoded instruction output with an instruction operand output, said instruction decoder operable to successively decode a repeat instruction and a repeated instruction having an operand;
    a pipeline having pipestages including a particular pipestage coupled to said decoded instruction output; and
    a repeating instruction circuit coupled between said instruction decoder and said particular pipestage, said repeating instruction circuit responsive to said repeat instruction to program an operand value range for causing execution of said repeated instruction a plurality of times in response to the operand value range while causing execution of the repeat instruction less than the plurality of times and also responsive to said repeated instruction and an operand of said repeated instruction to vary the value of said repeated instruction operand over said operand value range and deliver the varying value of said repeated instruction operand to said particular pipestage,
    wherein the repeating instruction circuit is for causing execution of said repeated instruction a plurality of times in response to the operand value range while causing execution of the repeat instruction only a single time corresponding to the execution of said repeated instruction a plurality of times.

2. The processor claimed in claim 1 further comprising a memory having memory locations accessible by memory addresses, and an address pipeline responsive to the repeated instruction and varying values of said repeated instruction operand to assert read addresses to said memory as a function of the varying values of said repeated instruction to read data from the memory locations addressed by the asserted read addresses, and the processor further comprising a register file and destination selector circuitry coupled to said first named pipeline and responsive to the repeated instruction with the varying values of said operand to load registers in said register file with the data read from the memory locations.

3. The processor claimed in claim 1 further comprising at least one processor register and wherein said pipeline has plural pipe stages after the instruction decoder so that a Beginning, Middle and End of said pipeline are distinct from one another, the processor further comprising a selector circuit coupled to the Middle of said pipeline and operable so that a first Push makes a source selection of the at least one processor register in response to the varying value of said operand while the at least one processor register is updatable by execution of at least one previous instruction between the Middle and End of said pipeline.

4. The processor claimed in claim 3 further comprising a memory and at least one pipestage for piping data from said at least one processor register as a selected source so that the data are piped down to the End area of said pipeline for writing to said memory.

5. The processor claimed in claim 4 wherein said pipeline comprises a first pipeline, and further comprising an address pipeline for generating a memory address for addressing said memory and piping said memory address down to an End of said address pipeline, corresponding to the End of said first pipeline, to assert the memory address and write the data to said memory.

6. The processor claimed in claim 1 further comprising at least one processor register and wherein said pipeline has plural pipe stages after said instruction decoder so that a Beginning, Middle and End of said pipeline are distinct from one another, the processor further comprising a selector circuit coupled to the Middle of said pipeline and operable so that a last Pop makes a destination selection of the at least one processor register in response to the varying value of said operand, whereby the at least one processor register is immediately usable by a new instruction immediately behind the last Pop in said pipeline.

7. The processor claimed in claim 6 further comprising a memory and an address pipeline for generating a memory address for addressing said memory from a Middle of said address pipeline and reading data from said memory at that memory address, said selector circuit coupling said data to said at least one processor register corresponding to the destination selection.

8. The processor claimed in claim 1 wherein said pipeline is operable to execute a push instruction, and said repeating instruction circuit is responsive to said repeat instruction and to the push instruction as said repeated instruction to deliver a succession of push instructions with varying operand values to said pipeline.

9. The processor claimed in claim 8 wherein said pipeline is also operable to execute a pop instruction, and said repeating instruction circuit is responsive to the pop instruction as another repeated instruction to deliver a succession of pop instructions to the pipeline with operand values varying in reverse compared to the varying operand values for the push instruction.

10. The processor claimed in claim 1 wherein said pipeline is operable to execute a store instruction, and said repeating instruction circuit is responsive to said repeat instruction and to the store instruction as said repeated instruction to deliver a succession of store instructions with varying operand values to said pipeline.

11. The processor claimed in claim 10 wherein said pipeline is also operable to execute a load instruction, and said repeating instruction circuit is responsive to the load instruction as another repeated instruction to deliver a succession of load instructions to the pipeline with operand values varying in reverse compared to the varying operand values for the store instruction.

12. The processor claimed in claim 1 further comprising a repeat active register coupled to said instruction decoder and representing whether said repeating instruction circuit is currently active, and the processor further comprising a context circuit for storing said repeat active register.

13. The processor claimed in claim 1 wherein said repeating instruction circuit includes a counter register, and the processor further comprises a context circuit for storing said counter register.

14. The processor claimed in claim 1 further comprising a memory having memory locations accessible by memory addresses, and an address pipeline responsive to the repeated instruction and varying values of said operand to assert write addresses to said memory as a function of the varying values, and the processor further comprising a register file and source selector circuitry coupled to said first named pipeline and responsive to the repeated instruction with the varying values of said operand to access registers in said register file and write data to the memory locations in said memory corresponding to the asserted write addresses from said address pipeline.

15. The processor claimed in claim 1 wherein said repeating instruction circuit is responsive to said repeat instruction to program an operand value range and also responsive to said repeated instruction and an operand of said repeated instruction to vary the value of said repeated instruction operand as a function of and including an offset from said operand value range and deliver the varying value of said operand to said particular pipestage.

* * * * *